(12) United States Patent
Gerganov

(10) Patent No.: US 9,672,071 B2
(45) Date of Patent: *Jun. 6, 2017

(54) METHOD AND SYSTEM FOR DISTRIBUTED PROCESSING OF HTTP REQUESTS

(71) Applicant: VMware, Inc., Palo Alto, CA (US)

(72) Inventor: Radoslav Gerganov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 603 days.

This patent is subject to a terminal disclaimer.

(21) Appl. No.: 14/023,282

(22) Filed: Sep. 10, 2013

(65) Prior Publication Data

US 2015/0074670 A1 Mar. 12, 2015

(51) Int. Cl.
| | | |
|---|---|---|
| G06F 15/173 | (2006.01) | |
| G06F 9/50 | (2006.01) | |
| G06F 9/455 | (2006.01) | |
| G06F 9/48 | (2006.01) | |
| H04L 29/08 | (2006.01) | |
| H04L 29/06 | (2006.01) | |
| G06F 9/44 | (2006.01) | |

(52) U.S. Cl.
CPC .............. *G06F 9/5027* (2013.01); *G06F 8/36* (2013.01); *G06F 9/45533* (2013.01); *G06F 9/45558* (2013.01); *G06F 9/4881* (2013.01); *H04L 63/10* (2013.01); *H04L 67/10* (2013.01); *H04L 67/32* (2013.01); *H04L 67/327* (2013.01)

(58) Field of Classification Search
CPC .. G06F 9/4881; G06F 9/5072; G06F 9/45533; G06F 9/45558; H04L 67/32; H04L 67/327; H04L 47/70; H04L 67/10; H04L 63/10

USPC ....... 709/217, 219, 223, 224, 225, 226, 229, 709/244; 718/1, 103, 104; 726/4

See application file for complete search history.

(56) References Cited

U.S. PATENT DOCUMENTS

2006/0085498 A1* 4/2006 Matsushima ........... H04L 67/16
709/202
2012/0005263 A1* 1/2012 McWhirter ............. G06F 9/541
709/203

(Continued)

*Primary Examiner* — Liangche A Wang
*Assistant Examiner* — Johnny Aguiar

(57) ABSTRACT

The current document is directed to an interface and authorization service that allows users of a cloud-director management subsystem of distributed, multi-tenant, virtual data centers to extend the services and functionalities provided by the cloud-director management subsystem. A cloud application programming interface ("API") entrypoint represents a request/response RESTful interface to services and functionalities provided by the cloud-director management subsystem as well as to service extensions provided by users. The API entrypoint includes a service-extension interface and an authorization-service management interface. The cloud-director management subsystem provides the authorization service to service extensions that allow the service extensions to obtain, from the authorization service, an indication of whether or not a request directed to the service extension through the API entrypoint is authorized. Requests for service-extension URIs within the API entrypoint are processed by a cloud API entrypoint server that dispatches requests, in a predetermined order, to service-extension servers.

20 Claims, 43 Drawing Sheets

(56) References Cited

U.S. PATENT DOCUMENTS

| | | | |
|---|---|---|---|
| 2012/0102183 A1* | 4/2012 | Murakami | G06F 9/5072 709/224 |
| 2012/0271927 A1* | 10/2012 | Shakirzyanov | G06F 9/5061 709/220 |
| 2014/0059194 A1* | 2/2014 | Robb | G06F 9/5072 709/223 |
| 2014/0189125 A1* | 7/2014 | Amies | G06F 9/45558 709/226 |
| 2014/0280484 A1* | 9/2014 | Klemenz | H04L 67/02 709/203 |
| 2015/0019735 A1* | 1/2015 | Pogrebinsky | G06F 17/3089 709/226 |

* cited by examiner

Link Registry

```
{
    "Resource URI" : "http://www.acme.com/custmerInfo/customers",
    "numKvp" : "3",
    "kvp" : {
        "applyTo" : "terminal",
        "Representation.data.city" : "Des Moines",
        "Representation.data.state" : "Iowa",
    }
    "numLinks" : "2",
    "links" : {
        { "rel" : "related",
          "href" : "http://www.acme.com/customerInfo/trial Des Moines Group",
          "type" : "text/html"
        }
    }
}
```

FIG. 20

Authorization Service Management Interface

| ASMI operation | HTTP operation |
|---|---|
| Create Resource Class – returns Resource Class ID | POST |
| Retrieve Resource Class by ID – returns Resource Class | GET |
| Retrieve List of Resource Classes – returns list | GET |
| Delete Resource Class by ID | DELETE |
| | |
| Create Resource Class Action – returns Resource Class Action ID | POST |
| Retrieve Resource Class Action by ID – returns Resource Class Action | GET |
| Retrieve List of Resource Classes – returns list | GET |
| Delete Resource Class Action by ID | DELETE |
| | |
| Create Service Resource – return Service Resource ID | POST |
| Retrieve Service Resource by ID – returns Service Resource | GET |
| Retrieve List of Service Resources – returns list | GET |
| Delete Service Resource | DELETE |
| | |
| Create ACL Rule – returns | POST |
| Retrieve ACL Rule by ID – returns ACL rule | GET |
| Retrieve List of ACL Rules – returns list | GET |
| Delete ACL Rule | DELETE |
| | |
| Create User | POST |
| Retrieve User by ID | GET |
| Retrieve list of Users | GET |
| Delete User by ID | DELETE |
| | |
| Create Group | POST |
| Retrieve Group by ID | GET |
| Retrieve List of Groups | GET |
| Delete Group by ID | DELETE |
| | |
| Create Role | POST |
| Retrieve Role by ID | GET |
| Retrieve List of Roles | GET |
| Delete Role by ID | DELETE |
| | |
| Create Right | POST |
| Retrieve Right by ID | GET |
| Retrieve List of Rights | GET |
| Delete Right by ID | DELETE |

```
/**
 * Service for authorizing access to external uris defined by external services.
 *
 * @since 2.0
 * @version 1.0
 * @author milieva
 */
public interface AuthorizationService {
    /**
     * Verifies if user with provided security context is authorized to set of
     * services
     *
     * @param services
     * External service that extends calls to the request uri
     * @param securityContext
     * Http security context of the user trying to access request uri
     * @param request
     * Http request
     * @throws UnauthorizedException
     * if authorization for at least one of the services fails
     */
    void authorizeServices(Set<ExternalServiceDefinition> services,
    HttpSecurityContext securityContext, HttpServletRequest request)
    throws UnauthorizedException;
    /**
     * Verifies if user with provided security context is authorized to the
     * service
     *
     * @param service
     * External service that extends calls to the request uri
     * @param securityContext
     * Http security context of the user trying to access request uri
     * @param requestUri
     * Http request uri
     * @param httpMethod
     * Http method
     * @return Returns true if authorization is successful and false otherwise;
     */
    boolean authorize(ExternalServiceDefinition service,
    HttpSecurityContext securityContext, String requestUri,
    String httpMethod);
    /**
     * Verify if provided decision request grants permissions to request uri.
     *
     * @param decisionRequest
     * @return
     */
    DecisionResponse evaluate(DecisionRequest decisionRequest);
}
```

METHOD AND SYSTEM FOR DISTRIBUTED PROCESSING OF HTTP REQUESTS

TECHNICAL FIELD

The current document is directed to virtualization technologies and, in particular, to a subsystem of multi-tenant distributed cloud-computing facilities and to methods carried out by the subsystem that provide for access-controlled extensions to services and functionalities provided by the subsystem.

BACKGROUND

The development and evolution of modern computing has, in many ways, been facilitated by the power of logical abstraction. Early computers were manually programmed by slow and tedious input of machine instructions into the computers' memories. Over time, assembly-language programs and assemblers were developed in order to provide a level of abstraction, namely assembly-language programs, above the machine-instruction hardware-interface level, to allow programmers to more rapidly and accurately develop programs. Assembly-language-based operations are more easily encoded by human programmers than machine-instruction-based operations, and assemblers provided additional features, including assembly directives, routine calls, and a logical framework for program development. The development of operating systems provided yet another type of abstraction that provided programmers with logical, easy-to-understand system-call interfaces to computer-hardware functionality. As operating systems developed, additional internal levels of abstraction were created within operating systems, including virtual memory, implemented by operating-system paging of memory pages between electronic memory and mass-storage devices, which provided easy-to-use, linear memory-address spaces much larger than could be provided by the hardware memory of computer systems. Additional levels of abstractions were created in the programming-language domain, with compilers developed for a wide variety of compiled languages that greatly advanced the ease of programming and the number and capabilities of programming tools with respect those provided by assemblers and assembly languages. Higher-level scripting languages and special-purpose interpreted languages provided even higher levels of abstraction and greater ease of application development in particular areas. Similarly, block-based and sector-based interfaces to mass-storage devices have been abstracted through many levels of abstraction to modern database management systems, which provide for high-available and fault-tolerant storage of structured data that can be analyzed, interpreted, and manipulated through powerful high-level query languages.

In many ways, a modern computer system can be thought of as many different levels of abstractions along many different, often interdependent, dimensions. More recently, powerful new levels of abstraction have been developed with respect to virtual machines, which provide virtual execution environments for application programs and operating systems. Virtual-machine technology essentially abstracts the hardware resources and interfaces of a computer system on behalf of one or multiple virtual machines, each comprising one or more application programs and an operating system. Even more recently, the emergence of cloud computing services can provide abstract interfaces to enormous collections of geographically dispersed data centers, allowing computational service providers to develop and deploy complex Internet-based services that execute on tens or hundreds of physical servers through abstract cloud-computing interfaces.

The abstract interfaces provided by cloud-computing allow users to access various services and functionalities used to manage distributed, multi-tenant, virtual data centers. Designers, developers, vendors, and users of these abstract interfaces continue to seek functionality to expand the services and functionalities accessed through the abstract interfaces.

SUMMARY

The current document is directed to an interface and authorization service that allows users of a cloud-director management subsystem of distributed, multi-tenant, virtual data centers to extend the services and functionalities provided by the cloud-director management subsystem. A cloud application programming interface ("API") entrypoint represents a request/response RESTful interface to services and functionalities provided by the cloud-director management subsystem as well as to service extensions provided by users. The cloud APT entrypoint includes a service-extension interface and an authorization-service management interface. The cloud-director management subsystem provides the authorization service to service extensions that allow the service extensions to obtain, from the authorization service, an indication of whether or not a request directed to the service extension through the cloud API entrypoint is authorized. Requests for service-extension URIs within the cloud API entrypoint are processed by a cloud API entrypoint server that dispatches requests, in a predetermined order, to service-extension servers.

BRIEF DESCRIPTION OF THE DRAWINGS

FIG. 20 illustrates a BON encoding of a particular link-registry entry.

FIG. 24 provides a table-based description of a portion of the authorization-service management interface.

FIG. 25 shows, as one example, an HTTP/XML implementation of the ASMI operations 2402 in FIG. 24 associated with resource classes.

FIG. 26 shows the call interface to the authorization service provided by the cloud director.

DETAILED DESCRIPTION OF EMBODIMENTS

Figure 1:
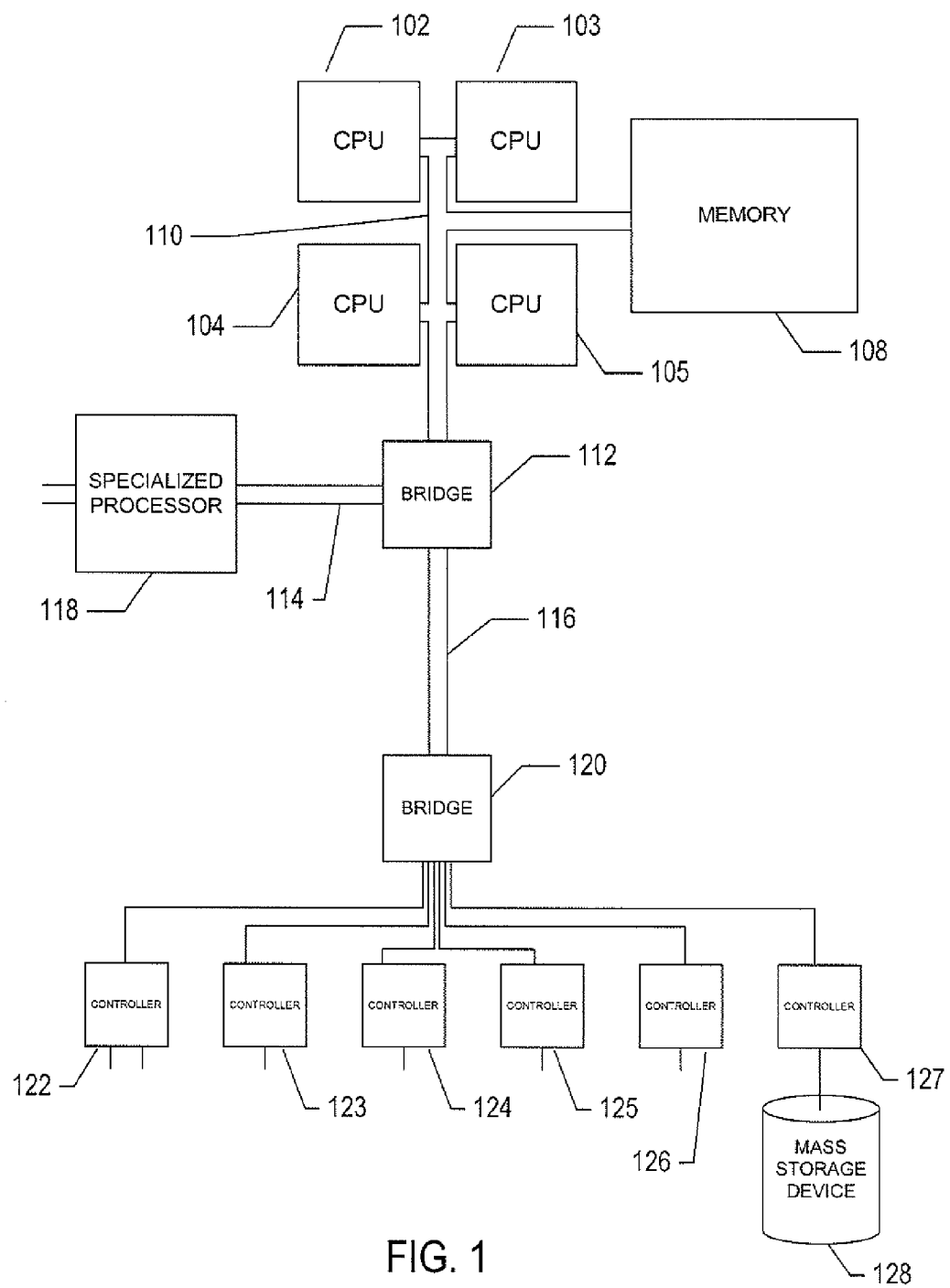
FIG. 1 provides a general architectural diagram for various types of computers.

As discussed above, modern computing can be considered to be a collection of many different levels of abstraction above the physical computing-hardware level that includes physical computer systems, data-storage systems and devices, and communications networks. The current document is related to a multi-cloud-aggregation level of abstraction that provides homogenous-cloud and heterogeneous-cloud distributed management services, each cloud generally an abstraction of a large number of virtual resource pools comprising processing, storage, and network resources, each of which, in turn, can be considered to be a collection of abstractions above underlying physical hardware devices. The current document is directed to extension of services and functionalities provided by a management subsystem that provides a management interface to distributed, multi-tenant, virtual data centers resident within various physical cloud-computing facilities and, in particular, to an authorization service that allows users of the management-subsystem interface to extend services in a multi-tenancy-compatible fashion. The following discussion includes three subsections: (1) Computer Architecture, Virtualization, Electronic Communications, and Virtual Networks; (2) RESTful APIs; and (3) Authorization Service to Facilitate Multi-Tenancy in Cloud-Computing Facilities.

Computer Architecture, Virtualization, Electronic Communications, and Virtual Networks The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential control component of processor-controlled machines and devices, no less essential than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
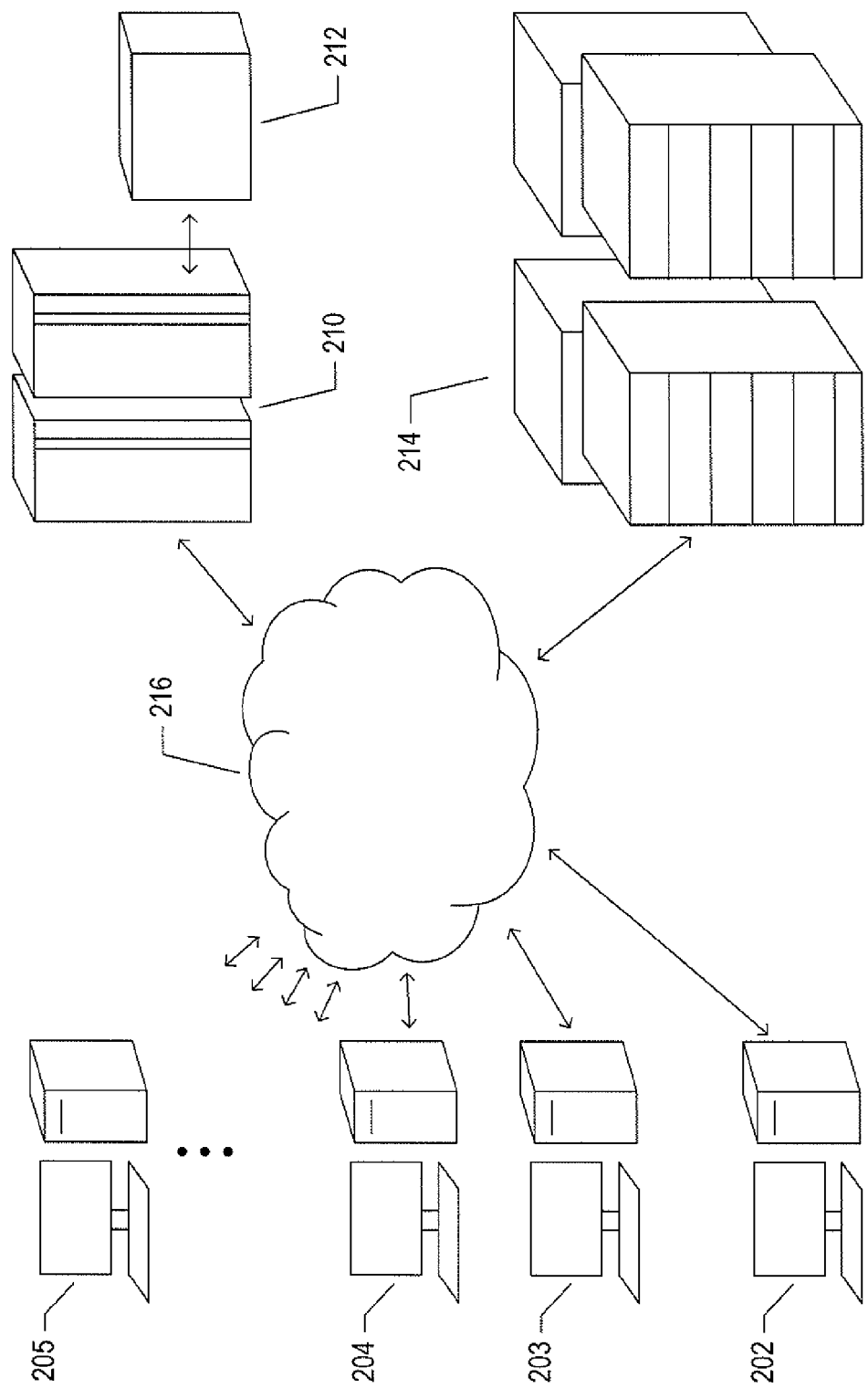
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
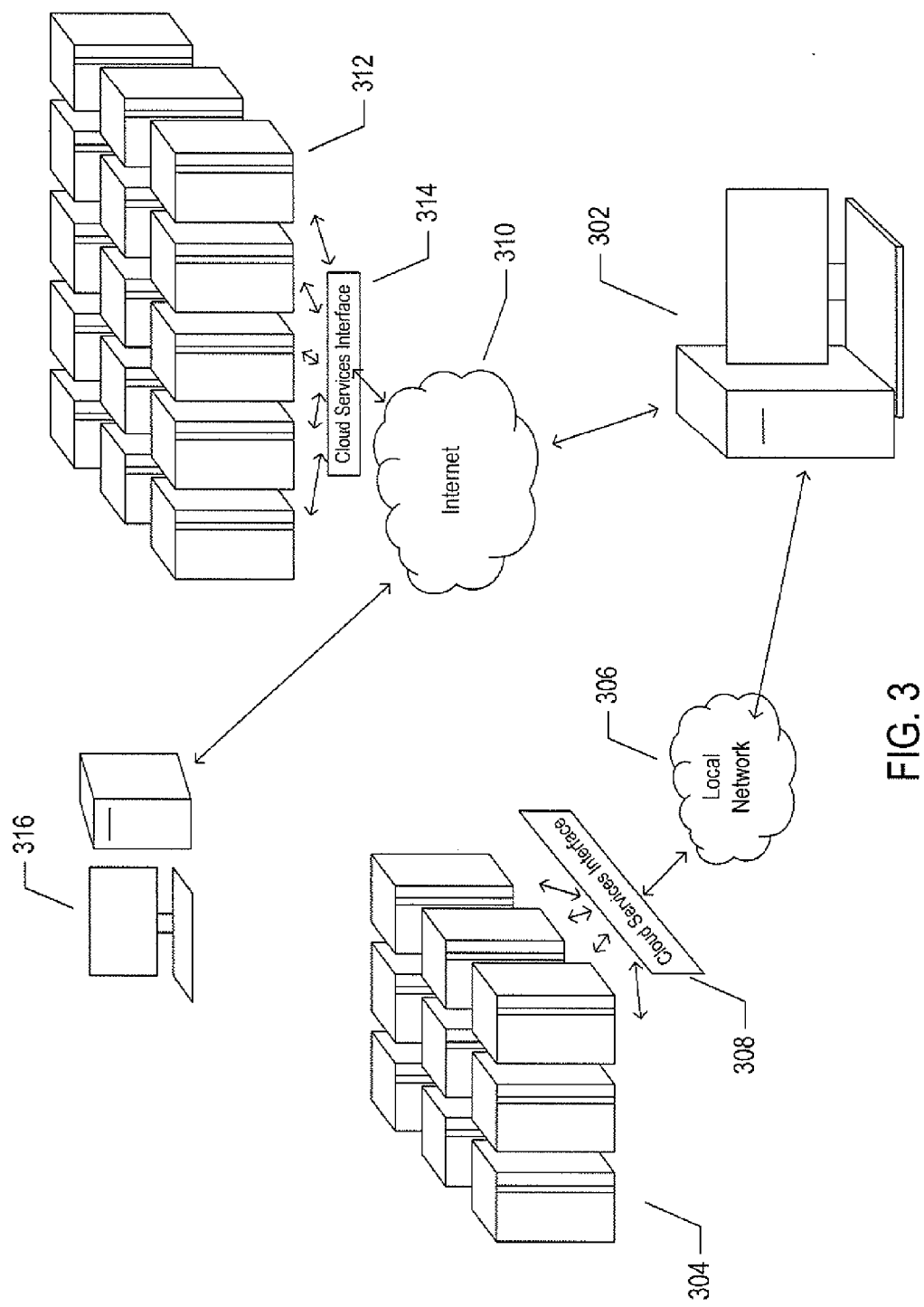
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
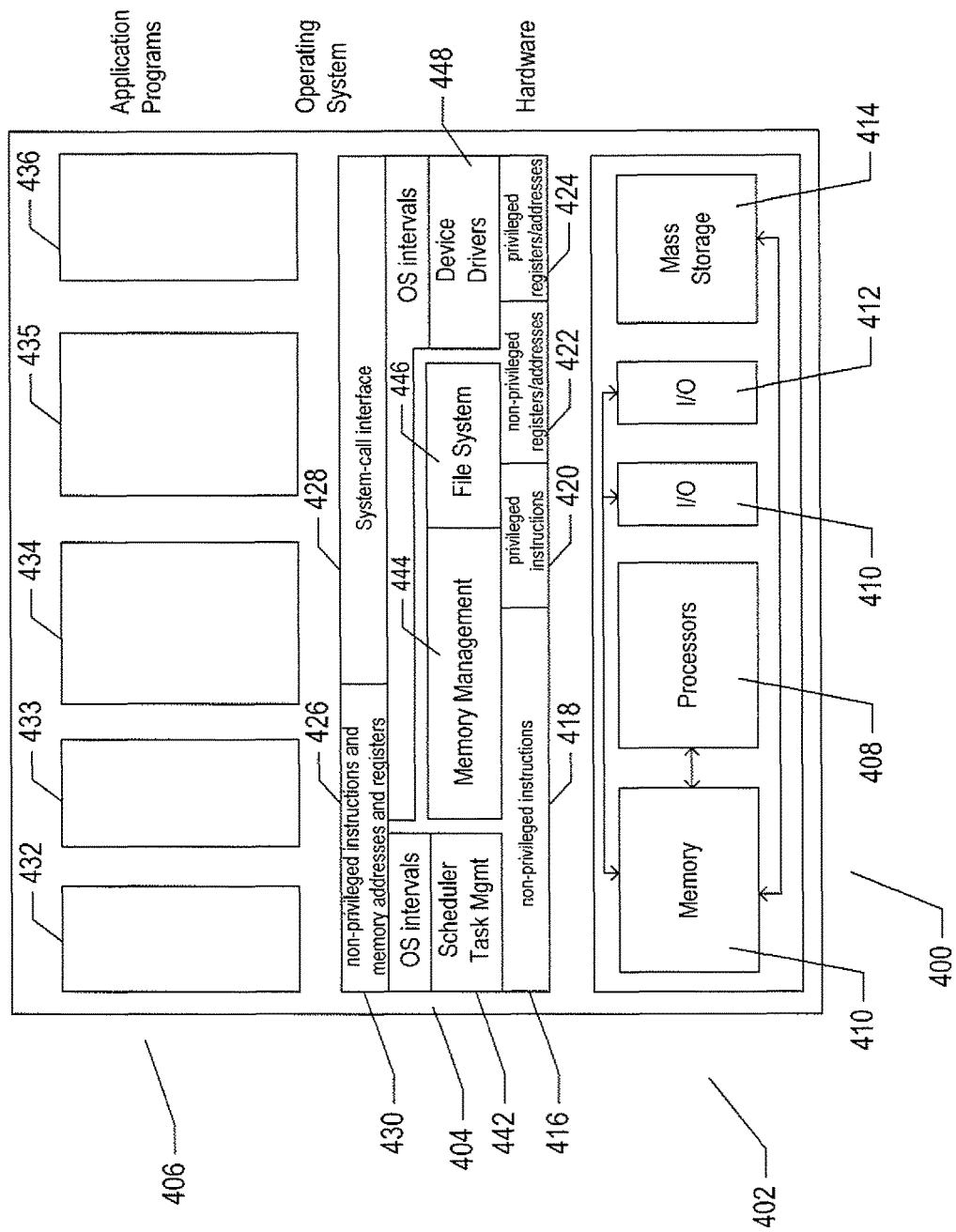
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5:
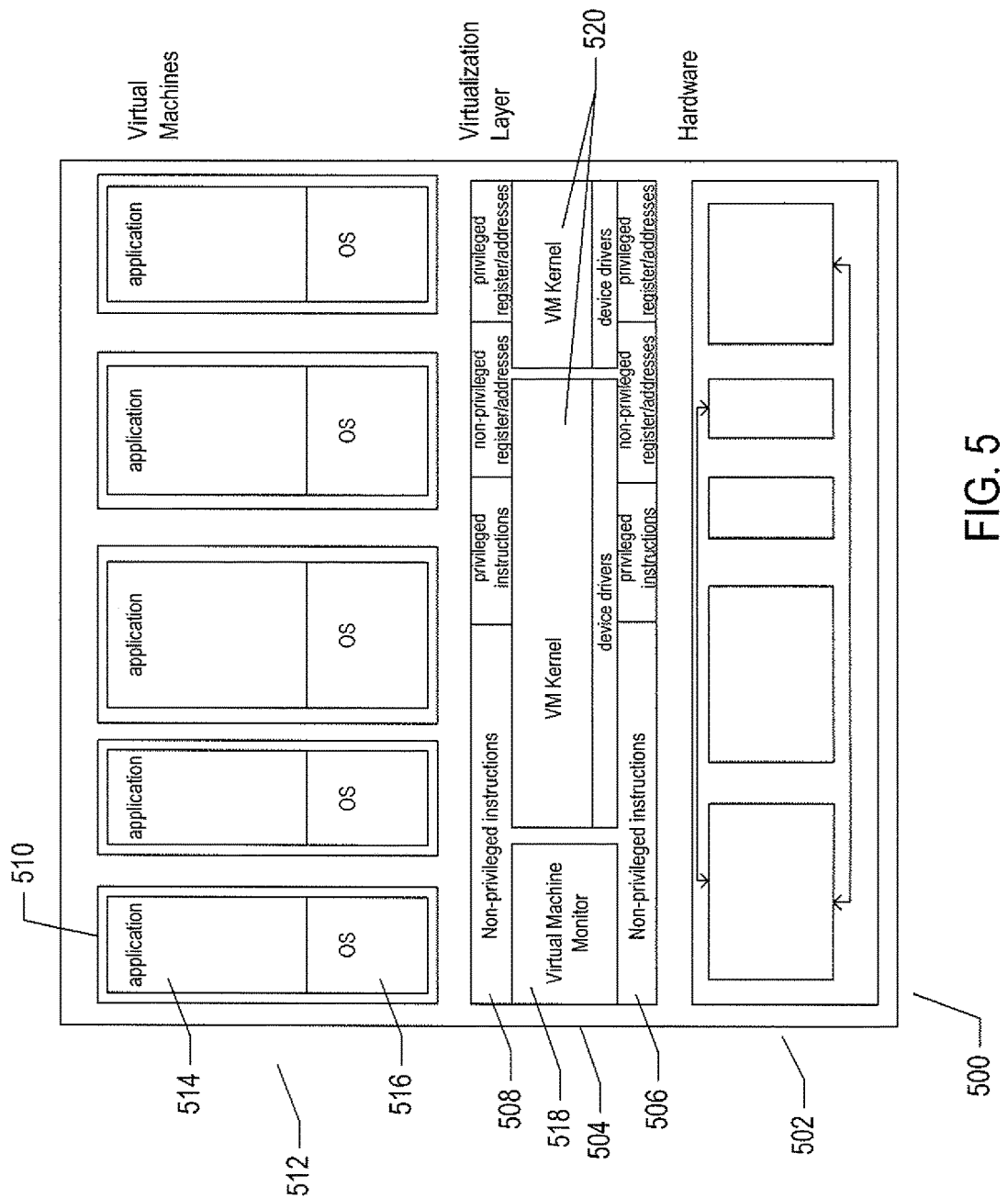
FIG. 5 illustrates one type of virtual machine and virtual-machine execution environment.

For all of these reasons, a higher level of abstraction, referred to as the "virtual machine," has been developed and evolved to further abstract computer hardware in order to address many difficulties and challenges associated with traditional computing systems, including the compatibility issues discussed above. FIG. 5 illustrates one type of virtual machine and virtual-machine execution environment. FIG. 5 uses the same illustration conventions as used in FIG. 4. In particular, the computer system 500 in FIG. 5 includes the same hardware layer 502 as the hardware layer 402 shown in FIG. 4. However, rather than providing an operating system layer directly above the hardware layer, as in FIG. 4, the virtualized computing environment illustrated in FIG. 5 features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, such as application 514 and operating system 516 packaged together within virtual machine 510. Each virtual machine is thus equivalent to the operating-system layer 404 and application-program layer 406 in the general-purpose computer system shown in FIG. 4. Each operating system within a virtual machine interfaces to the virtualization-layer interface 508 rather than to the actual hardware interface 506. The virtualization layer partitions hardware resources into abstract virtual-hardware layers to which each operating system within a virtual machine interfaces. The operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different operating systems. For example, the virtualization layer is generally able to provide virtual hardware interfaces for a variety of different types of computer hardware. This allows, as one example, a virtual machine that includes an operating system designed for a particular computer architecture to run on hardware of a different architecture. The number of virtual machines need not be equal to the number of physical processors or even a multiple of the number of processors. The virtualization layer includes a virtual-machine-monitor module 518 that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the operating system within a virtual machine accesses virtual privileged instructions, virtual privileged registers, and virtual privileged memory through the virtualization-layer interface 508, the accesses may result in execution of virtualization-layer code to simulate or emulate the privileged resources. The virtualization layer additionally includes a kernel module 520 that manages memory, communications, and data-storage machine resources on behalf of executing virtual machines. The kernel, for example, may maintain shadow page tables on each virtual machine so that hardware-level virtual-memory facilities can be used to process memory accesses. The kernel may additionally include routines that implement virtual communications and data-storage devices as well as device drivers that directly control the operation of underlying hardware communications and data-storage devices. Similarly, the kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

Figure 6:
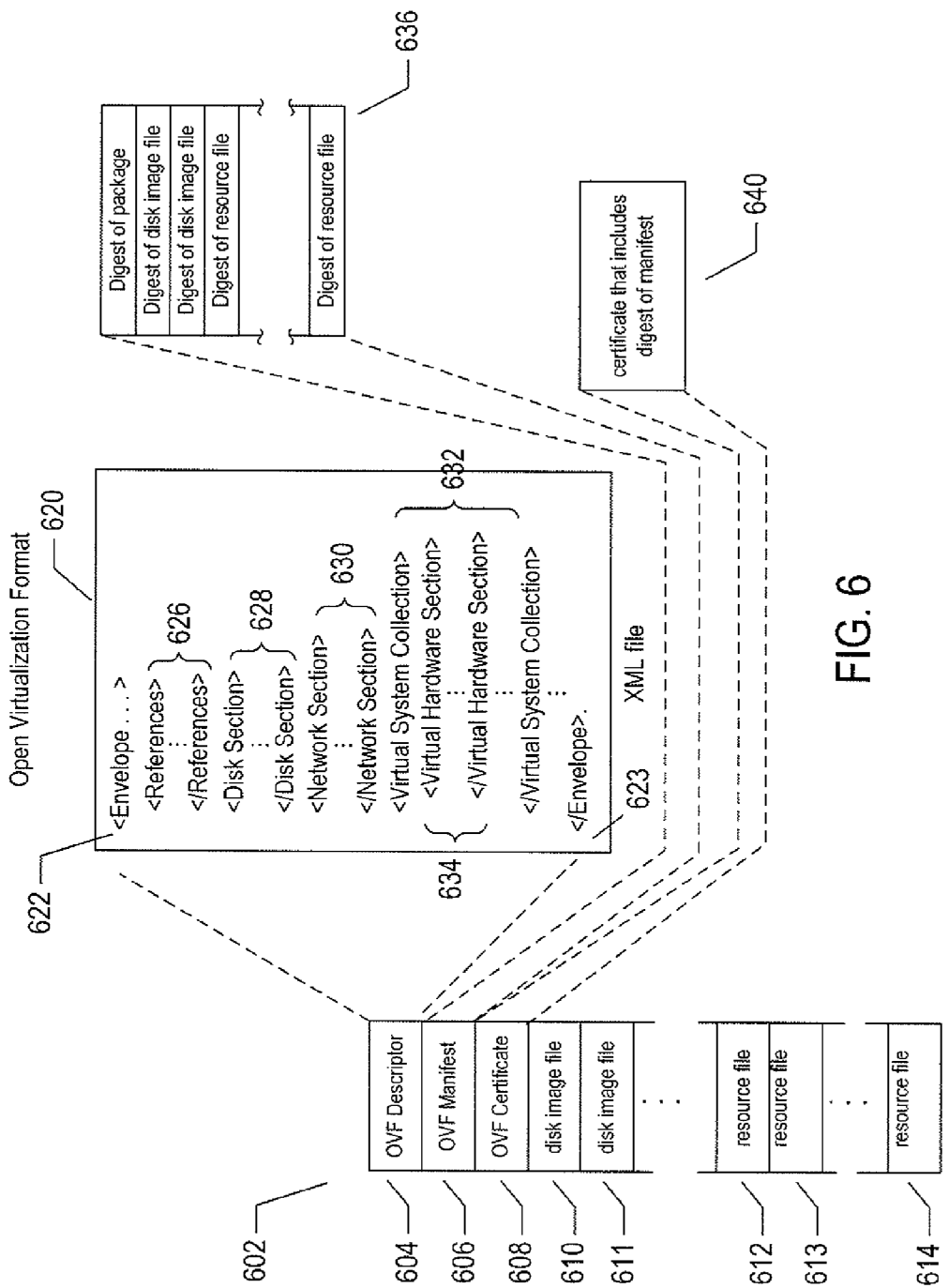
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
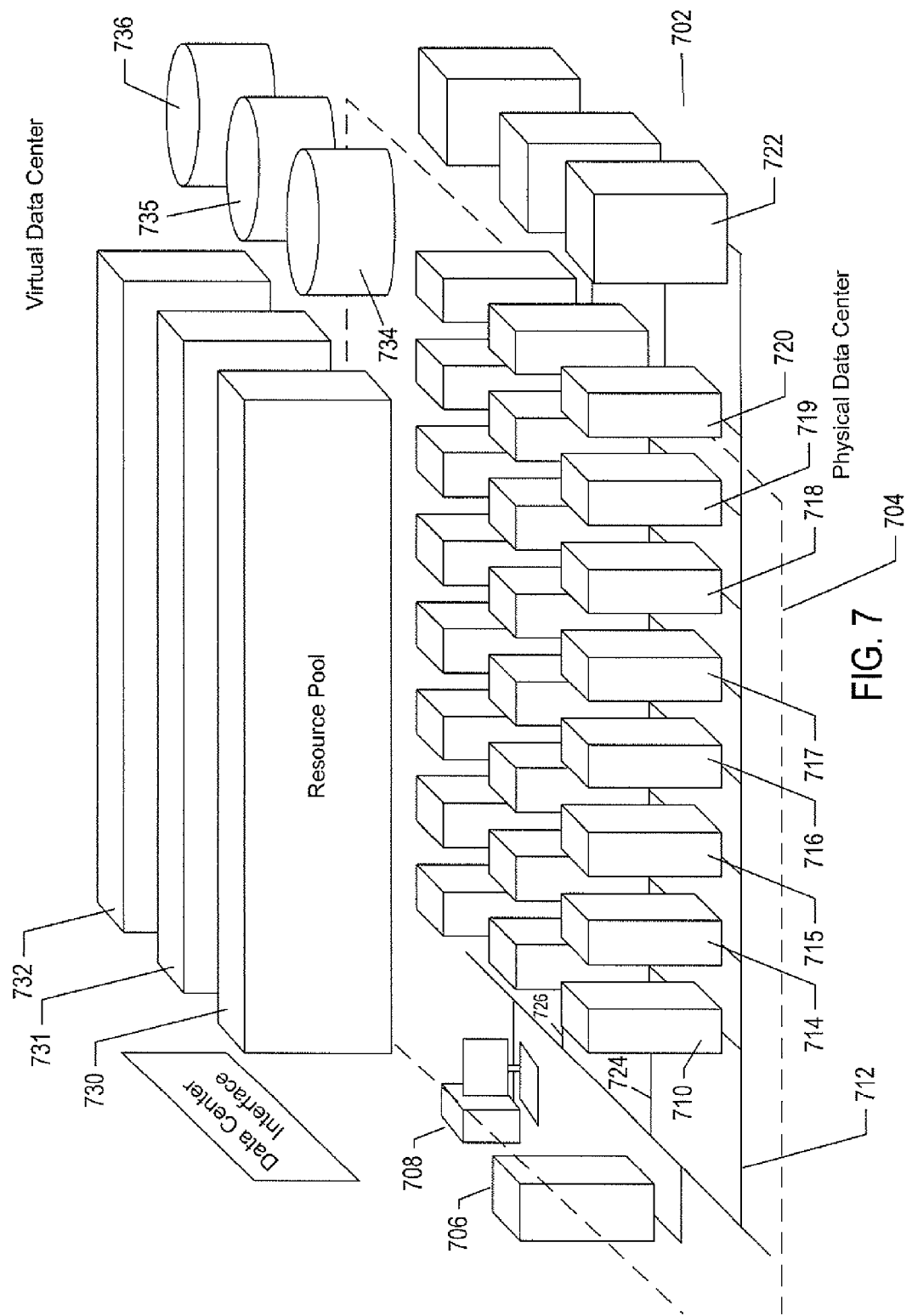
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the virtual-data-center management server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
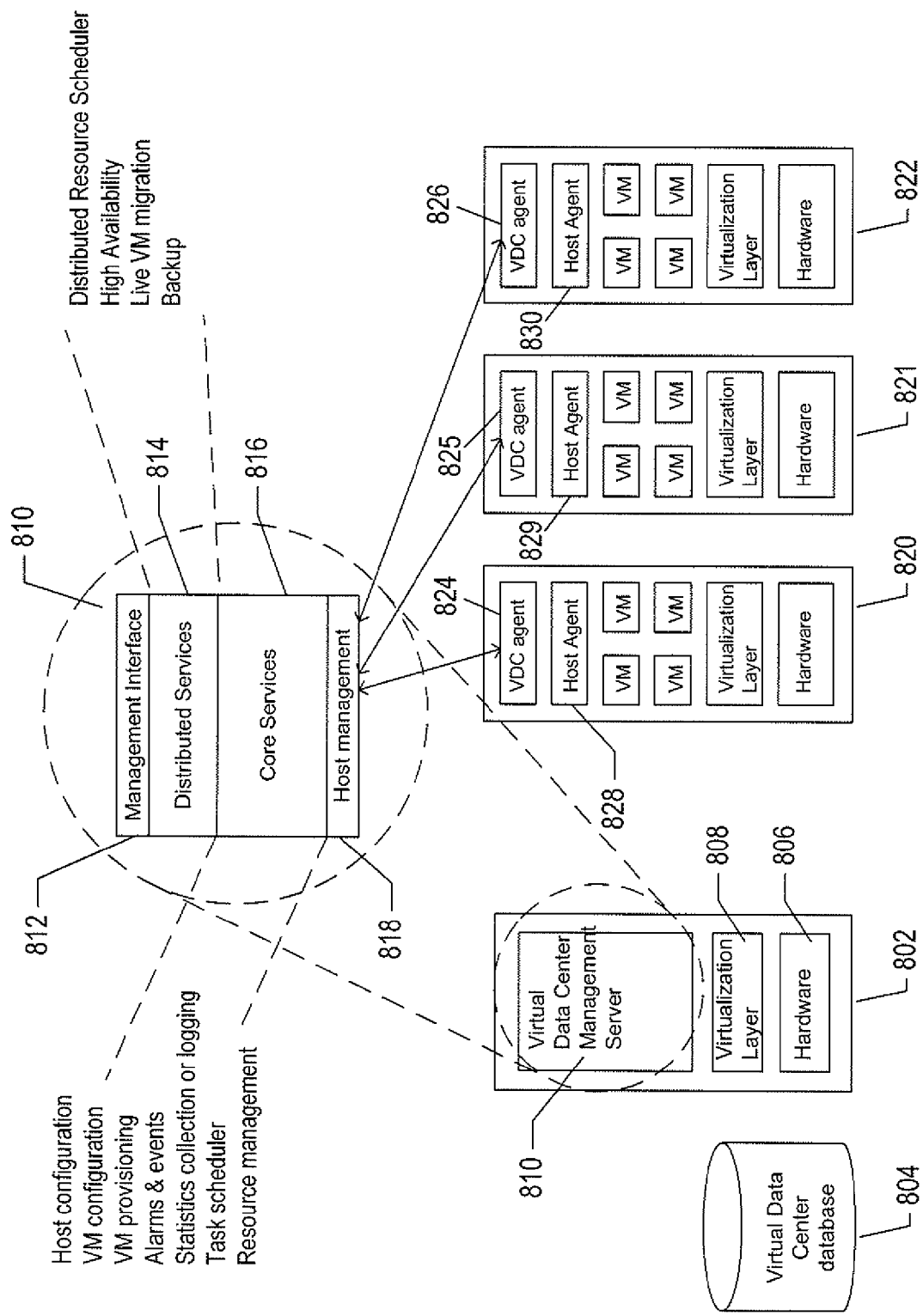
FIG. 8 illustrates virtual-machine components of a virtual-data-center management server and physical servers of a physical data center above which a virtual-data-center interface is provided by the virtual-data-center management server.

FIG. 8 illustrates virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server virtual machine 810 above the virtualization layer. Although shown as a single server in FIG. 8, the virtual-data-center management server ("VDC management server") may include two or more physical server computers that support multiple VDC-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VDC management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VDC management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VDC management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
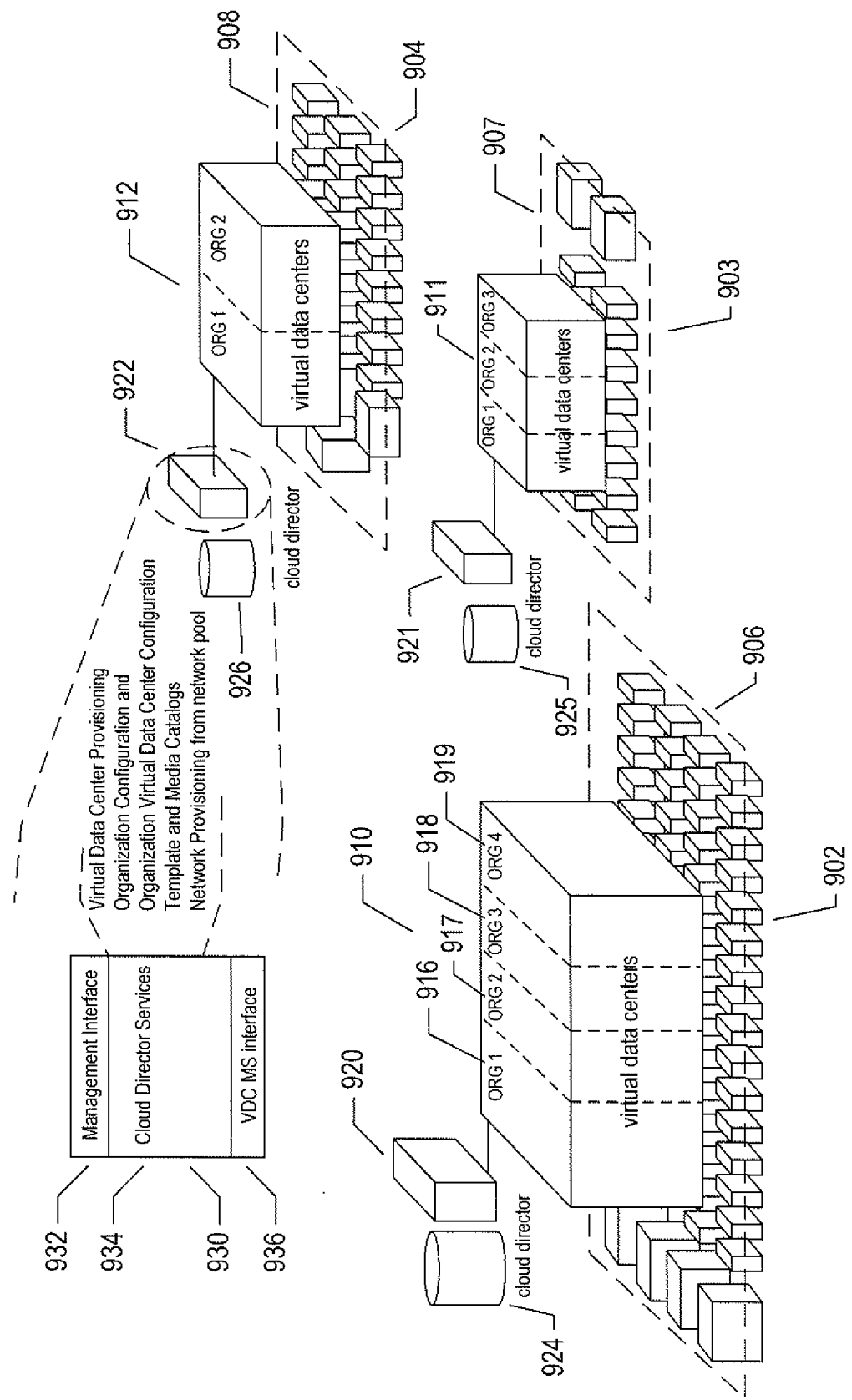
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities. The current document is directed to providing an additional layer of abstraction to facilitate aggregation of cloud-computing facilities.

Figure 10:
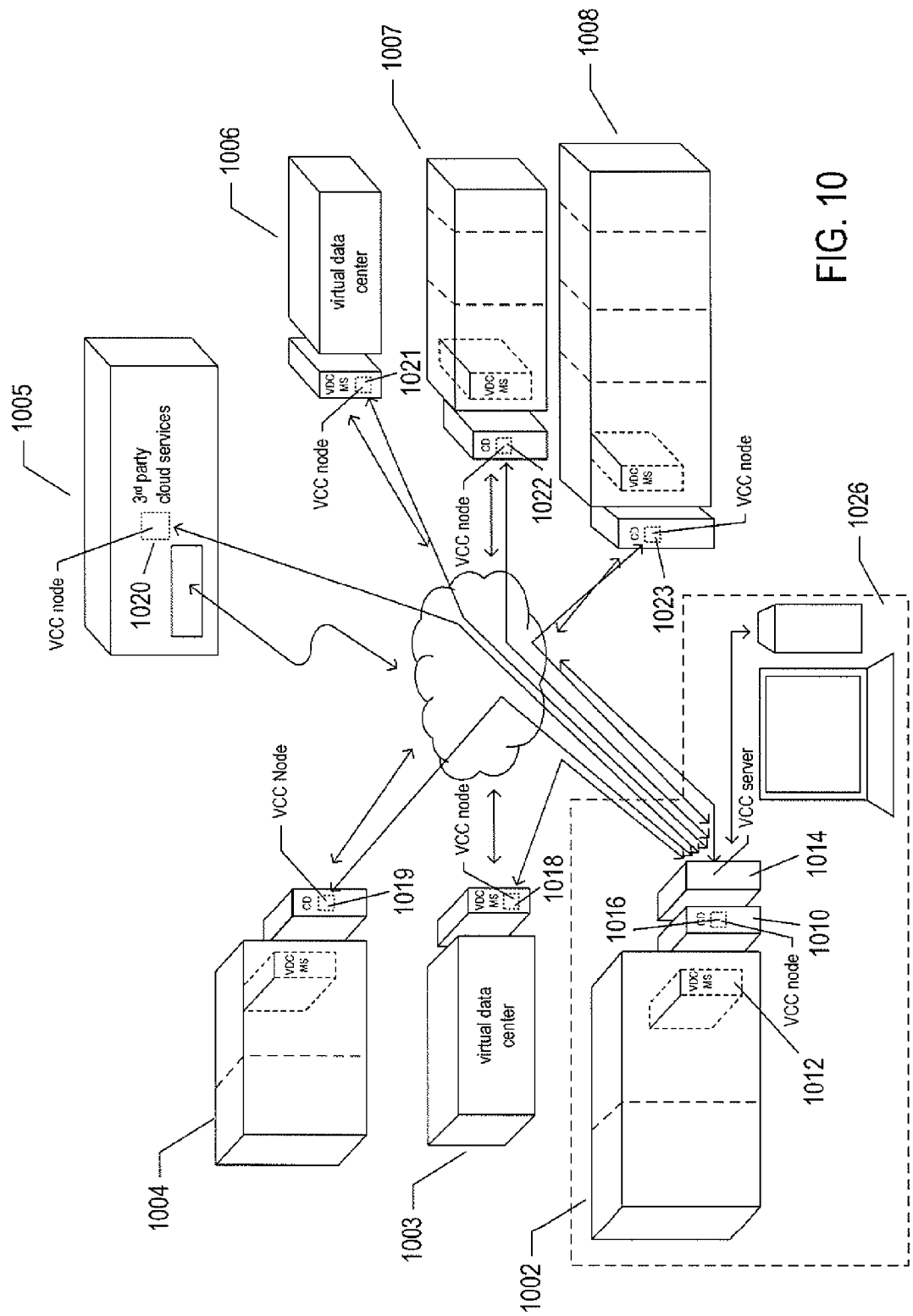
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. In FIG. 10, seven different cloud-computing facilities are illustrated 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Figure 11:
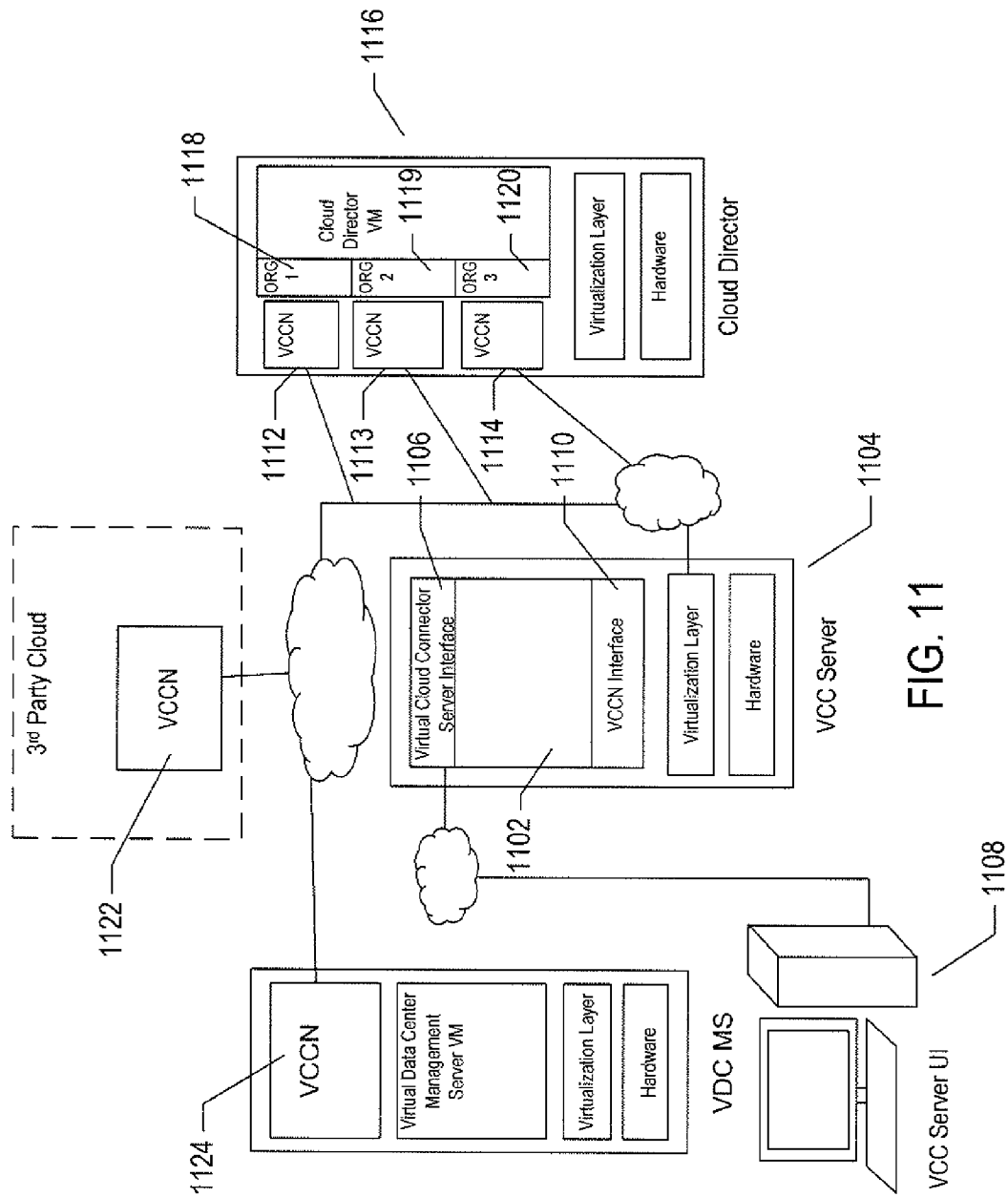
FIG. 11 illustrates the VCC server and VCC nodes in a slightly different fashion than the VCC server and VCC nodes are illustrated in FIG. 10.

FIG. 11 illustrates the VCC server and VCC nodes in a slightly different fashion than the VCC server and VCC nodes are illustrated in FIG. 10. In FIG. 11, the VCC server virtual machine 1102 is shown executing within a VCC server 1104, one or more physical servers located within a private cloud-computing facility. The VCC-server virtual machine includes a VCC-server interface 1106 through which a terminal, PC, or other computing device 1108 interfaces to the VCC server. The VCC server, upon request, displays a VCC-server user interface on the computing device 1108 to allow a cloud-aggregate administrator or other user to access VCC-server-provided functionality. The VCC-server virtual machine additionally includes a VCC-node interface 1108 through which the VCC server interfaces to VCC-node virtual appliances that execute within VDC management servers, cloud directors, and third-party cloud-computing facilities. As shown in FIG. 11, in one implementation, a VCC-node virtual machine is associated with each organization configured within and supported by a cloud director. Thus, VCC nodes 1112-1114 execute as virtual appliances within cloud director 1116 in association with organizations 1118-1120, respectively. FIG. 11 shows a VCC-node virtual machine 1122 executing within a third-party cloud-computing facility and a VCC-node virtual machine 1124 executing within a VDC management server. The VCC server, including the services provided by the VCC-server virtual machine 1102, in conjunction with the VCC-node virtual machines running within remote VDC management servers, cloud directors, and within third-party cloud-computing facilities, together provide functionality distributed among the cloud-computing-facility components of either heterogeneous or homogeneous cloud-computing aggregates.

Figure 12:
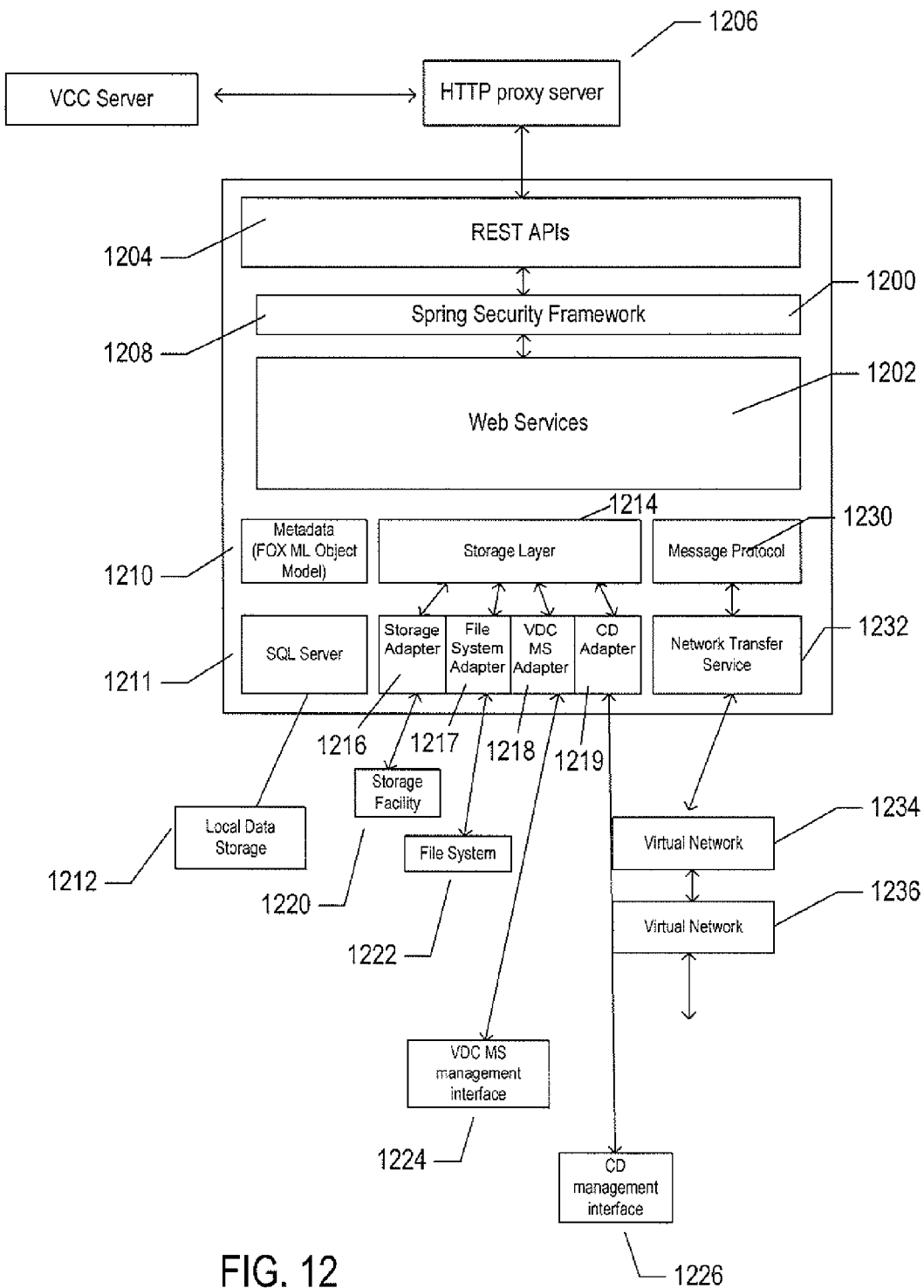
FIG. 12 illustrates one implementation of a VCC node.

FIG. 12 illustrates one implementation of a VCC node. The VCC node 1200 is a web service that executes within an Apache/Tomcat container that runs as a virtual appliance within a cloud director, VDC management server, or third-party cloud-computing server. The VCC node exposes web services 1202 to a remote VCC server via REST APIs accessed through the representational state transfer ("REST") protocol 1204 via a hypertext transfer protocol ("HTTP") proxy server 1206. The REST protocol uses HTTP requests to post data and requests for services, read data and receive service-generated responses, and delete data. The web services 1202 comprise a set of internal functions that are called to execute the REST APIs 1204. Authorization services are provided by a spring security layer 1208. The internal functions that implement the web services exposed by the REST APIs employ a metadata/object-store layer implemented using an SQL Server database 1210-1212, a storage layer 1214 with adapters 1216-1219 provides access to data stores 1220, file systems 1222, the virtual-data-center management-server management interface 1224, and the cloud-director management interface 1226. These adapters may additional include adapters to 3rd-party cloud management services, interfaces, and systems. The internal functions that implement the web services may also access a message protocol 1230 and network transfer services 1232 that allow for transfer of OVF packages and other files securely between VCC nodes via virtual networks 1234 that virtualize underlying physical networks 1236. The message protocol 1230 and network transfer services 1232 together provide for secure data transfer, multipart messaging, and checkpoint-restart data transfer that allows failed data transfers to be restarted from most recent checkpoints, rather than having to be entirely retransmitted.

Figure 13:
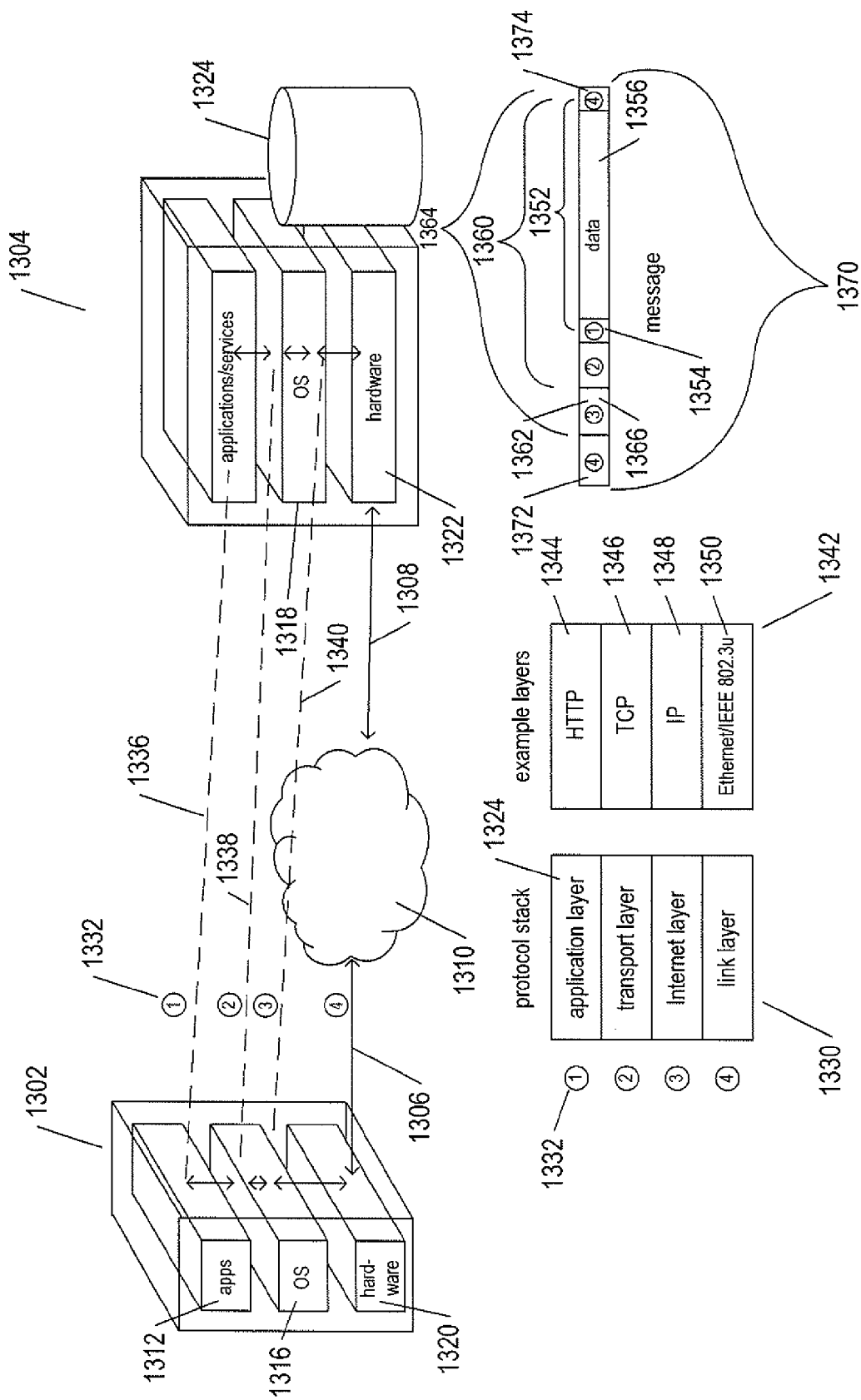
FIG. 13 illustrates electronic communications between a client and server computer.

FIG. 13 illustrates electronic communications between a client and server computer. The following discussion of FIG. 13 provides an overview of electronic communications. This is, however, a very large and complex subject area, a full discussion of which would likely run for many hundreds or thousands of pages. The following overview is provided as a basis for discussing the REST architecture, with reference to subsequent figures. In FIG. 13, a client computer 1302 is shown to be interconnected with a server computer 1304 via local communication links 1306 and 1308 and a complex distributed intermediary communications system 1310, such as the Internet. This complex communications system may include a large number of individual computer systems and many types of electronic communications media, including wide-area networks, public switched telephone networks, wireless communications, satellite communications, and many other types of electronics-communications systems and intermediate computer systems, routers, bridges, and other device and system components. Both the server and client computers are shown to include three basic internal layers including an applications layer 1312 in the client computer and a corresponding applications and services layer 1314 in the server computer, an operating-system layer 1316 and 1318, and a hardware layer 1320 and 1322. The server computer 1304 is additionally associated with an internal, peripheral, or remote data-storage subsystem 1324. The hardware layers 1320 and 1322 may include the components discussed above with reference to FIG. 1 as well as many additional hardware components and subsystems, such as power supplies, cooling fans, switches, auxiliary processors, and many other mechanical, electrical, electromechanical, and electro-optical-mechanical components. The operating system 1316 and 1318 represents the general control system of both a client computer 1302 and a server computer 1304. The operating system interfaces to the hardware layer through a set of registers that, under processor control, are used for transferring data, including commands and stored information, between the operating system and various hardware components. The operating system also provides a complex execution environment in which various application programs, including database management systems, web browsers, web services, and other application programs execute. In many cases, modern computer systems employ an additional layer between the operating system and the hardware layer, referred to as a "virtualization layer," that interacts directly with the hardware and provides a virtual-hardware-execution environment for one or more operating systems.

Client systems may include any of many types of processor-controlled devices, including tablet computers, laptop computers, mobile smart phones, and other such processor-controlled devices. These various types of clients may include only a subset of the components included in a desktop personal component as well components not generally included in desktop personal computers.

Electronic communications between computer systems generally comprises packets of information, referred to as datagrams, transferred from client computers to server computers and from server computers to client computers. In many cases, the communications between computer systems is commonly viewed from the relatively high level of an application program which uses an application-layer protocol for information transfer. However, the application-layer protocol is implemented on top of additional layers, including a transport layer, Internet layer, and link layer. These layers are commonly implemented at different levels within computer systems. Each layer is associated with a protocol for data transfer between corresponding layers of computer systems. These layers of protocols are commonly referred to as a "protocol stack." In FIG. 13, a representation of a common protocol stack 1330 is shown below the interconnected server and client computers 1304 and 1302. The layers are associated with layer numbers, such as layer number "1" 1332 associated with the application layer 1334. These same layer numbers are used in the depiction of the interconnection of the client computer 1302 with the server computer 1304, such as layer number "1" 1332 associated with a horizontal dashed line 1336 that represents interconnection of the application layer 1312 of the client computer with the applications/services layer 1314 of the server computer through an application-layer protocol. A dashed line 1336 represents interconnection via the application-layer protocol in FIG. 13, because this interconnection is logical, rather than physical. Dashed-line 1338 represents the logical interconnection of the operating-system layers of the client and server computers via a transport layer. Dashed line 1340 represents the logical interconnection of the operating systems of the two computer systems via an Internet-layer protocol. Finally, links 1306 and 1308 and cloud 1310 together represent the physical communications media and components that physically transfer data from the client computer to the server computer and from the server computer to the client computer. These physical communications components and media transfer data according to a link-layer protocol. In FIG. 13, a second table 1342 aligned with the table 1330 that illustrates the protocol stack includes example protocols that may be used for each of the different protocol layers. The hypertext transfer protocol ("HTTP") may be used as the application-layer protocol 1344, the transmission control protocol ("TCP") 1346 may be used as the transport-layer protocol, the Internet protocol 1348 ("IP") may be used as the Internet-layer protocol, and, in the case of a computer system interconnected through a local Ethernet to the Internet, the Ethernet/IEEE 802.3u protocol 1350 may be used for transmitting and receiving information from the computer system to the complex communications components of the Internet. Within cloud 1310, which represents the Internet, many additional types of protocols may be used for transferring the data between the client computer and server computer.

Consider the sending of a message, via the HTTP protocol, from the client computer to the server computer. An application program generally makes a system call to the operating system and includes, in the system call, an indication of the recipient to whom the data is to be sent as well as a reference to a buffer that contains the data. The data and other information are packaged together into one or more HTTP datagrams, such as datagram 1352. The datagram may generally include a header 1354 as well as the data 1356, encoded as a sequence of bytes within a block of memory. The header 1354 is generally a record composed of multiple byte-encoded fields. The call by the application program to an application-layer system call is represented in FIG. 13 by solid vertical arrow 1358. The operating system employs a transport-layer protocol, such as TCP, to transfer one or more application-layer datagrams that together represent an application-layer message. In general, when the application-layer message exceeds some threshold number of bytes, the message is sent as two or more transport-layer messages. Each of the transport-layer messages 1360 includes a transport-layer-message header 1362 and an application-layer datagram 1352. The transport-layer header includes, among other things, sequence numbers that allow a series of application-layer datagrams to be reassembled into a single application-layer message. The transport-layer protocol is responsible for end-to-end message transfer independent of the underlying network and other communications subsystems, and is additionally concerned with error control, segmentation, as discussed above, flow control, congestion control, application addressing, and other aspects of reliable end-to-end message transfer. The transport-layer datagrams are then forwarded to the Internet layer via system calls within the operating system and are embedded within Internet-layer datagrams 1364, each including an Internet-layer header 1366 and a transport-layer datagram. The Internet layer of the protocol stack is concerned with sending datagrams across the potentially many different communications media and subsystems that together comprise the Internet. This involves routing of messages through the complex communications systems to the intended destination. The Internet layer is concerned with assigning unique addresses, known as "IP addresses," to both the sending computer and the destination computer for a message and routing the message through the Internet to the destination computer. Internet-layer datagrams are finally transferred, by the operating system, to communications hardware, such as a network-interface controller ("NIC") which embeds the Internet-layer datagram 1364 into a link-layer datagram 1370 that includes a link-layer header 1372 and generally includes a number of additional bytes 1374 appended to the end of the Internet-layer datagram. The link-layer header includes collision-control and error-control information as well as local-network addresses. The link-layer packet or datagram 1370 is a sequence of bytes that includes information introduced by each of the layers of the protocol stack as well as the actual data that is transferred from the source computer to the destination computer according to the application-layer protocol.

RESTful APIs

Figure 14:
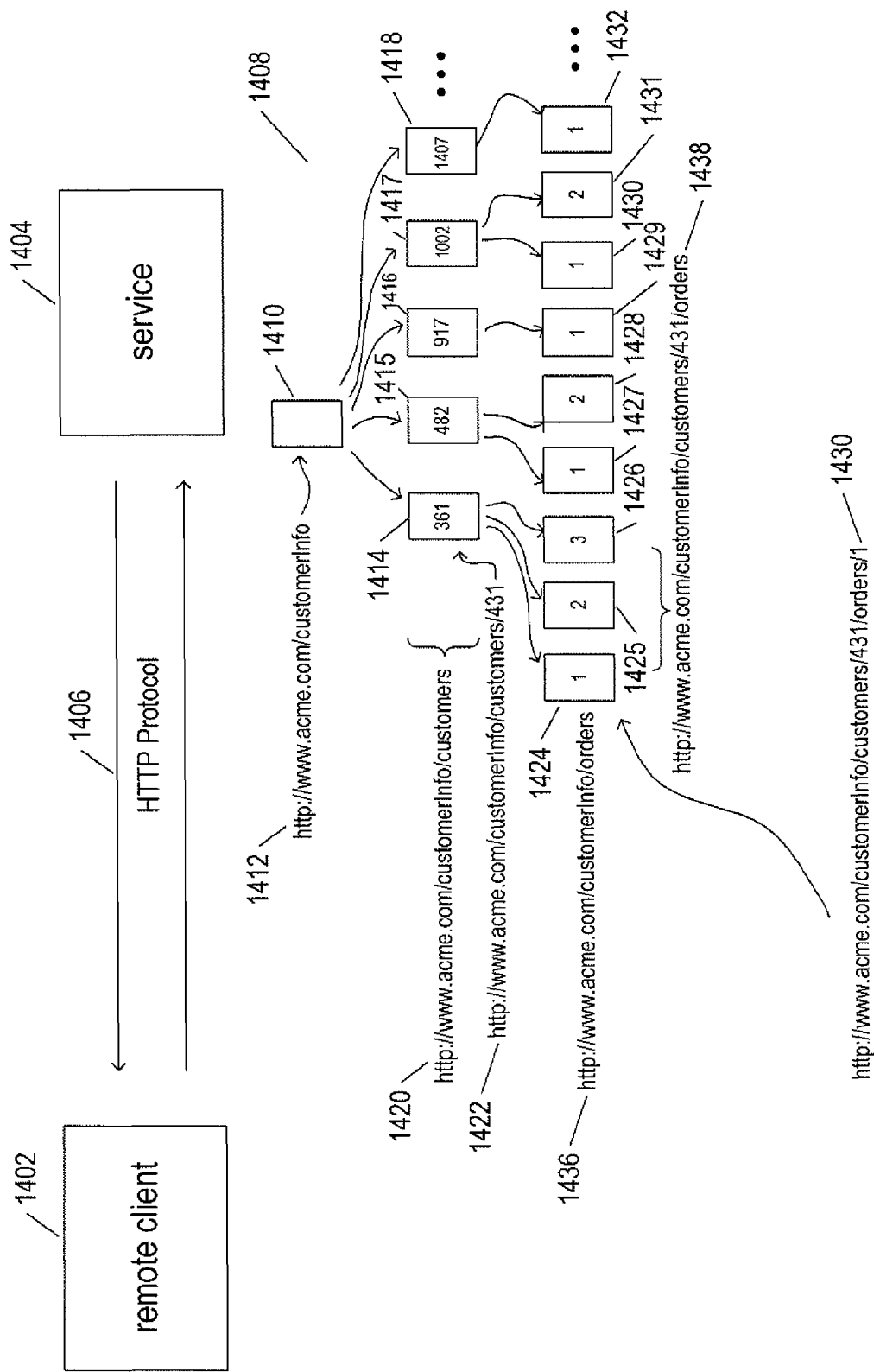
FIG. 14 illustrates the role of resources in RESTful APIs.

Next, the RESTful approach to web-service APIs is described, beginning with FIG. 14. FIG. 14 illustrates the role of resources in RESTful APIs. In FIG. 14, and in subsequent figures, a remote client 1402 is shown to be interconnected and communicating with a service provided by one or more service computers 1404 via the HTTP protocol 1406. Many RESTful APIs are based on the HTTP protocol. Thus, the focus is on the application layer in the following discussion. However, as discussed above with reference to FIG. 13, the remote client 1402 and service provided by one or more server computers 1404 are, in fact, physical systems with application, operating-system, and hardware layers that are interconnected with various types of communications media and communications subsystems, with the HTTP protocol the highest-level layer in a protocol stack implemented in the application, operating-system, and hardware layers of client computers and server computers. The service may be provided by one or more server computers, as discussed above in a preceding section. As one example, a number of servers may be hierarchically organized as various levels of intermediary servers and end-point servers. However, the entire collection of servers that together provide a service are addressed by a domain name included in a uniform resource identifier ("URI"), as further discussed below. A RESTful API is based on a small set of verbs, or operations, provided by the HTTP protocol and on resources, each uniquely identified by a corresponding URI. Resources are logical entities, information about which is stored on one or more servers that together comprise a domain. URIs are the unique names for resources. A resource about which information is stored on a server that is connected to the Internet has a unique URI that allows that information to be accessed by any client computer also connected to the Internet with proper authorization and privileges. URIs are thus globally unique identifiers, and can be used to specify resources on server computers throughout the world. A resource may be any logical entity, including people, digitally encoded documents, organizations, and other such entities that can be described and characterized by digitally encoded information. A resource is thus a logical entity. Digitally encoded information that describes the resource and that can be accessed by a client computer from a server computer is referred to as a "representation" of the corresponding resource. As one example, when a resource is a web page, the representation of the resource may be a hypertext markup language ("HTML") encoding of the resource. As another example, when the resource is an employee of a company, the representation of the resource may be one or more records, each containing one or more fields, that store information characterizing the employee, such as the employee's name, address, phone number, job title, employment history, and other such information.

In the example shown in FIG. 14, the web servers 1404 provides a RESTful API based on the HTTP protocol 1406 and a hierarchically organized set of resources 1408 that allow clients of the service to access information about the customers and orders placed by customers of the Acme Company. This service may be provided by the Acme Company itself or by a third-party information provider. All of the customer and order information is collectively represented by a customer information resource 1410 associated with the URI "http://www.acme.com/customerInfo" 1412. As discussed further, below, this single URI and the HTTP protocol together provide sufficient information for a remote client computer to access any of the particular types of customer and order information stored and distributed by the service 1404. A customer information resource 1410 represents a large number of subordinate resources. These subordinate resources include, for each of the customers of the Acme Company, a customer resource, such as customer resource 1414. All of the customer resources 1414-1418 are collectively named or specified by the single URI "http://www.acme.com/customerInfo/customers" 1420. Individual customer resources, such as customer resource 1414, are associated with customer-identifier numbers and are each separately addressable by customer-resource-specific URIs, such as URI "http://www.acme.com/customerInfo/customers/361" 1422 which includes the customer identifier "361" for the customer represented by customer resource 1414. Each customer may be logically associated with one or more orders. For example, the customer represented by customer resource 1414 is associated with three different orders 1424-1426, each represented by an order resource. All of the orders are collectively specified or named by a single URI "http://www.acme.com/customerInfo/orders" 1436. All of the orders associated with the customer represented by resource 1414, orders represented by order resources 1424-1426, can be collectively specified by the URI "http://www.acme.com/customerInfo/customers/361/orders" 1438. A particular order, such as the order represented by order resource 1424, may be specified by a unique URI associated with that order, such as URI "http://www.acme.com/customerInfo/customers/361/orders/1" 1440, where the final "1" is an order number that specifies a particular order within the set of orders corresponding to the particular customer identified by the customer identifier "361."

In one sense, the URIs bear similarity to path names to files in file directories provided by computer operating systems. However, it should be appreciated that resources, unlike files, are logical entities rather than physical entities, such as the set of stored bytes that together compose a file within a computer system. When a file is accessed through a path name, a copy of a sequence of bytes that are stored in a memory or mass-storage device as a portion of that file are transferred to an accessing entity. By contrast, when a resource is accessed through a URI, a server computer returns a digitally encoded representation of the resource, rather than a copy of the resource. For example, when the resource is a human being, the service accessed via a URI specifying the human being may return alphanumeric encodings of various characteristics of the human being, a digitally encoded photograph or photographs, and other such information. Unlike the case of a file accessed through a path name, the representation of a resource is not a copy of the resource, but is instead some type of digitally encoded information with respect to the resource.

In the example RESTful API illustrated in FIG. 14, a client computer can use the verbs, or operations, of the HTTP protocol and the top-level URI 1412 to navigate the entire hierarchy of resources 1408 in order to obtain information about particular customers and about the orders that have been placed by particular customers.

FIGS. 15A-D illustrate four basic verbs, or operations, provided by the HTTP application-layer protocol used in RESTful applications. RESTful applications are client/server protocols in which a client issues an HTTP request message to a service or server and the service or server responds by returning a corresponding HTTP response message. FIGS. 15A-D use the illustration conventions discussed above with reference to FIG. 14 with regard to the client, service, and HTTP protocol. For simplicity and clarity of illustration, in each of these figures, a top portion illustrates the request and a lower portion illustrates the response. The remote client 1502 and service 1504 are shown as labeled rectangles, as in FIG. 14. A right-pointing solid arrow 1506 represents sending of an HTTP request message from a remote client to the service and a left-pointing solid arrow 1508 represents sending of a response message corresponding to the request message by the service to the remote client. For clarity and simplicity of illustration, the service 1504 is shown associated with a few resources 1510-1512.

Figure 15A:
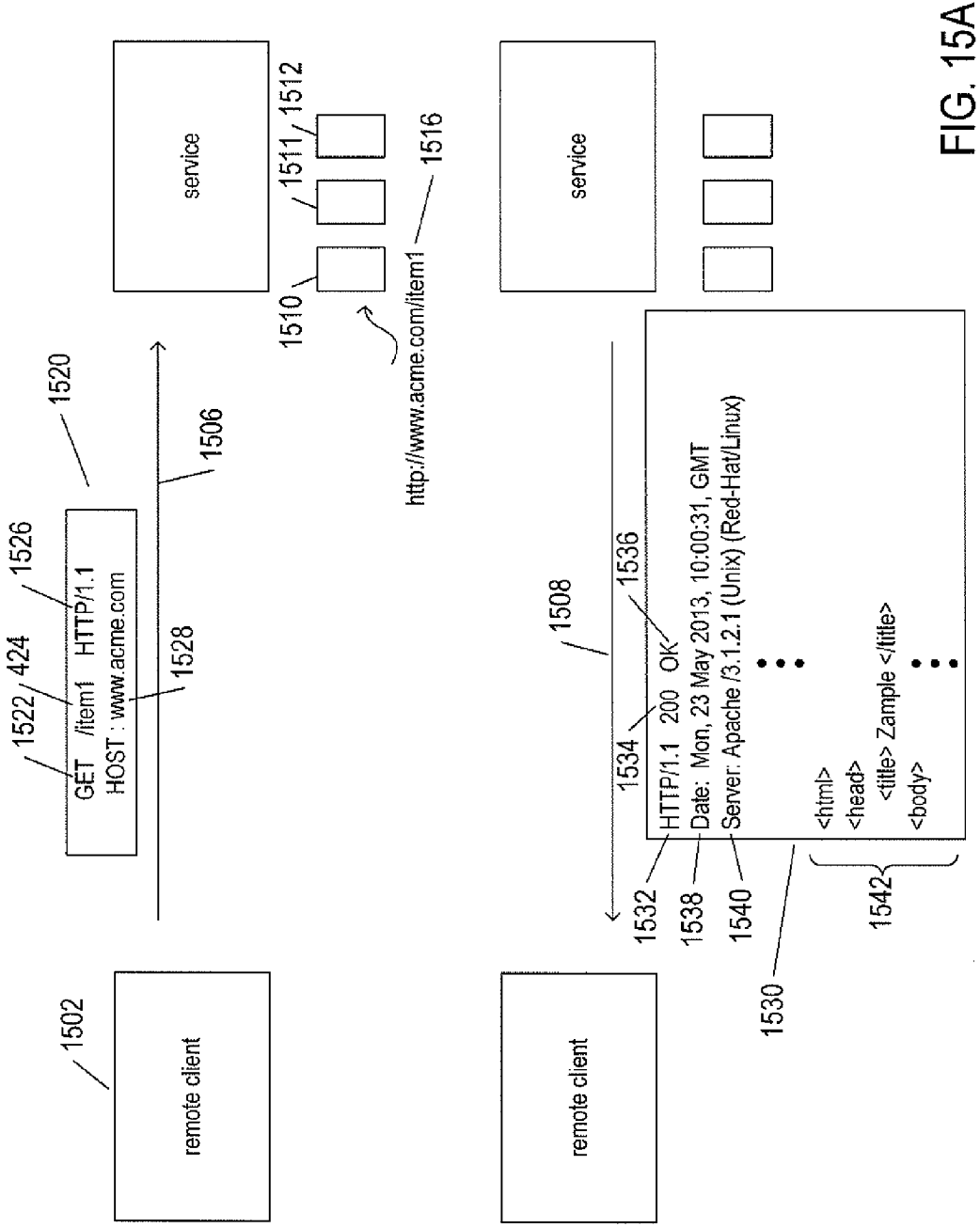
FIGS. 15A-D illustrate four basic verbs, or operations, provided by the HTTP application-layer protocol used in RESTful applications.

FIG. 15A illustrates the GET request and a typical response. The GET request requests the representation of a resource identified by a URI from a service. In the example shown in FIG. 15A, the resource 1510 is uniquely identified by the URI "http://www.acme.com/item1" 1516. The initial substring "http://www.acme.com" is a domain name that identifies the service. Thus, URI 1516 can be thought of as specifying the resource "item1" that is located within and managed by the domain "www.acme.com." The GET request 1520 includes the command "GET" 1522, a relative resource identifier 1524 that, when appended to the domain name, generates the URI that uniquely identifies the resource, and in an indication of the particular underlying application-layer protocol 1526. A request message may include one or more headers, or key/value pairs, such as the host header 1528 "Host:www.acme.com" that indicates the domain to which the request is directed. There are many different headers that may be included. In addition, a request message may also include a request-message body. The body may be encoded in any of various different self-describing encoding languages, often JSON, XML, or HTML. In the current example, there is no request-message body. The service receives the request message containing the GET command, processes the message, and returns a corresponding response message 1530. The response message includes an indication of the application-layer protocol 1532, a numeric status 1534, a textural status 1536, various headers 1538 and 1540, and, in the current example, a body 1542 that includes the HTML encoding of a web page. Again, however, the body may contain any of many different types of information, such as a JSON object that encodes a personnel file, customer description, or order description. GET is the most fundamental and generally most often used verb, or function, of the HTTP protocol.

Figure 15B:
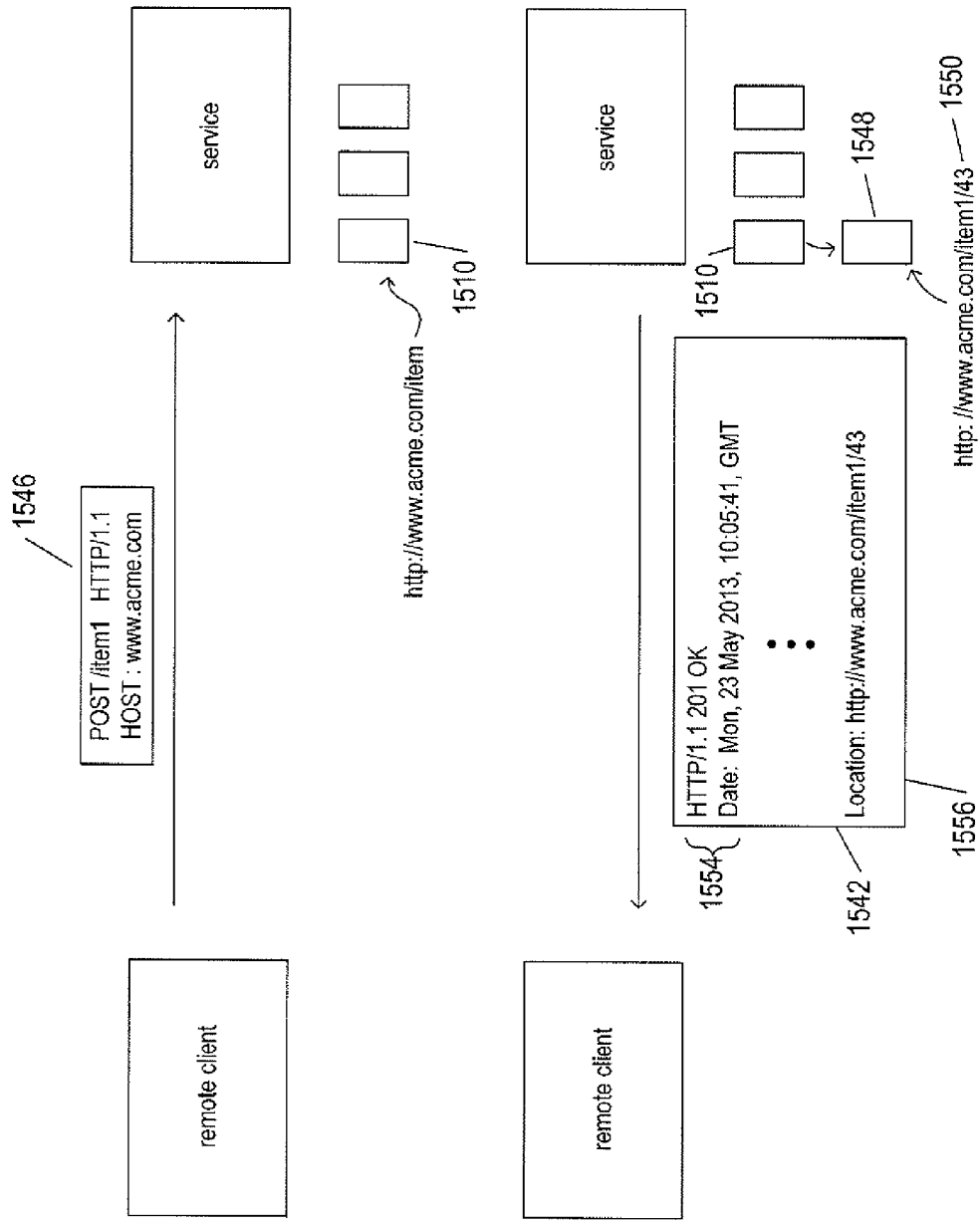

FIG. 15B illustrates the POST HTTP verb. In FIG. 15B, the client sends a POST request 1546 to the service that is associated with the URI "http://www.acme.com/item1." In many RESTful APIs, a POST request message requests that the service create a new resource subordinate to the URI associated with the POST request and provide a name and corresponding URI for the newly created resource. Thus, as shown in FIG. 15B, the service creates a new resource 1548 subordinate to resource 1510 specified by URI "http://www.acme.com/item1," and assigns an identifier "36" to this new resource, creating for the new resource the unique URI "http://www.acme.com/item1/36" 1550. The service then transmits a response message 1552 corresponding to the POST request back to the remote client. In addition to the application-layer protocol, status, and headers 1554, the response message includes a location header 1556 with the URI of the newly created resource. According to the HTTP protocol, the POST verb may also be used to update existing resources by including a body with update information. However, RESTful APIs generally use POST for creation of new resources when the names for the new resources are determined by the service. The POST request 1546 may include a body containing a representation or partial representation of the resource that may be incorporated into stored information for the resource by the service.

Figure 15C:
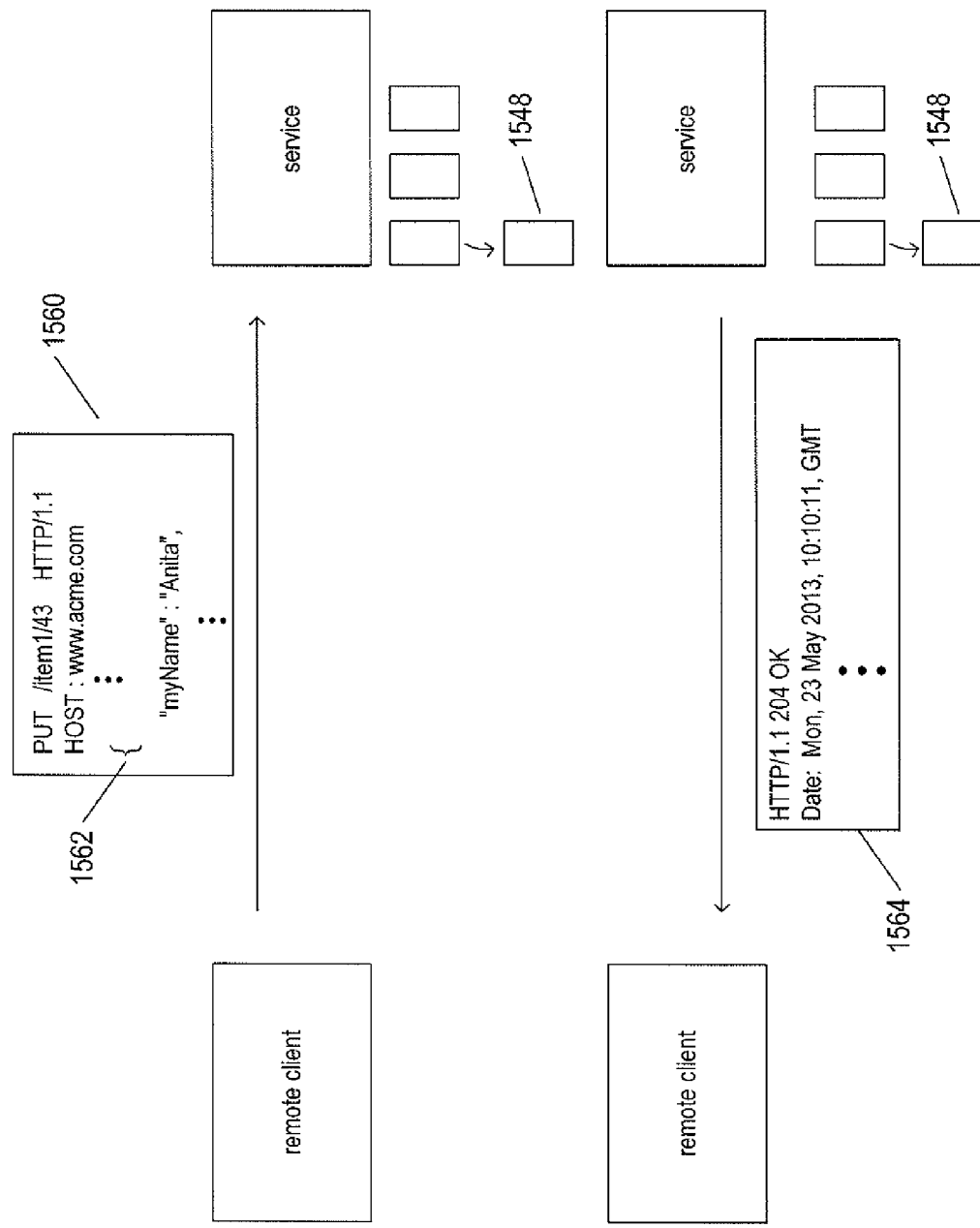

FIG. 15C illustrates the PUT HTTP verb. In RESTful APIs, the PUT HTTP verb is generally used for updating existing resources or for creating new resources when the name for the new resources is determined by the client, rather than the service. In the example shown in FIG. 15C, the remote client issues a PUT HTTP request 1560 with respect to the URI "http://www.acme.com/item1/36" that names the newly created resource 1548. The PUT request message includes a body with a JSON encoding of a representation or partial representation of the resource 1562. In response to receiving this request, the service updates resource 1548 to include the information 1562 transmitted in the PUT request and then returns a response corresponding to the PUT request 1564 to the remote client.

Figure 15D:
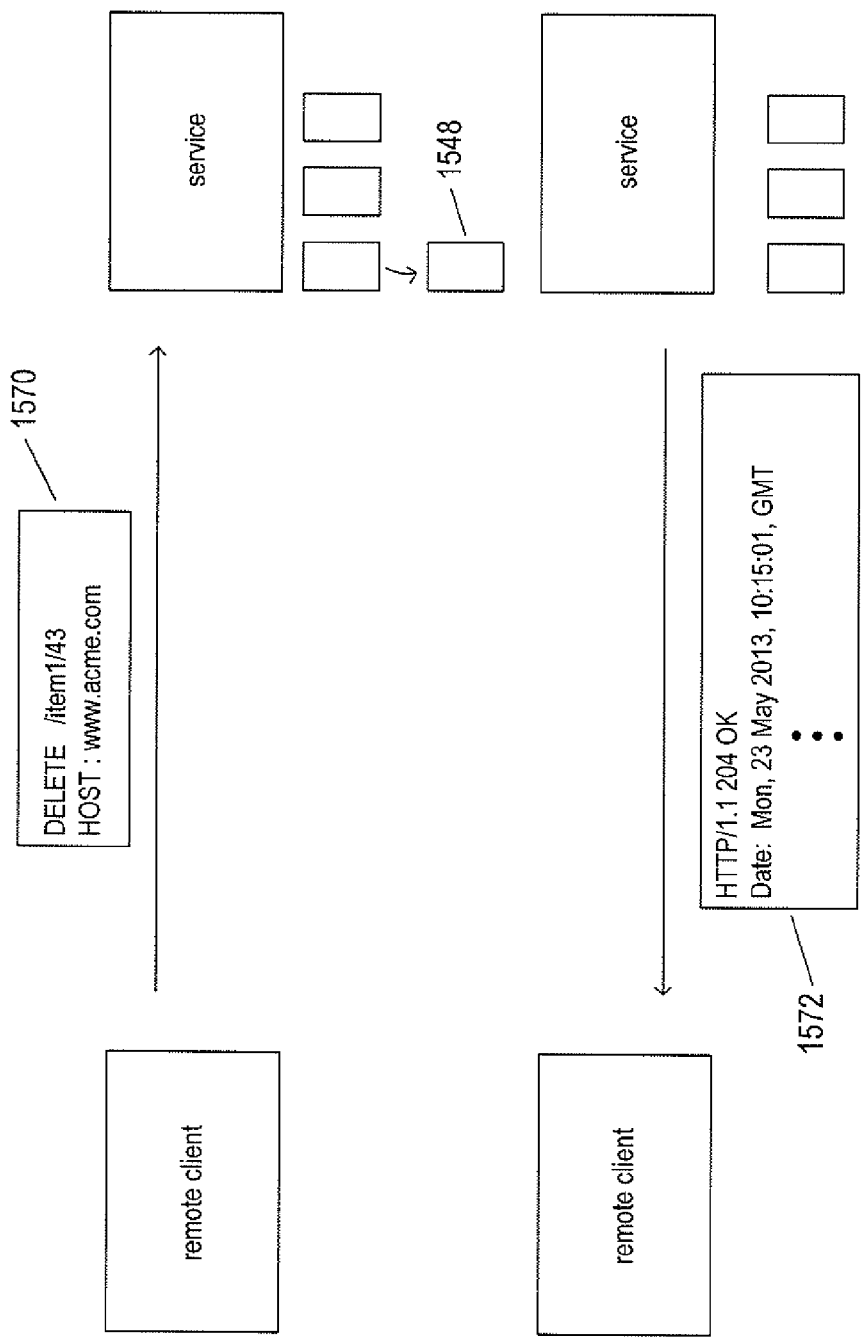

FIG. 15D illustrates the DELETE HTTP verb. In the example shown in FIG. 15D, the remote client transmits a DELETE HTTP request 1570 with respect to URI "http://www.acme.com/item1/36" that uniquely specifies newly created resource 1548 to the service. In response, the service deletes the resource associated with the URL and returns a response message 1572.

As further discussed below, and as mentioned above, a service may return, in response messages, various different links, or URIs, in addition to a resource representation. These links may indicate, to the client, additional resources related in various different ways to the resource specified by the URI associated with the corresponding request message. As one example, when the information returned to a client in response to a request is too large for a single HTTP response message, it may be divided into pages, with the first page returned along with additional links, or URIs, that allow the client to retrieve the remaining pages using additional GET requests. As another example, in response to an initial GET request for the customer info resource (1410 in FIG. 14), the service may provide URIs 1420 and 1436 in addition to a requested representation to the client, using which the client may begin to traverse the hierarchical resource organization in subsequent GET requests.

Figure 16A:
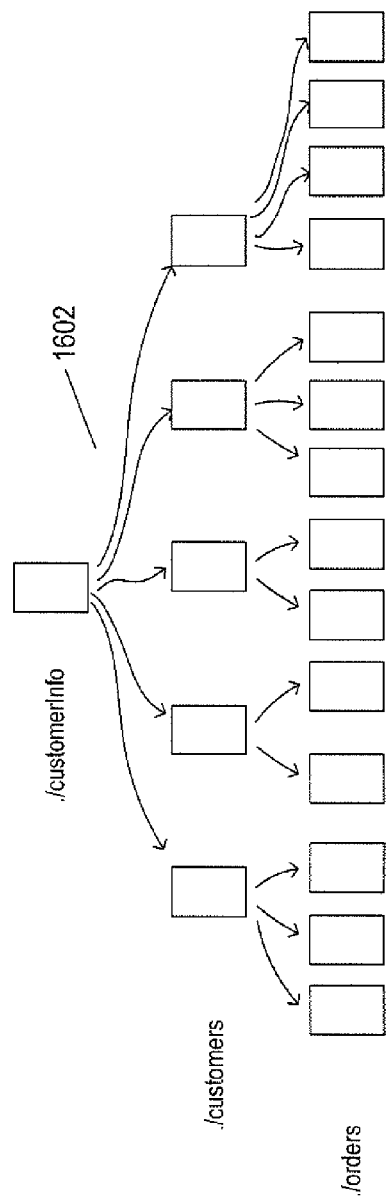
FIGS. 16A-B illustrate extension of the simple RESTful API discussed above with reference to FIGS. 14 and 15A-B.
Figure 16B:
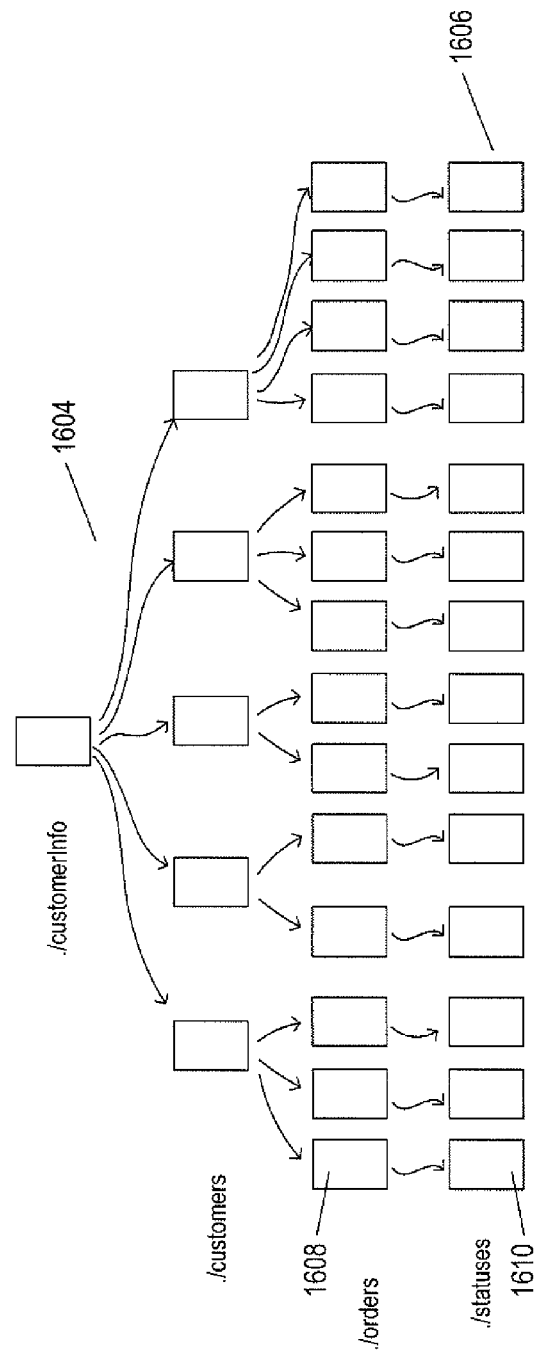

Returning of hyperlinks, or additional URIs, by a service to a client can also be used to dynamically extend an initial API. FIGS. 16A-B illustrate extension of the simple RESTful API discussed above with reference to FIGS. 14 and 15A-D. FIG. 16A illustrates the hierarchical organization of resources in the initial RESTful API 502. FIG. 16B illustrates an extended RESTful API 1604. The extension involves adding an additional set of resources, at the lowest hierarchical level 1606, that represent the status of orders. Thus, each order resource, such as order resource 1608, is now associated with a corresponding status resource 1610. This RESTful API extension may be undertaken by the service or may be undertaken by an appropriately authorized client. However, in either case, once the extension is carried out, the service needs to inform clients unaware that the extension has occurred of the availability of additional information. This can be accomplished by including additional links in responses.

Figure 17:
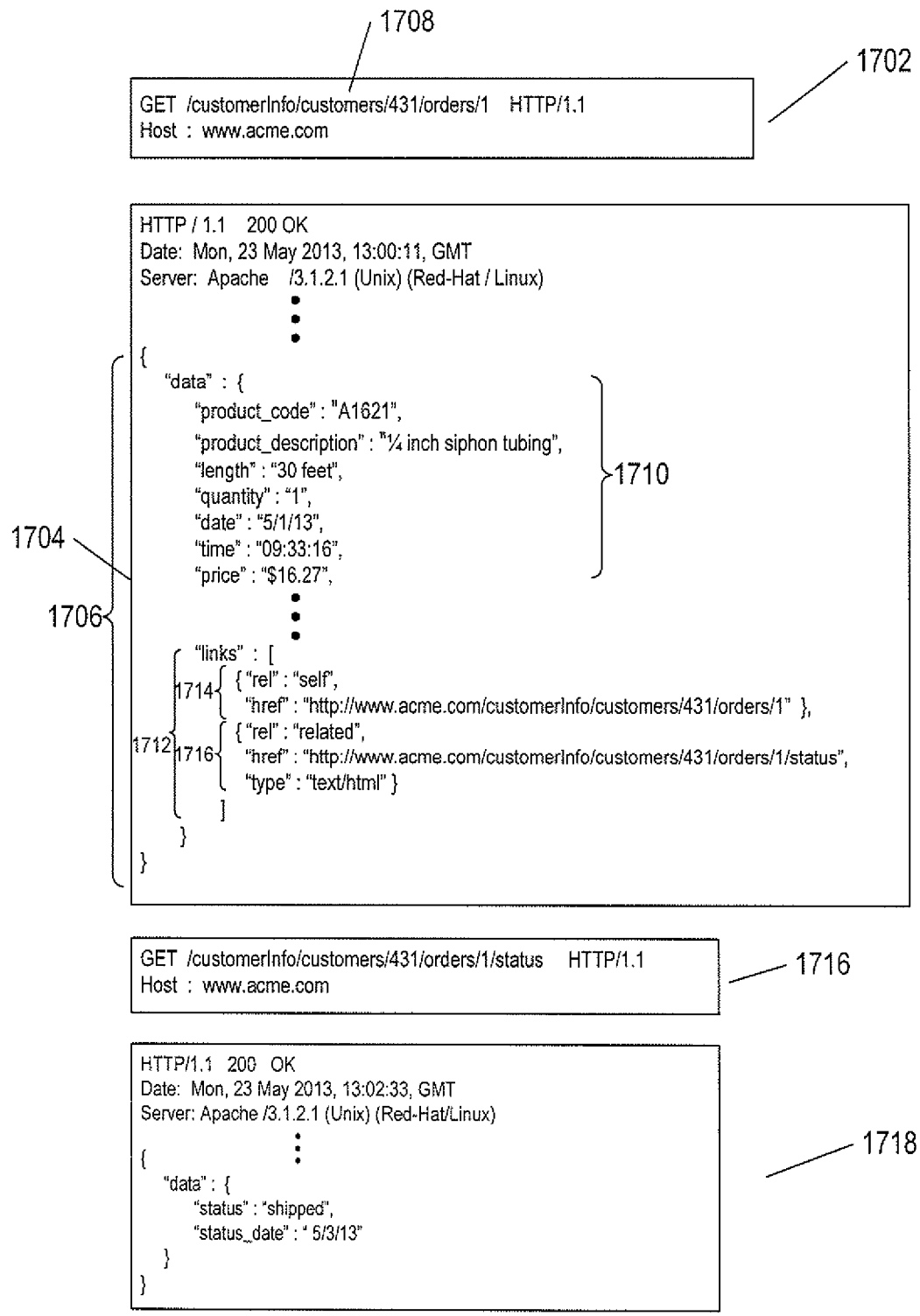
FIG. 17 illustrates the use of additional links and responses in order to inform a client of newly available resources as a result of extension of a RESTful API.

FIG. 17 illustrates the use of additional links and responses in order to inform a client of newly available resources as a result of extension of a RESTful API. A client unaware of the extension may request information about an order using a GET request 1702. In response, the service transmits the response message 1704 back to the client. The body of the response message 1706 is encoded in JSON. It includes a data object with numerous key/value pairs that describe or provide a representation for the order specified by the URI 1708 contained in the GET request. These key/value pairs 1710 provide a product code, product description, and other such information. In addition, the data object includes a links object 1712 that includes several links 1714 and 1716. The first link 1714 is a self link, referring back to the original URI 1708 included in the GET request. The second link 1716 is a related link to the self link and is the URI for the new status resource associated with the order specified by the URI 1708. Using this link, the client can then submit a second GET request 1717 to the service in order to obtain the status information for the order, which is returned in a second response message 1718 by the service. Thus, the use of additional links, or hyperlinks, in the body of responses to GET requests can inform clients of RESTful API extensions. A server can add any of many different types of additional links to facilitate extension of APIs and to facilitate navigation, via subsequent GET requests, carried out by clients as they traverse the hierarchically organized resources available through the API.

Figure 18A:
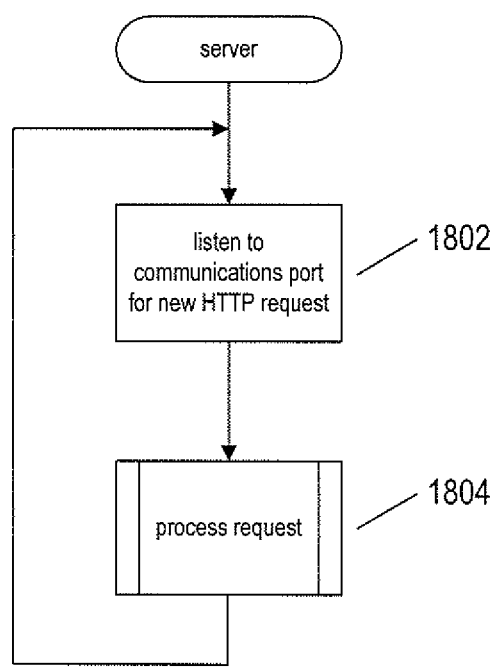
FIGS. 18A-C illustrate the type of functionality present within a server that handles requests, including GET requests from clients.
Figure 18B:
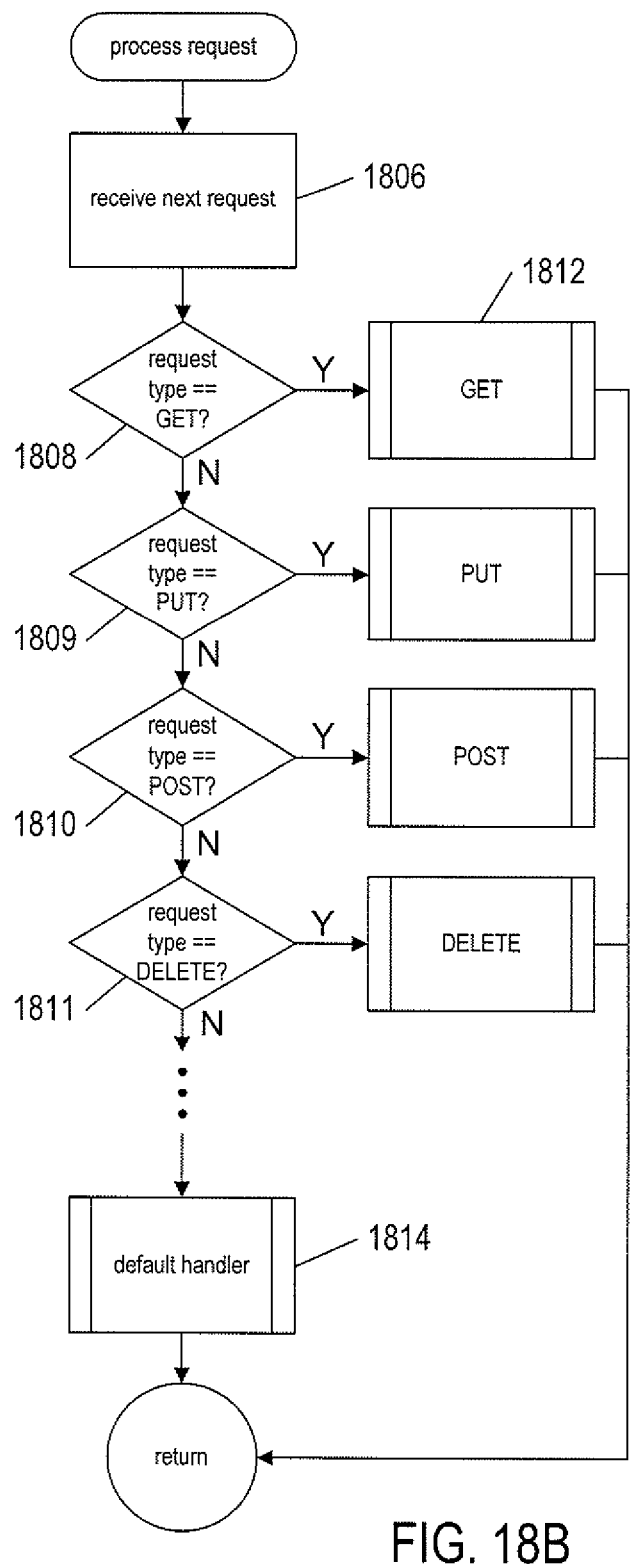
Figure 18C:
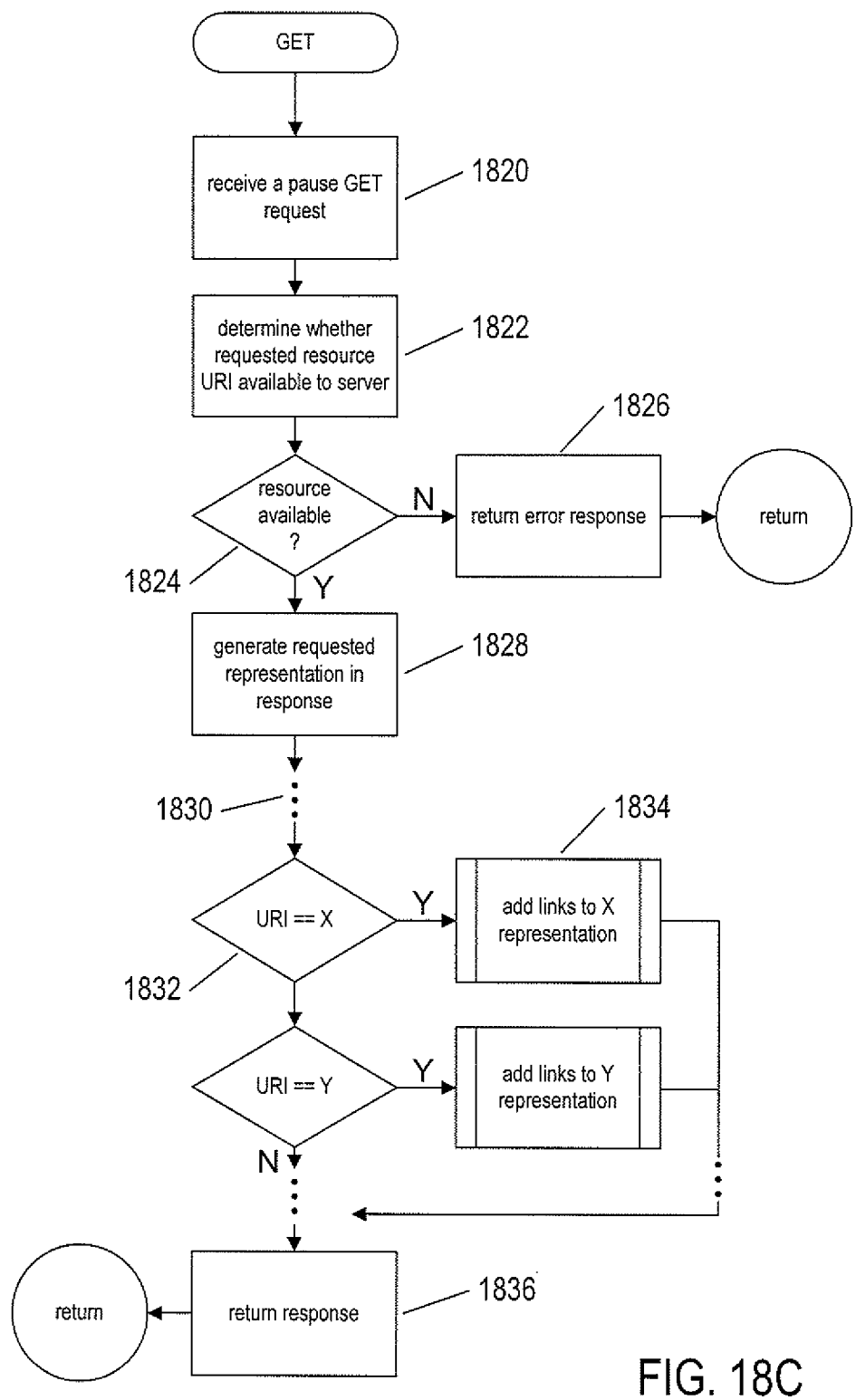

FIGS. 18A-C illustrate the type of functionality present within a server that handles requests, including GET requests from clients. FIG. 18A illustrates a listener process within a server that receives HTTP requests through a communications port provided by a protocol stack, such as the protocol stack 1330 shown in FIG. 13. A server may employ numerous listener processes to listen for HTTP requests through one or more ports and dispatch the requests for servicing. In FIG. 18A, the process listens to a communications port for a new HTTP request, in step 1802 and, when a request becomes available, processes the request in step 1804 by calling a routine "process request." The processing may be undertaken by the listener process or by another process notified by the listener process to dequeue the next request from a memory queue.

FIG. 18B illustrates the "process request" routine called in step 1804 in FIG. 18A. The request is received, either as a reference or as a result of dequeuing the process from a memory queue, by the routine "processRequest" in step 1806. Then, in a series of conditional steps, including steps 1808-1811, the routine determines, in a sequence of conditional steps, whether or not the type of request is one of a number of different HTTP request types and, upon determining the request type is equal to a particular request type, calls an appropriate routine to handle the request. For example, when the request type is GET, as determined in step 1808, then the routine "processRequest" calls a "GET" routine, in step 1812, to process the GET request. The routine "processRequest" may additionally include a default handler, shown as step 1814 in FIG. 18B, when the routine fails to determine the type of request or encounters any of various errors.

FIG. 18C illustrates a partial implementation of the "GET" routine called in step 1812 of FIG. 18B. In step 1820, the routine "GET" receives and parses a GET request provided to the routine via a reference or copy argument. In step 1822, the routine "GET" determines whether or not the requested resource, specified by the URI included in the GET request, is available. When, as determined in step 1824, the resource is not available, the "GET" routine, in step 1826, prepares and returns an error response to the requesting client. Otherwise, in step 1828, the routine "GET" generates a representation of the requested resource within a response message corresponding to the GET request. Ellipses 1830 indicate that additional steps may be executed in order to process a GET request and complete the corresponding response message. In the case that the initial API has been extended, as discussed above with reference to FIGS. 16A-B and 17, the "GET" routine may undertake the addition of links to the response message. As shown in FIG. 18C, as an example, the "GET" routine includes additional conditional steps, such as conditional step 1832, in which the "GET" routine determines whether or not the URI of the requested resource is equal to a particular value, with the particular values indicated by symbols "X" and "Y" in FIG. 18C, and, when the URI is equal to the particular URI, the "GET" routine then adds one or more links to the response message appropriate for a GET request that has requested the representation of the particular resource. For example, in FIG. 18C, when the URI for the requested resource equals a value X, as determined in step 1832, the "GET" routine calls an additional routine in step 1834 to add one or more links to the response message appropriate for a GET request directed to the URI. Thus, in the example of FIGS. 16A-B, a GET request for a particular order may result in a call to a routine to add a link to the status resource associated with the order to the response message. Finally, in step 1836, a completed response message is returned by the routine "GET."

As can be appreciated from the high-level control-flow diagram 18A-C, in the approach illustrated in these figures, the server bears a rather significant processing burden with respect to the extension of an API. Extension of the API based on the resources shown in FIG. 16A, for example, to the resources shown in FIG. 16B may require significant specialized control logic, such as a series of conditionals and routine calls similar to step 1832 and 1834 in FIG. 18C, in order to provide links to the new status resources in response messages corresponding to GET requests for orders. Should the server wish to add additional links to GET requests for the collection of orders, then even greater computational and development burdens would ensue. Although it may be possible to write somewhat more generic logic for handling the simple extension illustrated in FIGS. 16A-B, the somewhat more generic logic would still require significant development efforts. For a more complex API featuring significantly more types of resources and more resources of particular types, the computational and development burdens may become significant and even prohibitive. Were clients to extend the API, through PUT requests, then an even more complex distributed effort would be needed to enable clients to alter server logic for processing requests and adding additional related links to request responses.

Figure 19A:
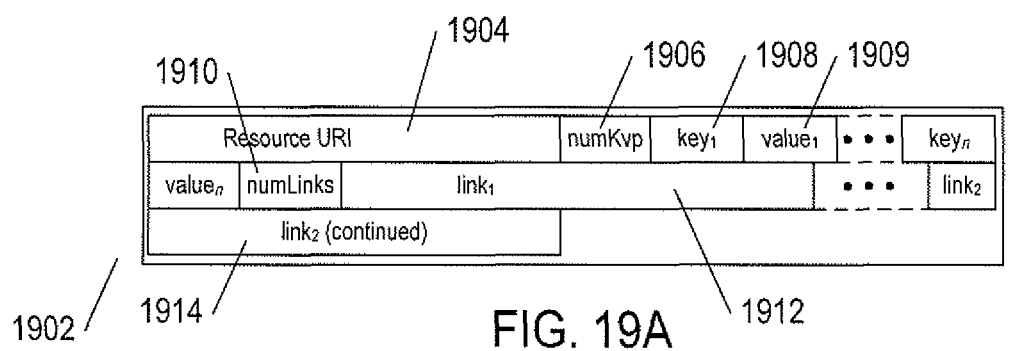
FIGS. 19A-B illustrate an example link registry.
Figure 19B:
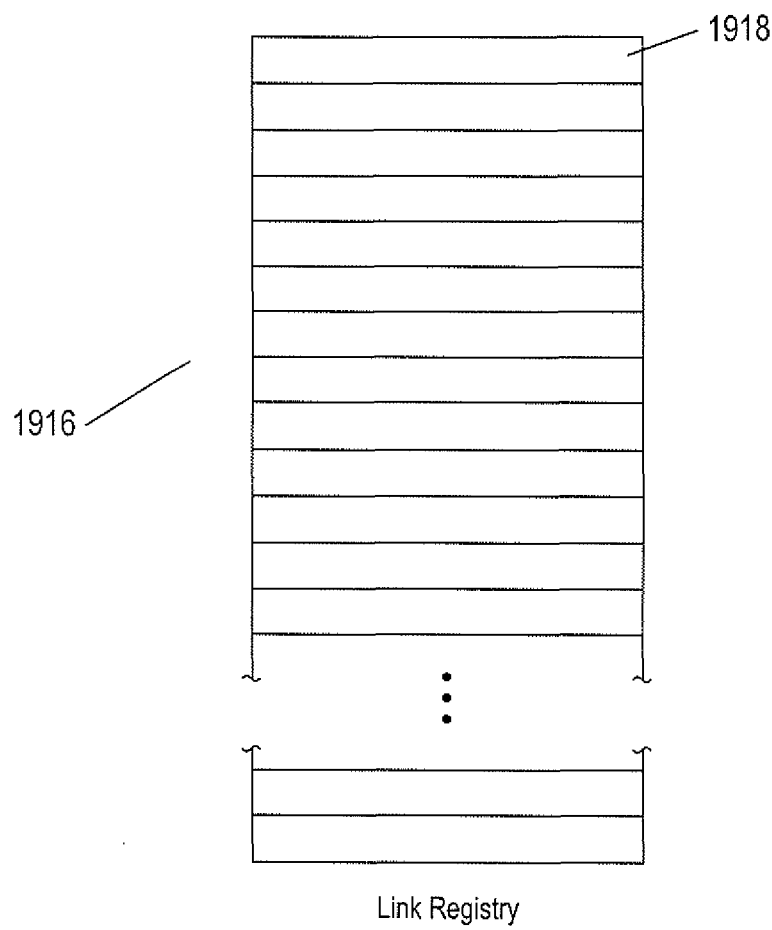

The a new approach for extending RESTful APIs without incurring significant computational and development overheads, as discussed above with reference to FIG. 18C, is next discussed. The approach uses a link registry. The link registry is a collection of link-registry entries, each of which represents additional links added to response messages corresponding to request messages directed to a particular resource. FIGS. 19A-B illustrate an example link registry. FIG. 19A illustrates one implementation of a link-registry entry. The link-registry entry 1902 is a variable-length record that includes numerous fields. In example link-registry entry 1902, these fields include: (1) ResourceURI 1904, a field containing a symbol-string representation of the URI to which a request message may be directed; (2) numKvp 1906, the number of key/value pairs that follow this field; (3) a number of key/value field pairs 1908-1909 equal to the value in the field numKvp 1906, the key value pairs representing various types of conditions or constraints with respect to returning additional links, further discussed below; (4) numLinks 1910, a field indicating the number of links that follow this field; and (5) a number of link fields, such as fields 1912 and 1914, equal to the value stored in the numLinks field 1910, each link field storing a representation of a link to be added to the response message, such as the related link 1716 in FIG. 17. Note that each link may include multiple key/value pairs, such as the three key/value pairs included in link 1716.

FIG. 19B illustrates the link registry. The link registry is a set of links 1916, with each cell in the column array 1916, such as cell 1918, representing a link-registry entry, such as link-registry entry 1902 shown in FIG. 19A. The link registry may be implemented in many different ways. For example, the link entries may be rows in a relational database table that is stored and managed by a relational database management system. Alternatively, the link-registry entries may be stored in files associated with various types of indexes to allow for efficient location of particular link-registry entries. The link-registry entries may also be sorted with respect to the values of one or more of the fields.

A link-registry entry may be represented in JSON. FIG. 20 illustrates a JSON encoding of a particular link-registry entry. Key/value pairs are used, in the JSON representation, to represent the various fields and values stored in the fields. For example, the Resource URI field (1904 in FIG. 19) is represented by key "ResourceURI" 2002 and a particular symbol-string representation of a particular URI 2004. Similarly, the numKvp field (1906 in FIG. 19A) is represented by key 2006 and value 2008.

Figure 21:
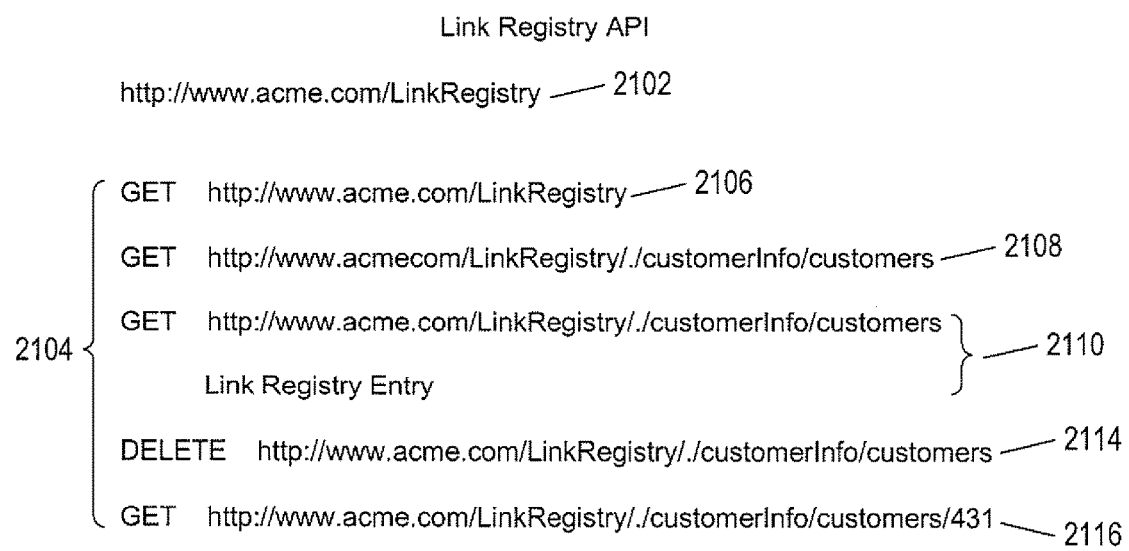
FIG. 21 shows example method calls to a simple link-registry API.

In one implementation, the link registry is made accessible via a simple link-registry API, which is a subset of the RESTful customer information API discussed above with reference to FIGS. 14-16B. FIG. 21 shows example method calls to a simple link-registry API. The link registry is associated with a URI 2102. The link registry can be accessed using the GET, PUT, POST, and DELETE HTTP methods. Examples 2104 are provided in FIG. 21. The GET request 2106 can be used to obtain a representation of the entire link registry, including representations of all of the link-registry entries. GET request 2108 may be used to find a link-registry entry corresponding to the collective customers resource. PUT request 2110 can be used to store or update the link-registry entry for the customers collective resource, with the link-registry entry represented by symbol string "LinkRegistryEntry" 2112. The link-registry entry corresponding to the collective customers resource can be deleted using the DELETE request 2114. The link-registry entry corresponding to a particular customer can be retrieved using GET request 2116.

The key/value pairs contained in a link-registry entry provides a mechanism for directing additional links to response messages with particular characteristics. For example, because resources are often hierarchically organized, it may be desirable, in certain cases, for additional links to be added with respect to an intermediate-level resource in the path of a lower-level resource. In other words, as shown in FIG. 20, when the value of the resource URI field is "http://www.acme.com/customerInfo/customers," the creator of the link-registry entry may desire for the additional link specified in the link-registry entry to be added in a response message to a request for a representation of the resource "http://www.acme.com/customerInfo/customers/361/orders/1." On the other hand, the author of the link-registry entry may wish for the additional links only to be added when a representation of the specific resource "http://www.acme.com/customerInfo/customers" is requested in a request message. In one scheme, illustrated in FIG. 20, the key "appliedTo" 2010 may be associated with either the value "terminal" or "non-terminal." When the value is "terminal," then the specified additional links are added only when the URI in the request message exactly matches the URI in the field "ResourceURI" of the link-registry entry. However, when the value is "non-terminal," then a requested URI that contains the value of the "Resource URI" field as an initial substring should be responded to with a response message that contains the additional links. Other key/value pairs may indicate that the additional link should only be added for response messages containing particular values and/or for request messages containing particular values. In the example shown in FIG. 20, the two key/value pairs 2012 specify that the additional link 2014 should be included in a response message only when the body of the response message contains the key/value pairs city/Des Moines and state/Iowa. In alternative implementations, a link-registry entry may omit the numKvp and kvp keys and associated values and simply add additional links into the response message corresponding to a request message requesting a representation of a resource specified by a URI that exactly matches the value of the "ResourceURI" field of the link-registry entry. In yet alternative implementations, many different types of additional filtering and selection specifiers may be included in a link-registry entry, including range specifiers, relational operators, and other features common to, for example, relational database queries.

Authorization Service to Facilitate Multi-Tenancy in Cloud-Computing Facilities

The VCC server and VCC nodes, discussed above, provide a virtualization infrastructure for the management of distributed, multi-tenant, virtual cloud-computing facilities, or virtual data centers. The management functionality is referred to as the "cloud director." The cloud director is implemented as a distributed management infrastructure implemented by a combination of the VCC nodes and the VCC server and provides both a management interface as well as a suite of software services and facilities accessible to cloud operators, system administrators, and other such clients of the cloud director.

While the cloud-director-provided functionalities and services are of great benefit to cloud-director users, it is often the case that, for particular virtual data centers and collections of virtual data centers, a cloud operator or system administrator may wish to supplement and enhance the facilities and services provided by the cloud director. In certain cases, a cloud operator or system administrator may wish to provide additional functionalities and services based on existing functionalities and services that were not developed for multi-tenant VDCs and which are unaware of, and cannot use, the multi-tenancy infrastructure used by cloud-director-provided facilities and services. Currently, incorporating multi-tenancy-unaware facilities and services into the cloud-director-provided functionalities and services can be a rather daunting task for developers and users of the cloud-director interface.

Figure 22A:
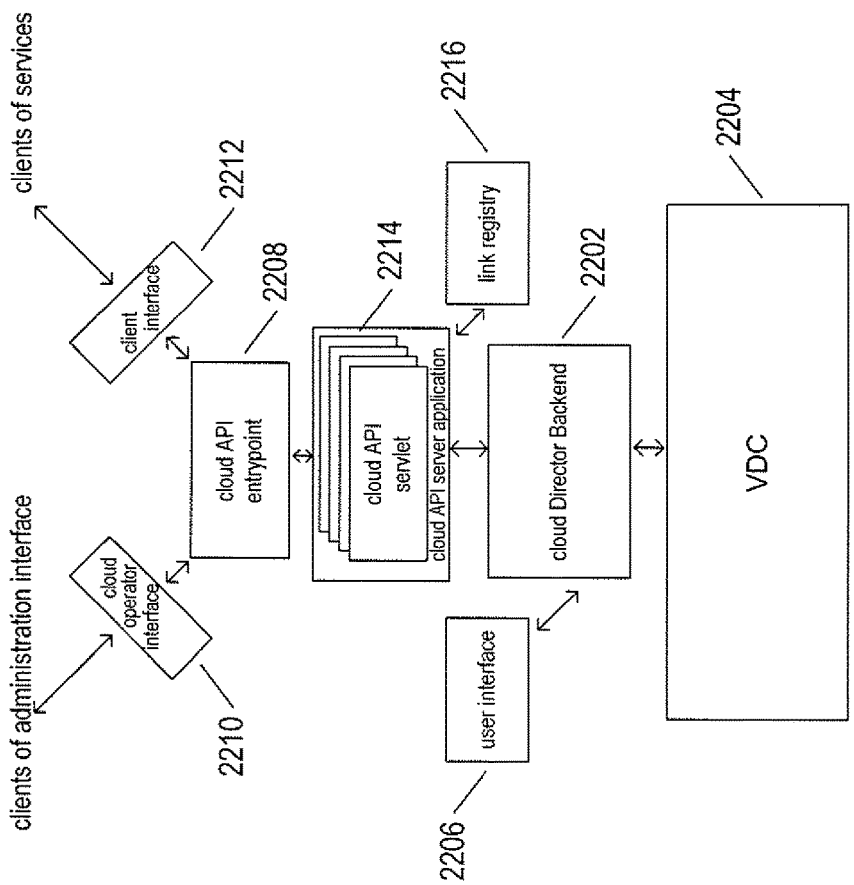
FIGS. 22A-C illustrate a recently developed approach that allows for extension of the facilities and services provided by the cloud director for management of distributed, multi-tenant VDCs.
Figure 22B:
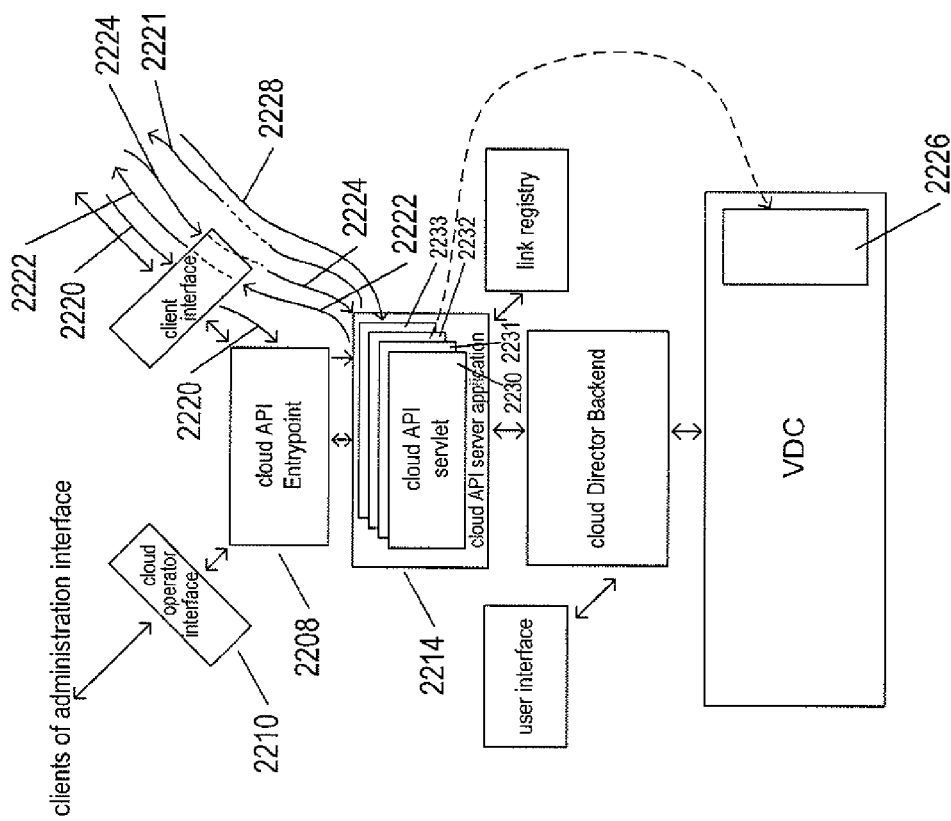
Figure 22C:
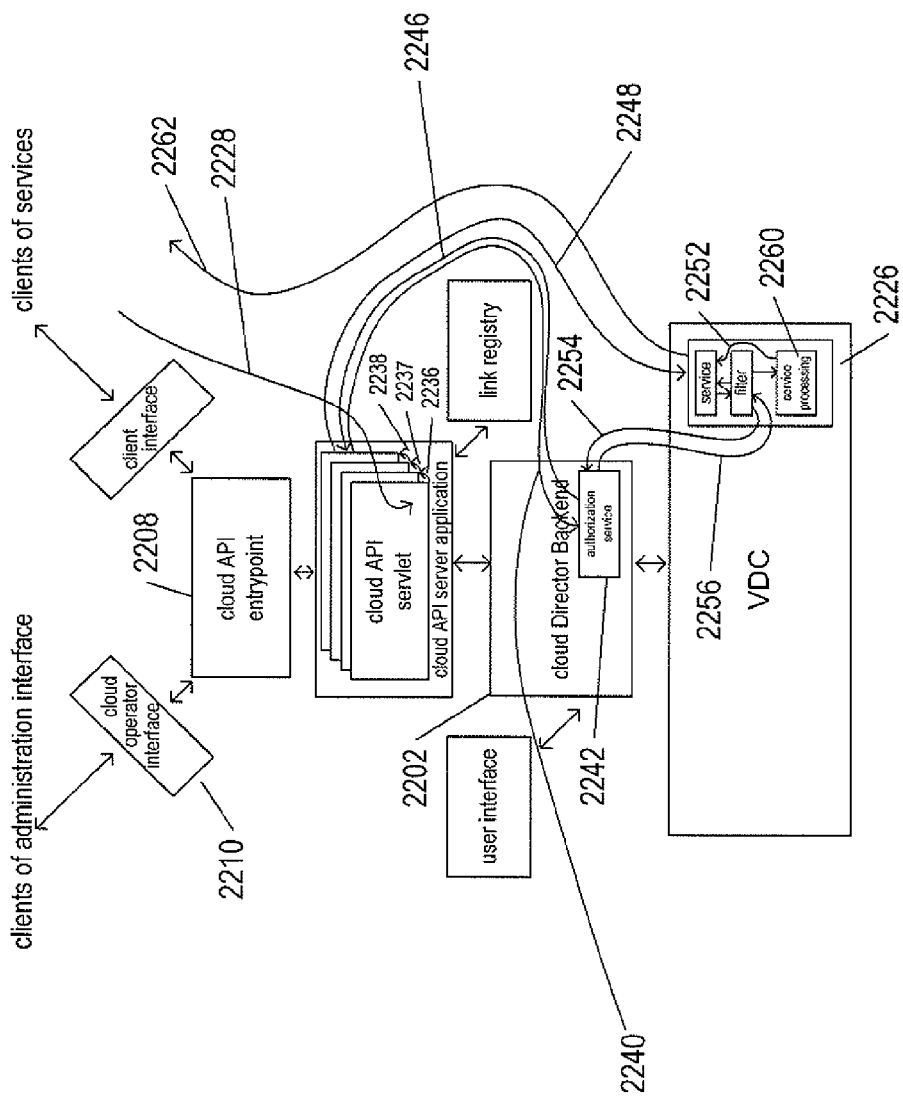

FIGS. 22A-C illustrate a recently developed approach that allows for extension of the facilities and services provided by the cloud director for management of distributed, multi-tenant VDCs. As shown in FIG. 22A, the cloud director backend 2202 provides a collection of functionalities for management and operational use of a collection of distributed, multi-tenant VDCs 2204. As discussed in preceding subsections, one aspect of the cloud director is the provision of a user interface 2206 through which cloud owners, system administrators, and other cloud-director users can access cloud-director functionalities and services. In order to facilitate extensibility of the cloud director, the cloud director provides a single cloud application programming interface ("API") entry point 2208 that represents a RESTful interface to cloud-director functionalities and services. These functionalities and services can be broadly divided into a cloud-operator interface 2210, provided through the cloud-API entrypoint, and a client interface 2212, also provided through the cloud-API entrypoint 2208. Requests made through the cloud-API entrypoint 2208 are handled, in one implementation, by a cloud API server application 2214 that accesses a link registry 2216 that facilitates systematic extension of the cloud-API entrypoint, as discussed in the previous subsection.

As one example of the cloud-director-provided extensibility through the cloud-API entrypoint, a cloud operator may extend, through the cloud-operator interface 2210, the services provided by the cloud director to include a newly developed or legacy backup service for VDCs that can then be accessed, through the client interface 2212 portion of the cloud-API entrypoint, by various types of authorized users, including other cloud operators, system administrators, and other types of privileged users. In addition, a cloud-director-provided service may be redefined by extension.

FIG. 22B illustrates access, by a service client, to a service accessible through the cloud-API entrypoint 2208 that has been added to the cloud-director functionality by a cloud operator through the cloud-operator interface 2210. The client first accesses the cloud-API entrypoint 2220 using a RESTful request that returns 2221, through a series of responses and additional requests 2222 and 2224, a link to the new backup service 2226 provided by a virtual server. This link allows the client to access 2228 the backup service. The cloud API server application includes multiple filters 2230-2233, in one implementation implemented as servlets, that perform initial processing of an HTTP request for the URIs within the cloud API entrypoint interface before calling a service extension. However, without some type of additional functionality to incorporate the backup service into the multi-tenancy functionality of the cloud director, there would be no reasonable way to control access to the new backup service. As one example, the cloud operator who has extended the cloud director functionality to include the new backup service might desire that the backup service only be accessed by members of the cloud-operator's organization. In certain cases, the cloud operator may be willing to allow access to the backup service by members of other organizations, but only to qualified superusers. The cloud-API entrypoint 2208 thus provides for extending cloud-director functionality and services, but, by itself, does not provide a means for access control needed in multi-tenant-VDC environments.

FIG. 22C illustrates an authorization service that allows for multi-tenancy-aware access control to services provided in cloud-director-functionality extensions through the cloud-operator interface and cloud-API entrypoint. FIG. 22C continues from FIG. 22B. Having obtained a link to the new backup service, a client directs a request 2228 to the new backup service 2226. The cloud API server application 2214 directs the request through a series of filters (2230-2233 in FIG. 22C) 2236-2238. One of the filters authenticates the requests, preparing a security context that includes information related to the requestor. A subsequent filter, referred to as an extension filter, accesses 2240 an authorization service 2242 provided by the cloud-director backend 2202. The authorization service examines information provided by the extension filter, including the security context, requested URI, and HTTP request, to determine whether or not the client is authorized to access the resource defined by the requested URI. The authorization service returns 2246, to the extension filter, an indication of whether or not the client is authorized. When the client is authorized, the extension filter passes 2248 the request to the new backup service, which begins to process the request. As part of the initial processing, the request is passed to a filter 2252, such as a servlet, which may access 2254 the authorization service to further authorize the request. The authorization service examines information provided by the filter to determine whether or not the client is authorized to access the service and returns 2256, to the filter, an indication of whether or not the client is authorized. When the client is authorized, the filter passes the request to further service-processing functionality 2260. Otherwise, the request is denied for lack of authorization. Ultimately, a response message is returned 2262 to the client. Thus, the authorization service provides for access control to functionalities and services added to cloud-director-provided functionalities and services through the cloud-operator interface 2210 and cloud-API entrypoint 2208.

Figure 23:
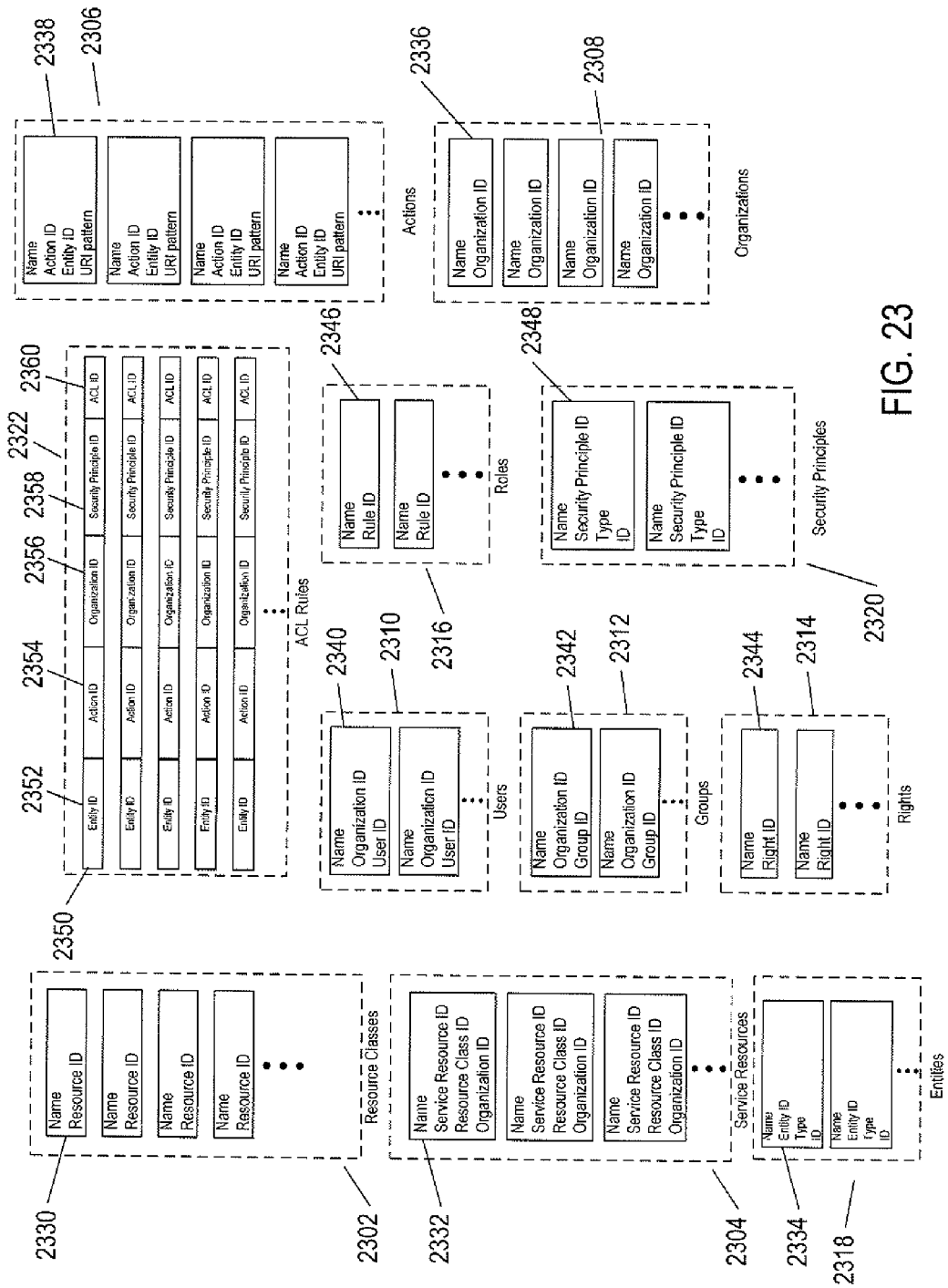
FIG. 23 illustrates data objects maintained in an authorization-service database maintained by the cloud director to support the authorization service provided by the cloud-director backend to support cloud-director-provided service extensions.

FIG. 23 illustrates data objects maintained in an authorization-service database maintained by the cloud director to support the authorization service provided by the cloud-director backend to support cloud-director-provided service extensions. The authorization-service database includes data objects that represent resource classes 2302, data objects that represent specific instances of given resource class called service resources 2304, data objects that represent particular actions or requests supported by resource classes 2306, organizations 2308, users 2310, groups 2312, rights 2314, and roles 2316. There are two types of data objects that represent one of a set of primitive data objects: entities 2318, each data object of which can represent either a resource class or a service resource; and security principals 2320, each data object of which represents a user, group, right, or role. All of the above-mentioned types of data objects are used to support the type of data object 2322 that represents what are referred to as "ACL rules."

In FIG. 23, only a few fields for each data object are shown. The data objects may include additional fields or different fields in different implementations. A resource-class data object, such as data object 2330, includes the name of the resource class and a resource-class ID, or resource ID. Resource classes refer to general classes of services. A particular instance of a resource class is a service resource, represented by a service resource data object, such as data object 2332. A service resource data object includes a name, service ID, organization ID, and resource-class ID. As one example, backup services may be described by a particular resource class represented by a resource-class data object and each particular instance of the backup resource class may each be described by a service resource data object. An entity data object, such as data object 2334, represents either a resource class or a service. An entity data object includes a name, entity ID, a type indicating whether the entity represents a resource class or service resource, and the ID for the resource class or service resource. An organization data object, such as data object 2336, includes the name of an organization and an organization ID associated with the organization. An action data object, such as data object 2338, includes the name of an action, an action ID, the identifier of the entity that represents a resource class or service resource that supports the action, and a URI pattern that specifies one or more URIs that represent the action. An action is equivalent to a function provided by a type of resource class or by a specific service resource. For example, an action can be defined for all backups or for a particular backup service resource. The URI pattern is a named regular expression, in which "(?<id>)" matches one or more resource identifiers. The "id" tag may or may not be present in a particular URI pattern. A user data object, such as data object 2340, includes the name of a user, the ID of the organization the user is a member of, and a user ID. A group data object, such as data object 2342, includes the name of the group, an organization ID for the organization that supports the group, and the group ID. A right data object, such as data object 2344, includes the name of a right and an ID associated with the right. A role data object, such as data object 2346, includes the name of a role and an ID associated with the role. A security-principles data object, such as data object 2348, includes a name, an ID associated with the security principle, a type indicating one of a user, group, right, or role, and the ID of the user, group, right, or role.

All of the above-discussed data objects, including resource-class, service resource, action, organization, user, group, right, role, entity, and security-principle data objects, are used to define ACL rules. An ACL rule represents a specific authorization to which a request for a service can be matched in order to determine whether or not the request is authorized. Each ACL rule, such as ACL rule 2350, includes an ID of an entity data object 2352, an ID of an action data object 2354, an ID of an organization data object 2356, the ID of the security-principle data object 2358, and an ACL ID 2360. An ACL rule thus defines a relationship between a resource class or service, an action, an organization, and one of a user, group, right, or role. For example, an ACL rule may authorize, for a specific action that may be requested of a specific service resource, access by a member of an organization according to a particular security principle. The security principle can specify a specific user of the organization that can access the action of the service, a group of users of the organization that can access the action of the service, a member of an organization holding a particular right to access the action of the service, or a member of the organization that is associated with a particular role to access the action of the service. Various different types of rights and roles can be defined. Roles may include job titles, job descriptions, or positions, such as cloud owner or system administrator. Rights may include various types of access rights, such as superuser-access rights. An ACL rule may specify authorization for a particular service resource or for a particular resource class of which there are one or more service resource instances. The authorization-service database includes various types of default data objects, such as "any" data objects that operate much like wildcards in ACL rules and "shared" data objects. An "any" data object matches any other data object of the same type. A "shared" data object matches multiple organization data objects.

Figure 25:
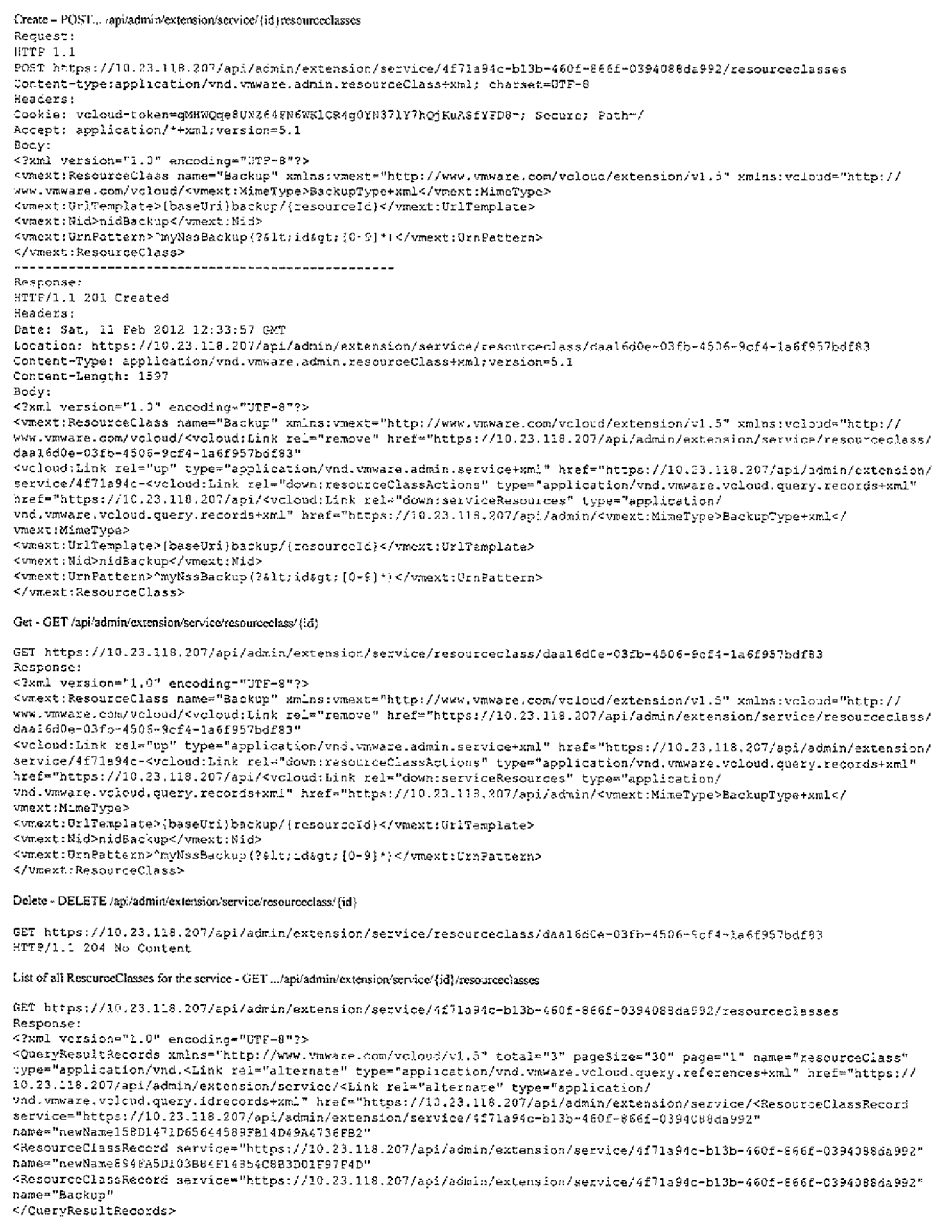

A subset of the cloud-operator interface (2210 in FIG. 22A) provided through the cloud-API entrypoint 2208 is an authorization-service management interface. This is a RESTful interface that allows for the creation, retrieval, and deletion of various data objects in the authorization-service database, described above with reference to FIG. 23. FIG. 24 provides a table-based description of a portion of the authorization-service management interface. For example, the table 2400, in a first column 2404, includes four authorization-service-management-interface ("ASMI") operations 2402 that allow for the creation of a resource class, retrieval of a description of the resource class by resource-class ID, retrieval of a list of resource classes, and deletion of a resource class. In a second column 2406 of table 2400, the corresponding HTTP operations are shown for each ASMI operation. FIG. 25 shows, as one example, an HTTP/XML implementation of the ASMI operations 2402 in FIG. 24 associated with resource classes. Thus, the ASMI subset of the cloud-operator-interface subset of the cloud-API entry-point allows authorized cloud-director users to create and delete primitive and collective data objects in the authorization-service database as well as to create and delete ACL rules. Creation and deletion of data objects stored in the authorization-service database alters operation of the authorization service and defines how requests to service actions are authorized by the authorization service. Of course, access to the ASMI interface is controlled by the cloud-director multi-tenancy infrastructure so that only authorized and verified users can alter and manage portions of the authorization-service interface.

FIG. 26 shows the call interface to the authorization service provided by the cloud director. This interface includes two authorization calls, including the call "authorize" 2602 and the call "authorize services" 2604. The routine "authorize" 2602 returns a Boolean value indicating whether or not a particular request is authorized. This routine takes, as arguments, a definition of a service extension that provides external functionality for the cloud, a security context that includes information with respect to the user or group making the request, including any rights or roles associated with the user or group, and the organization to which the user or group belongs. The routine "authorize" also receives, as arguments, the requested URI and the corresponding HTTP method that implements the request, from which information about the corresponding resource class and resource-class action can be obtained by matching the requested URI against the action's URI pattern. The routine "authorize services" 2604 carries out authorization of a request with respect to multiple services. In this case, when the request is authorized for all of the multiple services specified by a set of service definitions furnished as an argument to the routine, then the routine returns, but when the request fails authorization with respect to one or more services, then the routine throws an unauthorized exception to indicate that the request is not authorized. The routine "authorize services" is useful when a particular requested service results in lower-level calls to other services, allowing the request to be authorized with respect to all of the services invoked during processing of the highest-level service.

Figure 27A:
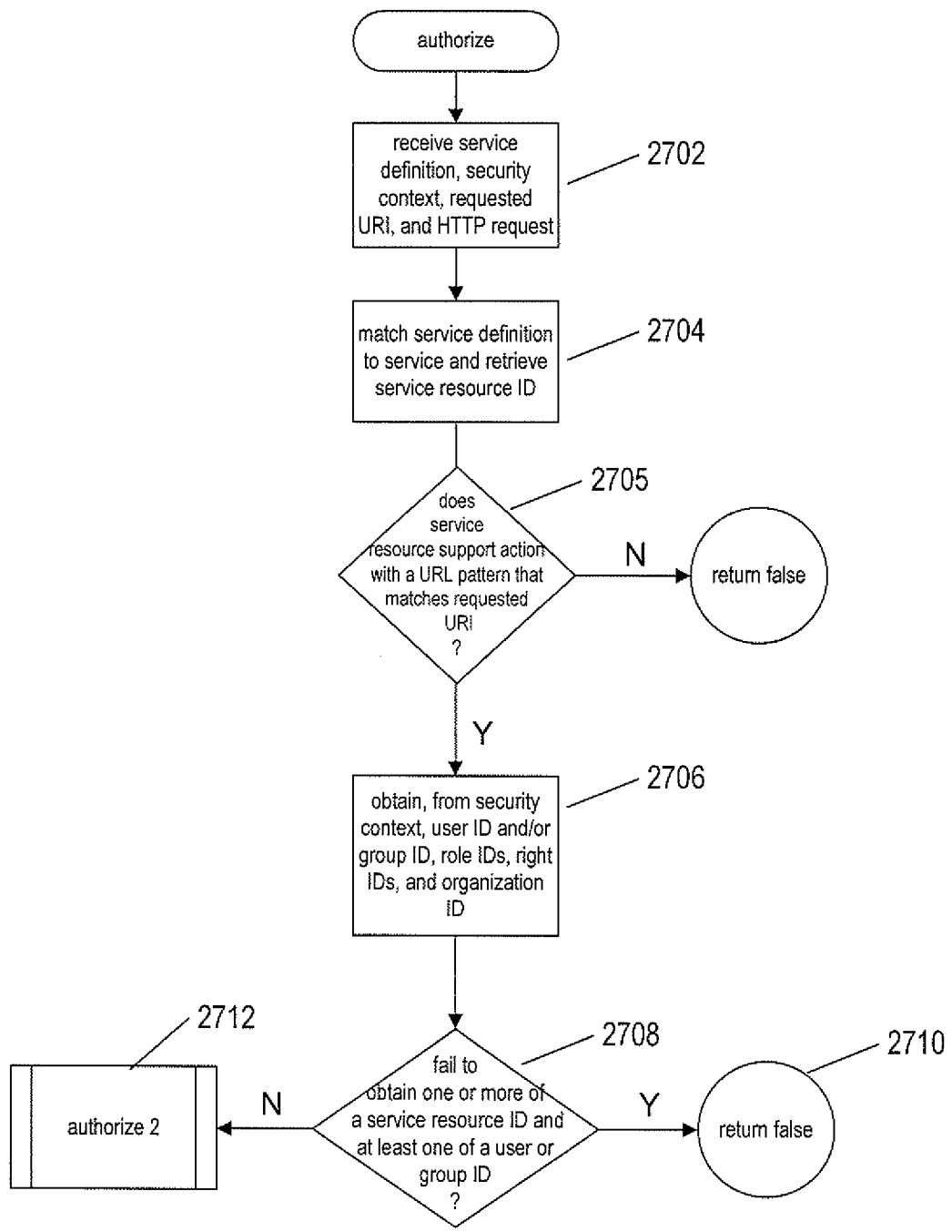
FIGS. 27A-B provide control-flow diagrams that illustrate an implementation of the routine "authorize."
Figure 27B:
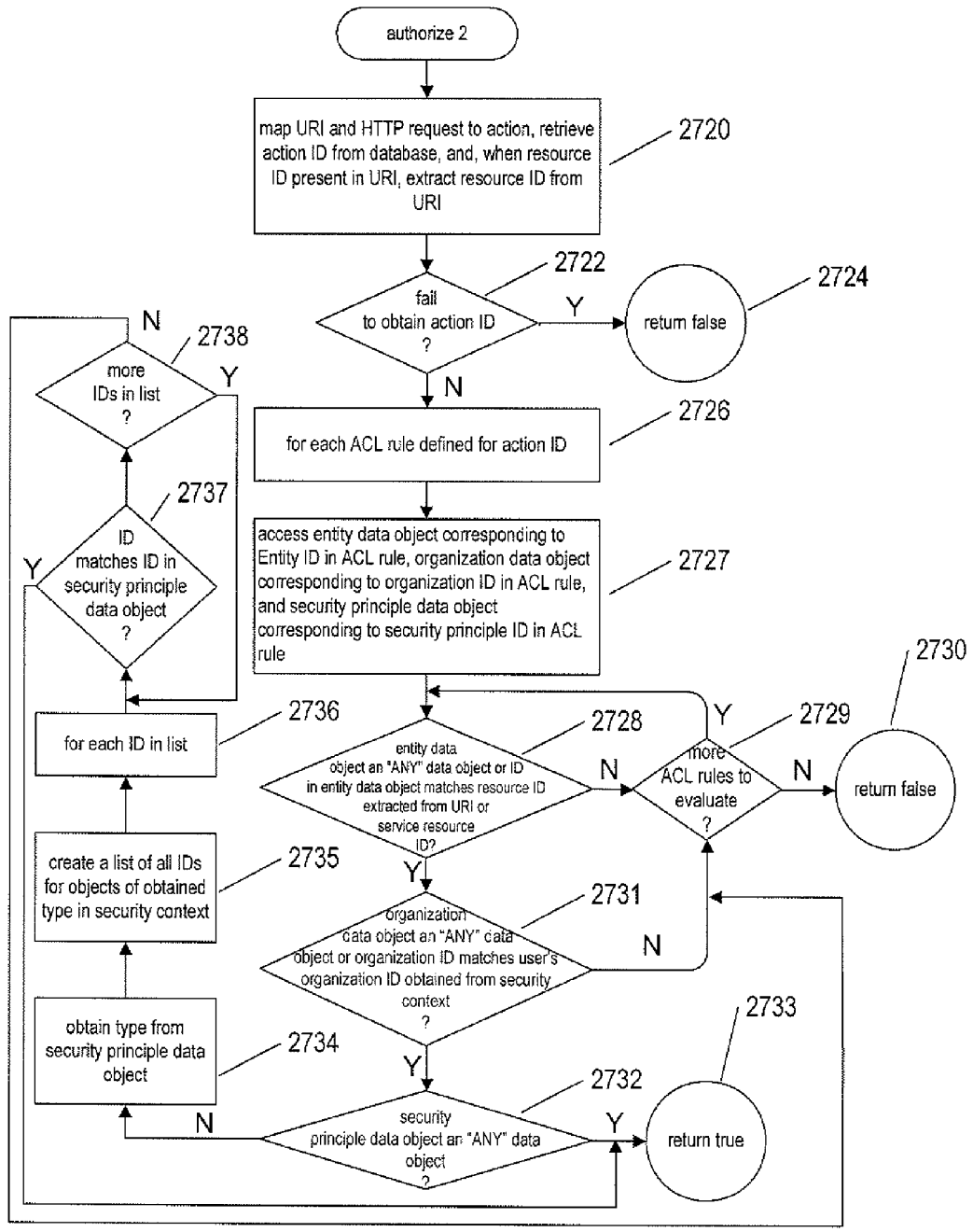

FIGS. 27A-B provide control-flow diagrams that illustrate an implementation of the routine "authorize," discussed above with reference to FIG. 26. In step 2702, the routine "authorize" receives a service definition, security context, requested URI, and HTTP request furnished as arguments to the routine. In step 2704, the routine "authorize" matches the received service definition to a service resource data object in the authorization-service database and retrieves the service resource ID from the data object. The matching may involve comparing the name of the service resource provided in the service definition to the name field of the service resource data object or may involve more complex matching that involves different and/or additional service-data-object fields and different and/or additional portions of the service definition. In step 2705, the routine "authorize" determines whether the service resource supports or provides an action that is represented by a regular expression, referred to as the "URI pattern," that represents one or more URIs within the RESTful interface supported by the cloud API entrypoint. When the service resource does not support an action corresponding to the requested URI, a "false" Boolean value is returned. Otherwise, in step 2706, the routine "authorize" obtains, from the security context received as an argument, the user ID and/or the group ID, role IDs, and right IDs associated with the request. As discussed above, the security context is provided by the authentication filer to the extension filter within the cloud API server application. When the routine "authorize" fails to obtain a service resource ID and at least one of a user ID and group ID, as determined in step 2708, the routine "authorize" returns "false" in step 2710. Otherwise, the routine "authorize 2" is called, in step 2718, to continue the authorization process.

FIG. 27B provides a control-flow diagram of the routine "authorize 2," called in step 2718 of FIG. 27A. In step 2720, the routine "authorize 2" processes the received requested URI and HTTP request in order to identify the action to which the request that is being authorized corresponds by matching the action URI pattern to the request URI. The routine "authorize 2" then retrieves the corresponding resource action ID from the service-authorization database. In addition, when the requested URI includes an indication of the resource ID, the routine "authorize" extracts the resource ID from the URI. The cloud director, in certain implementations, may maintain mappings between URIs and HTTP request types and resource-class actions. When the routine "authorize 2" fails to obtain an action ID for the request that is being authorized, as determined in step 2722, the routine "authorize 2" returns "false," in step 2724, which becomes the return value for the routine "authorize," called the routine "authorize 2" in step 2712. Otherwise, in the for-loop of steps 2726-2738, the routine "authorize 2" continues to process ACL rules that include the action ID retrieved from the authorization-service database until either an ACL rule is found that authorizes the request or no more ACL rules can be retrieved from the authorization-service database. In the former case, the return value "true" is returned, in step 2733, which becomes the return value of the routine "authorize." In the latter case, the return value "false" is returned in step 2730. For the currently considered ACL rule in the for-loop of steps 2726-2738, the routine "authorize 2," in step 2727, accesses the entity data object, organization data object, and security principle data object, in the authorization-service database, that correspond to the entity ID, organization ID, and security-principle ID in the ACL rule. When the entity data object is not an "ANY" data object and the ID in the entity data object does not match a resource ID extracted from the requested URI or the service resource ID, as determined in step 2728, then control flows to step 2729, where the routine "authorize 2" determines whether or not there are more ACL rules to consider. When there are more ACL rules to consider, control flows back to step 2728, for a next iteration of the for-loop of steps 2726-2738. Otherwise, the value "false" is returned in step 2730. When the entity data object is an "ANY" data object or the ID in the entity data object matches a resource ID extracted from the requested URI or the service resource ID, as determined in step 2728, the routine "authorize 2" determines, in step 2731, whether the organization data object is an "ANY" data object or whether the organization ID matches the organization ID obtained from the security context. When the organization data object is not an "ANY" data object and the organization ID does not match the organization ID obtained from the security context, control flows to step 2729. Otherwise, the routine "authorize 2" determines, in step 2732, whether the security principle data object is an "ANY" data object. When the security principle data object is an "ANY" data object, a matching ACL rule has been found, and the value "true" is returned, in step 2733. Otherwise, in step 2734, the routine "authorize 2" obtains the type form the security principle data object and, in step 2735, creates a list of all IDs for objects of this type included in the security context. Then, in the inner for-loop of steps 2736-2738, the routine "authorize 2" determines whether any of the IDs in the list match the ID contained in the security principle data object. If an ID in the list matches the ID contained in the security principle data object, as determined in step 2737, then the value "true" is returned in step 2733. Otherwise, control flows to step 2729.

Figure 28:
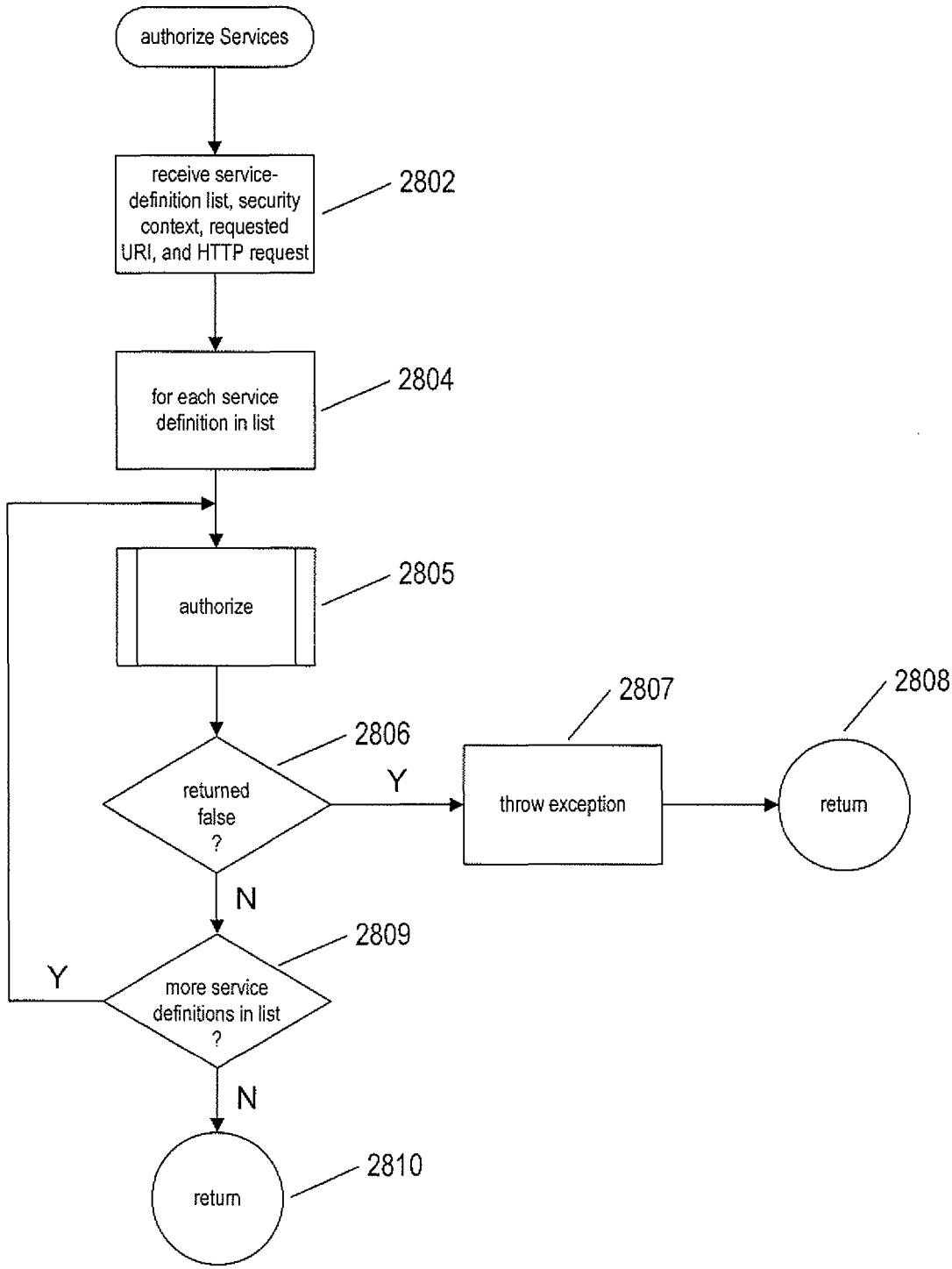
FIG. 28 provides a control-flow diagram for the routine "authorize services."

FIG. 28 provides a control-flow diagram for the routine "authorize services," discussed above with reference to FIG. 26. In step 2802, the routine "authorize services" receives a service-definition list, security context, requested URI, and HTTP request furnished as arguments to the routine, as discussed above with reference to FIG. 26. Then, in the for-loop of steps 2804-2809, the routine "authorize services" calls the routine "authorize," in step 2805, for each service definition in the list of service definitions. When the routine "authorize" returns the value "false," as determined in step 2806, the routine "authorize services" throws an exception, in step 2807 and returns in step 2808. Otherwise, when all of the services in the service-definition list have been processed, the routine "authorization services" returns in step 2810 without throwing an exception.

Thus, the authorization service provided by the cloud-director backend and the ASMI provided through the cloud-API entrypoint provides a flexible and powerful access-control functionality to the various services and functionalities added to the cloud-director-provided functionalities and services by the extension facility provided through the cloud operator interface via the cloud-API entrypoint. Cloud operators and other superusers can therefore supplement and even redefine cloud-director-provided functionalities and services while, at the same time, associating the functionality and services with access-control rules in order that the functionalities and services operate within a multi-tenant VDC environment.

Method for Distributing Processing of HTTP Requests

FIG. 29 again illustrates the cloud director and cloud API entrypoint, discussed above with reference to FIGS. 22A-C.

Figure 29:
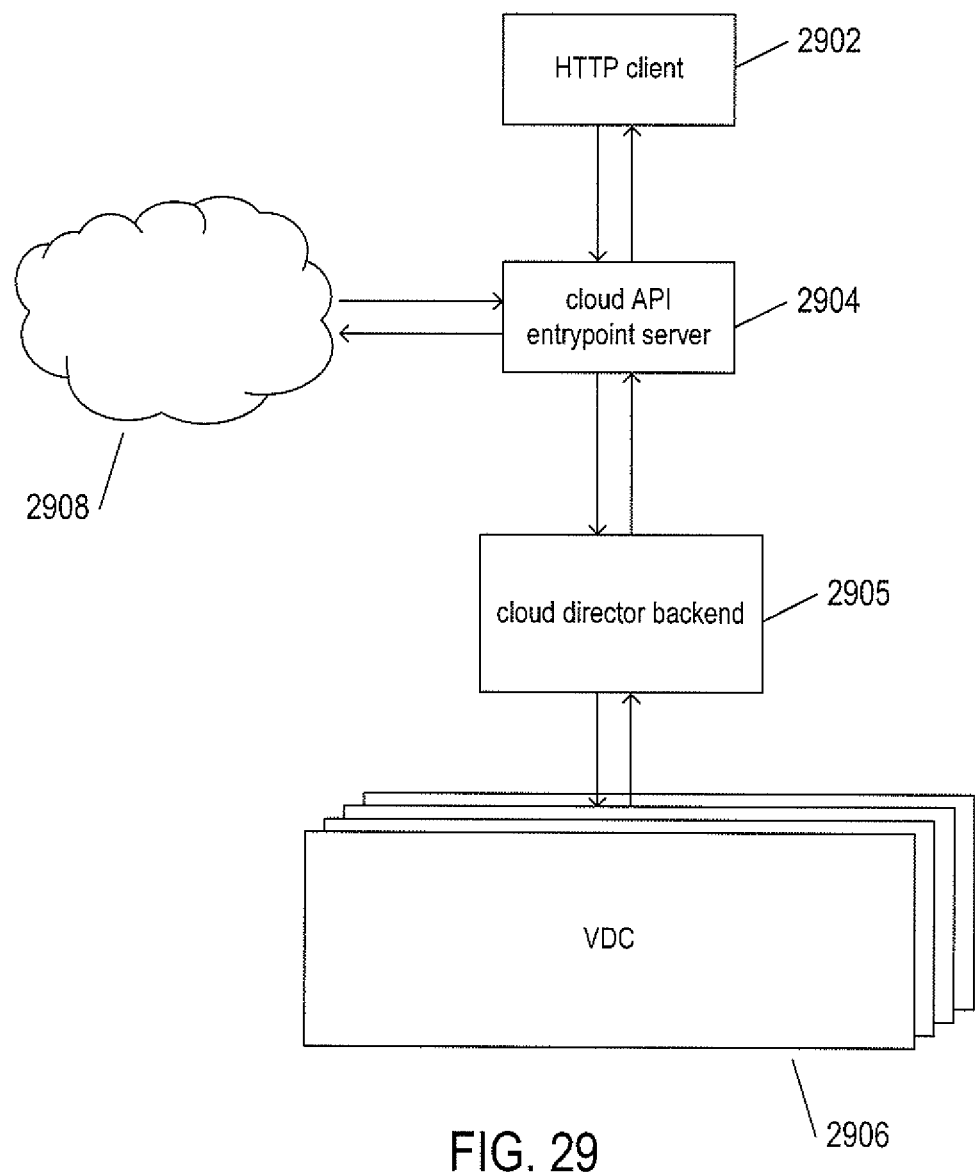
FIG. 29 again illustrates the cloud director and cloud API entrypoint, discussed above with reference to FIGS. 22A-C.

In FIG. 29, an HTTP client 2902 accesses cloud-director-provided functionalities and services and/or service extensions through the cloud API entrypoint. HTTP requests for URIs within the cloud-API-entrypoint RESTful interface are directed to a cloud API entrypoint server 2904. The cloud API entrypoint server may be one or more virtual servers executing within the VCC server or may be one or more servers in communication with the VCC server. The cloud API entrypoint server may, in turn, access the cloud-director backend 2905 and processing entities executing within the VCC server or within one or more VDCs managed by the cloud director 2906 in order to carry out request processing. The cloud API entrypoint server may also access additional external computational entities through various communications media, including the Internet 2908.

Figure 30A:
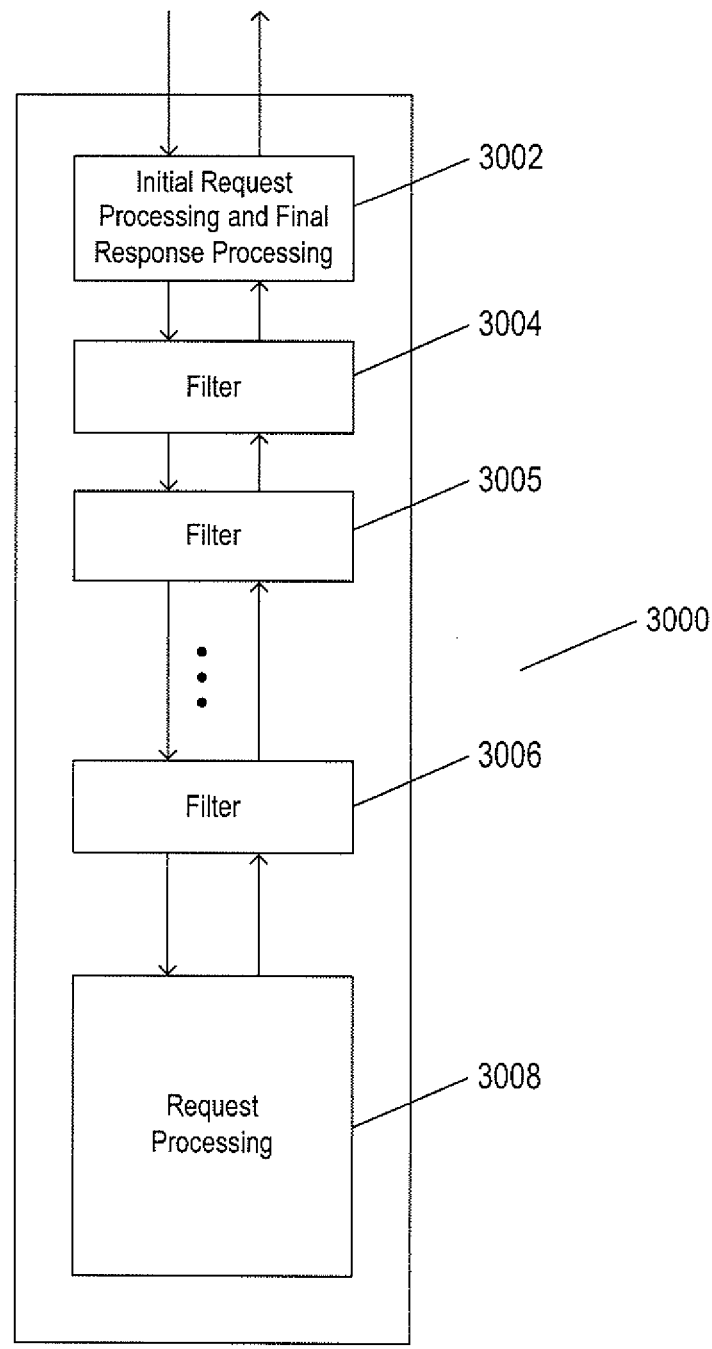
FIGS. 30A-B illustrate a currently available cloud API entrypoint server and a cloud API entrypoint server to which an extension filter has been added to allow HTTP-request processing to be distributed among various computational entities and systems remote from the cloud API entrypoint server.
Figure 30B:
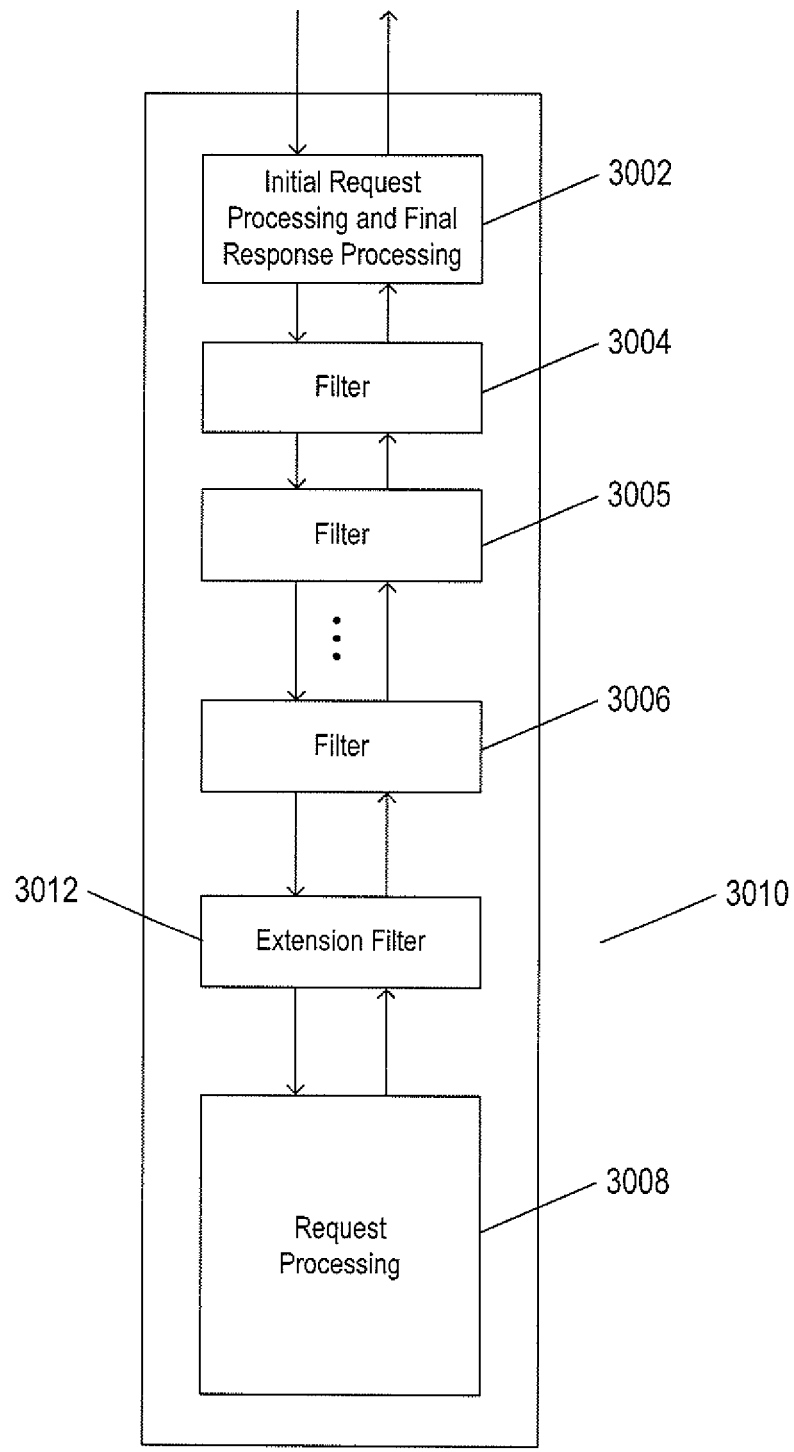

FIGS. 30A-B illustrate a currently available cloud API entrypoint server and a cloud API entrypoint server to which an extension filter has been added to allow HTTP-request processing to be distributed among various computational entities and systems remote from the cloud API entrypoint server. FIG. 30A shows, in block-diagram fashion, a currently available cloud API entrypoint server. The cloud API entrypoint server receives HTTP requests for URIs within the cloud API entrypoint and carries out initial request processing that involves temporarily storing each received HTTP request, associating the received HTTP request with a particular requested URI, associating the HTTP request with a security context, and carrying other such initial processing tasks in an initial-request-processing and final-response-processing component 3002. Following initial request processing, the HTTP request is passed through a series of filters 3004-3006. The filters may be implemented as Java EE filters or equivalent internal server extensions. Each filter may alter the contents of the HTTP request and may additionally carry out other computational tasks related to processing of the HTTP request. Finally, the HTTP request is forwarded to a main handler 3008, which carries out the bulk of the HTTP-request-processing functionality within the cloud API entrypoint server. In general, request processing produces an HTTP response corresponding to the HTTP request, according to the HTTP protocol discussed in previous subsections, and forwards the HTTP response back through a series of filters 3006-3002, each of which may modify the HTTP response and carry out other computational tasks associated with the HTTP response, following which the HTTP response is forwarded to initial-request-processing and final-response-processing component 3002 that prepares the HTTP response for transmission back to the HTTP client which initially submitted the HTTP response to the cloud API entrypoint server.

As discussed in the preceding subsections, the cloud director supports, through the cloud API entrypoint, extension, by cloud-director users, of the functionalities and services provided by the cloud director. In many cases, the service extensions provided by cloud-director users are implemented by the users and execute within user VDCs or within other remote computer systems. The current document is directed to extension of the cloud API entrypoint server to enable the cloud API entrypoint server to distribute HTTP-request processing of HTTP requests directed to URIs that represent service extensions and other cloud-director-user-provided extensions to the cloud-director-provided functionalities and services.

FIG. 30B illustrates an extended cloud API entrypoint server 3010 that includes an extension filter 3012. The extension filter is implemented in a fashion similar to the other filters used to process HTTP requests and responses in the currently available cloud API entrypoint servers shown in FIG. 30A. The extension filter distributes HTTP requests, received from filter 3006, to one or more computational entities for processing and distributes HTTP responses received from the request processing functionality 3008 to the same one or more computational entities for processing. Any of these computational processes may essentially short-circuit additional processing and return an HTTP response message to the extension filter for forwarding back through the filters 3004-3006 to the initial-request-processing and final-response-processing 3002 for return to the requesting HTTP client.

Figure 31:
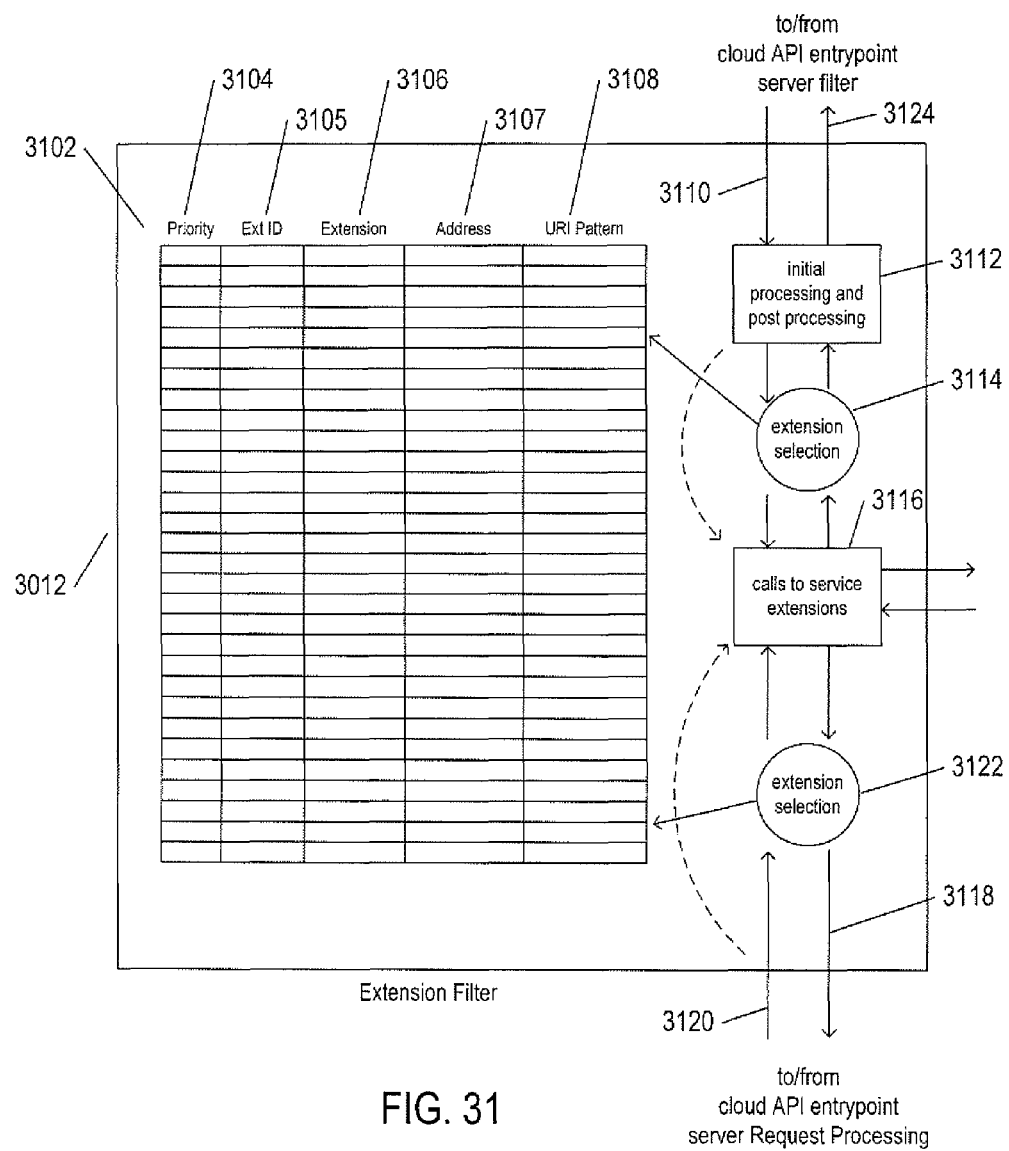
FIG. 31 illustrates operation of the extension filter 3012 in FIG. 30B.

FIG. 31 illustrates operation of the extension filter 3012 in FIG. 30B. The extension filter 3012 includes a distribution table 3102 that directs dispatch of HTTP requests and HTTP responses to external computational systems for processing. Each row in the table represents a dispatch action. Each row includes fields corresponding to the columns 3104-3108 of the dispatch table 3102. In other words, the columns represent fields within the dispatch-table-row entries. Each dispatch-table entry includes an indication of the priority of the dispatch, corresponding to column 3104, an extension ID and other extension information, corresponding to columns 3105 and 3106, which represent a particular service extension, an address to which an HTTP request or response is directed by the dispatch operation represented by the dispatch-table entry, corresponding to column 3107, and a regular expression, referred to as the "URI pattern," that represents one or more URIs within the RESTful interface supported by the cloud API entrypoint. When an HTTP request for a URI that matches the URI pattern is received by the extension filter, the extension filter dispatches the HTTP request to the service extension at the address included in the dispatch-table entry that includes the matched URI pattern. Similarly, the extension filter dispatches the HTTP response corresponding to the HTTP request to the same service extension. Thus, extension-filter dispatching of HTTP requests and HTTP responses is table driven, in the implementation shown in FIG. 31. The table is stored within the VCC server, in certain implementations, and is continuously updated as changes are made to the RESTful interface represented by the cloud API entrypoint via the cloud-operator interface discussed above with reference to FIGS. 22A-C.

When an HTTP request is forwarded to the extension filter by the final server filter (3006 in FIG. 30B), as represented by arrow 3110 in FIG. 31, the extension filter carries out any initial processing in an initial-processing and post-processing component 3112 and then dispatches the HTTP request to all service extensions associated in the dispatch table with URI patterns that match the URI requested by the HTTP request. The dispatch table is sorted in descending priority order and secondarily sorted with respect to extension IDs. Thus, the order of the entries in the dispatch table define a strict, deterministic order of dispatch of HTTP requests and responses by the extension filter. In the dispatch of the HTTP request, represented in FIG. 31 by the extension-selection feature 3114, the dispatch table is traversed from top to bottom, in descending priority order, to identify those service extensions with URI patterns matching the requested URI and, for each dispatch-table entry with a matching URI pattern, forwards the HTTP request, in a forwarding module 3116, to the computational entity at the address indicated in the dispatch-table entry. When a processed HTTP request corresponding to the forwarded HTTP request is returned from the service extension to the forwarding module 3116, the processed HTTP request is returned to the extension selection feature 3114 for dispatch to a next-lowest priority service extension with a matching URI pattern. However, if an HTTP response is instead returned from the service extension to the forwarding module 3116, the HTTP response is returned to the initial-processing and post-processing component 3112 for return to filter 3006, short-circuiting additional request processing. In alternative implementations, the HTTP response may be dispatched, in reverse order, to each service extension that previously processed the corresponding HTTP request, represented by dispatch-table entries above the dispatch-table entry for the last called service extension. When the entire dispatch table has been traversed by extension-selection feature 3114, the HTTP request is then forwarded to the server request processing functionality (3008 in FIG. 30B), as represented by arrow 3118 in FIG. 31. The request processing functionality returns an HTTP response, as represented by arrow 3120 in FIG. 31, to the extension filter which is then forwarded to a second extension-selection feature 3122 that traverses the dispatch table from bottom to top, dispatching the HTTP response to each service extension with a URI pattern that matches the URI requested by the HTTP request corresponding to the HTTP response. Once the entire dispatch table has been traversed by the second extension-selection feature 3122, the HTTP response is returned to the initial-processing and post-processing component 3112 for final processing before the HTTP response is returned to filter 3006 in FIG. 30B, as represented by arrow 3124 in FIG. 31.

Figure 32A:
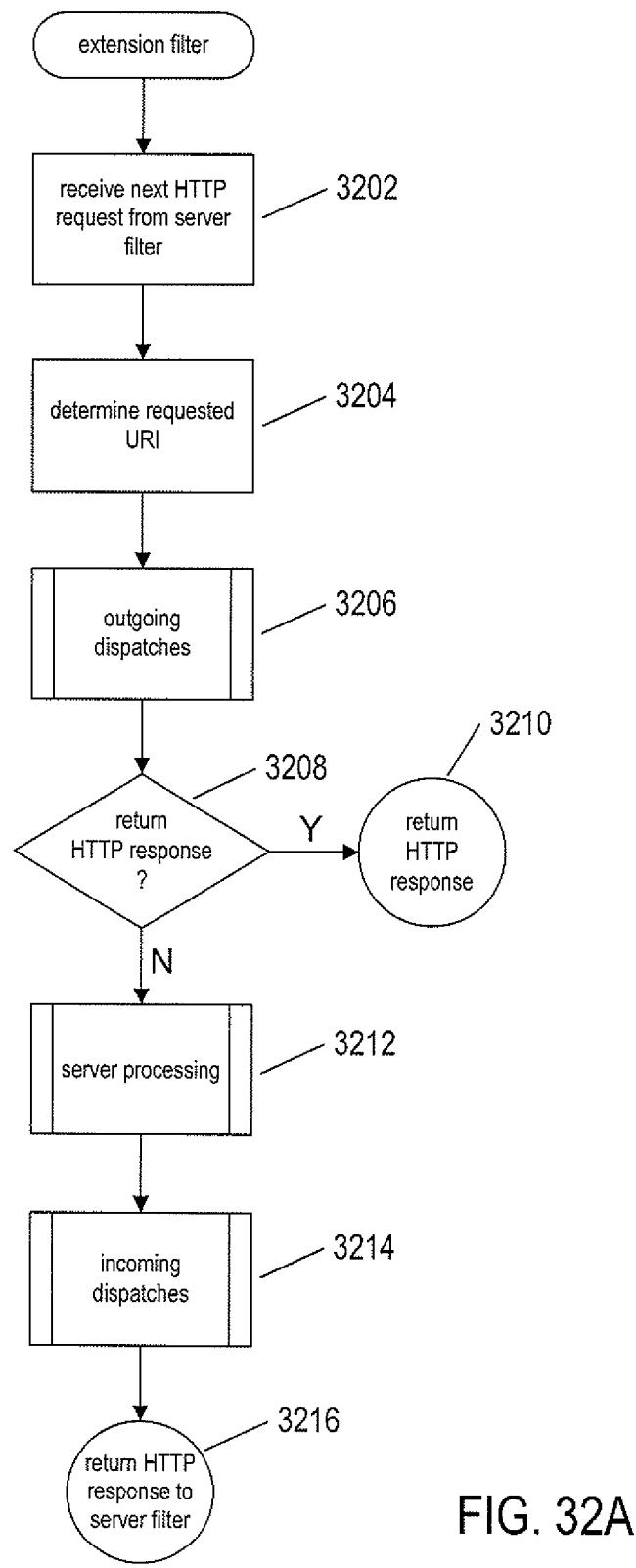
FIGS. 32A-C illustrate, using control-flow diagrams, the extension filter discussed above with reference to FIG. 30B and FIG. 31.
Figure 32B:
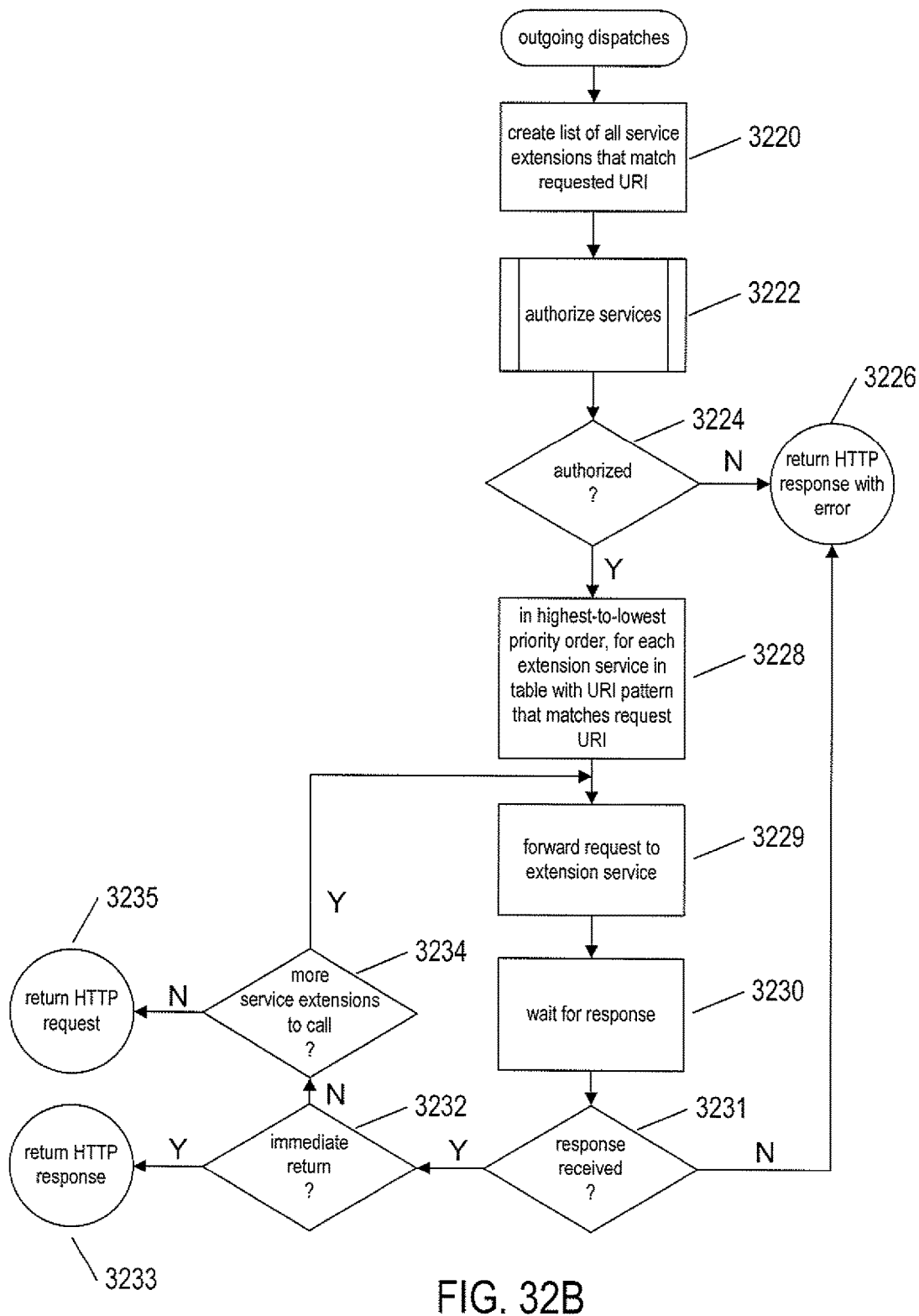
Figure 32C:
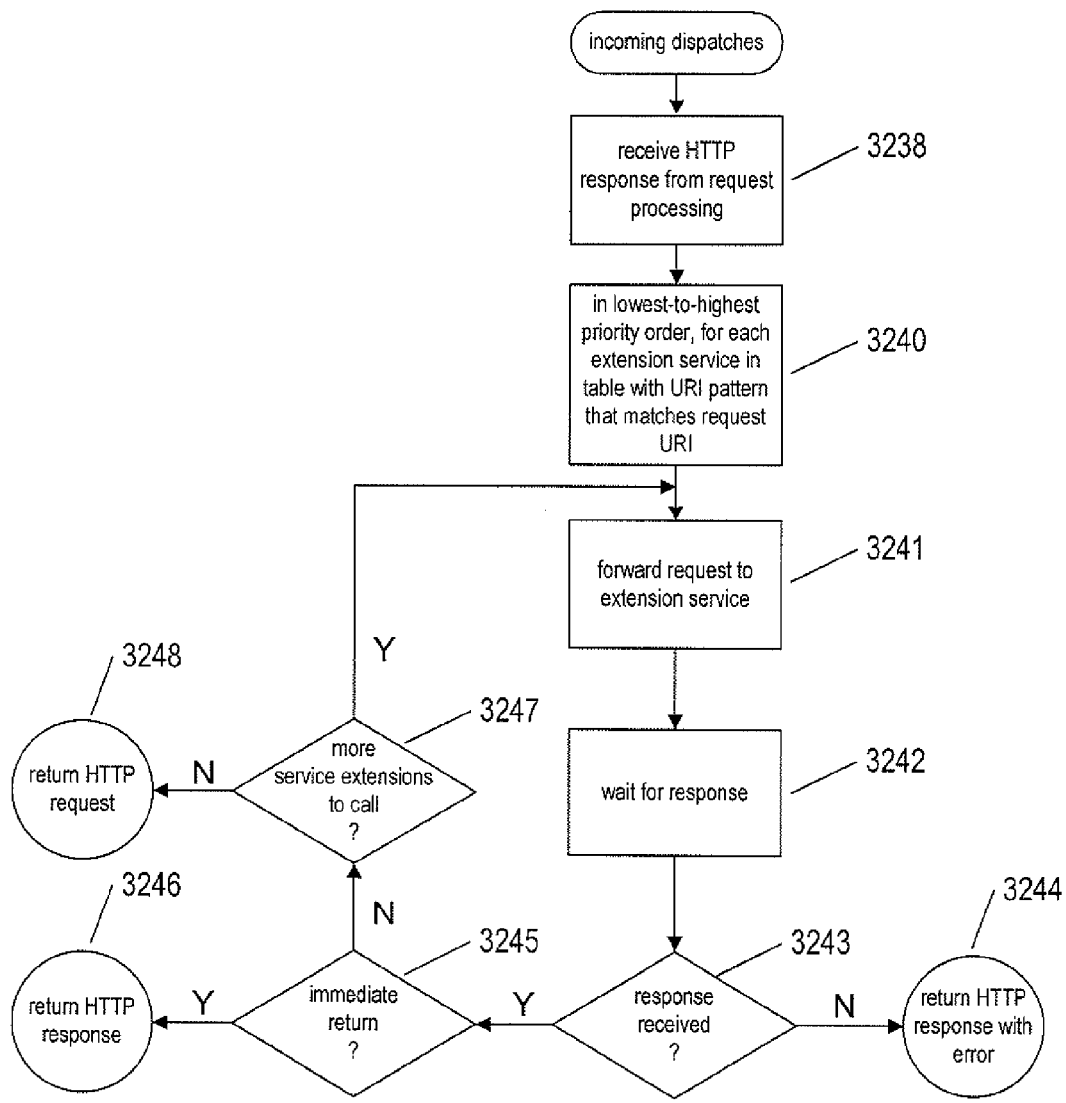

FIGS. 32A-C illustrate, using control-flow diagrams, the extension filter discussed above with reference to FIG. 30B and FIG. 31. In step 3202 of FIG. 32A, the extension filter receives a next HTTP request from a server filter. In step 3204, the extension filter determines the URI requested by the HTTP request. Then, in step 3206, the extension filter calls the routine "outgoing dispatches" to serially dispatch the HTTP request to all service extensions represented by entries in the dispatch table with URI patterns matching the requested URI, in descending priority level, as discussed above with reference to FIG. 31. When the routine "outgoing dispatches" returns an HTTP response, as determined in step 3208, then the HTTP response is returned to the server filter in step 3210. Otherwise, the normal cloud API entrypoint server processing is carried out in step 3212 to process the HTTP request and generate a corresponding HTTP response. The HTTP response is then input to the routine "incoming dispatches," called in step 3214, for dispatch for processing by all service extensions represented by entries in the dispatch table with URI patterns that match the requested URI, in increasing priority order. Finally, the HTTP response is returned to the server filter in step 3216.

FIG. 32B provides a control-flow diagram of the routine "outgoing dispatches" called in step 3206 of FIG. 32A. In step 3220, the routine "outgoing dispatches" creates a list of all service extensions represented by entries in the dispatch table with URI patterns that match the requested URI and uses this list of service extensions, and other information related to the HTTP request, including the security context, to call the routine "authorize services," in step 3222, to determine whether or not the request is authorized. When the request is not authorized, as determined in step 3224, an HTTP response is prepared and returned to indicate that the HTTP request cannot be processed, due to lack of authorization, in step 3226. Otherwise, in the for-loop of steps 3228-3235, the routine "outgoing dispatches" dispatches the HTTP request to each service extension in the dispatch table associated with a URI pattern that matches the requested URI, in highest-to-lowest priority order, as discussed above with reference to FIG. 31. Each dispatch occurs in step 3229, following which the routine "outgoing dispatches" waits for a processed HTTP request, in step 3230. When a processed HTTP request is not received within a maximum threshold amount of time, as determined in step 3231, then an HTTP response with an error indication is prepared and returned in step 3226. Otherwise, when the response is an HTTP response message, as determined in step 3232, the HTTP response is returned in step 3233. Otherwise, when there are more service extensions to which to dispatch the processed HTTP request, as determined in step 3234, control returns to step 3229 for an additional dispatch of the processed HTTP request. Otherwise, the processed HTTP request is returned in step 3235. As mentioned above, in alternative implementations, rather than returning the HTTP request when an immediate return is identified, in step 3232, the routine "outgoing dispatches" may instead dispatch the HTTP response to all service extensions that processed the HTTP request before the HTTP response was returned.

FIG. 32C provides a control-flow diagram for the routine "incoming extensions," called in step 3214 in FIG. 32A. In step 3238, the routine "incoming extensions" receives the HTTP response from server request processing (3008 in FIG. 30A). In the for-loop of steps 3240-3248, the routine "incoming extensions" traverses the dispatch table in lowest-to-highest priority order, as discussed above with reference to FIG. 31, dispatching the HTTP response received by the routine "incoming extensions" to those service extensions represented by dispatch-table entries with URI patterns that match the requested URI. Each dispatch occurs in step 3241. In step 3242, the routine "incoming extensions" waits for a processed HTTP response from the computational entity to which the HTTP response was dispatched in step 3241. When no response is received within a maximum threshold amount of time, as determined in step 3243, the HTTP response is returned with an error indication in step 3244. Otherwise, when the processed HTTP response is accompanied by an indication of immediate return, as determined in step 3245, then the HTTP response is returned in step 3246. Otherwise, when there are more service extensions to which to dispatch the processed HTTP response, as determined in step 3247, control flows back to step 3241. Otherwise, the HTTP response is returned, in step 3248.

In many implementations, the dispatch table is processed only once, by the extension filter, rather than twice, as described above. In the single processing, a sorted list of matching extensions as created, and this sorted list is used, rather than the dispatch table, for both outgoing and incoming dispatches. This approach facilitates amelioration of race conditions with respect to the dispatch table.

The above-described extension filter, added to the cloud API entrypoint server application, provides a deterministic, well-ordered dispatch mechanism for dispatching HTTP requests to service extensions and thus facilitates cloud-director-user extension of the functionalities and services provided by a cloud director, as discussed above in preceding subsections. In one implementation, HTTP requests are dispatched via the advanced message queuing protocol ("AMQP"), with the original HTTP request essentially packaged within an AMQP message for transmission to external computational entities that carry out service extensions, which return a processed HTTP request packaged within an AMQP return message. However, in alternative implementations, any of many different types of protocols may be used for dispatching HTTP requests and responses to service extensions. The cloud-operator interface subset of the RESTful interface represented by the cloud API entrypoint is supplemented, in certain implementations, to provide various operations for managing the contents of the dispatch table.

Although the present invention has been described in terms of particular embodiments, it is not intended that the invention be limited to these embodiments. Modifications within the spirit of the invention will be apparent to those skilled in the art. For example, the dispatch table and extension filter discussed above with reference to FIGS. 30B, 31, and 32A-C can be implemented in a variety of different ways, in alternative implementations, by varying any of many different design and implementation parameters, including programming language, operating system, modular organization, control structures, data structures, and other such parameters. The dispatch table may, in alternative implementations, include different and/or additional columns or fields. In alternative implementations, the dispatch functionality of the extension filter may be logic-driven, rather than table-driven.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A cloud-connector subsystem comprising:
    one or more cloud-connector nodes, each cloud-connector node associated with a single cloud-computing facility; and
    a cloud-connector server that includes one or more processors, one or more memories, one or more data-storage devices, and computer instructions that, when executed on the one or more processors, control the cloud-director server to provide, in cooperation with the one or more cloud-connector nodes
        a management user interface that provides native management services and functionalities for creating, administering, and managing virtual data centers within one or more cloud-computing facilities, each cloud-computing facility associated with a cloud-connector node;
        an API entrypoint request/response interface to native services,
        a service-extension interface, and
        service extensions created through the service-extension interface; and
        a cloud API server application that processes requests for native services and service extensions received through the API entrypoint request/response interface, dispatching requests for service extensions to service-extension servers that execute the service extensions in a predetermined order.

2. The cloud-connector subsystem of claim 1 wherein the API entrypoint request/response interface is a hierarchical, URI-based RESTful interface.

3. The cloud-connector subsystem of claim 1 further comprising:
    an authorization-service-management-interface provided through the API entrypoint request/response interface; and
    an authorization service that controls access to the service extensions created through the service-extension interface.

4. The cloud-connector subsystem of claim 3 wherein the authorization service comprises:
    an authorization-service database; and
    an authorization routine that is called to determine whether a request directed to a service extension through the API entrypoint request/response interface is authorized to access the service extension.

5. The cloud-connector subsystem of claim 3 wherein the cloud API server application comprises:
    an initial-processing and post-processing component that receives requests from clients accessing the API entrypoint request/response interface and that returns responses to the clients;
    one or more filters, each of which processes one or more of the client requests and responses;
    an extension filter that dispatches the client requests and responses to the service-extension servers for further processing; and
    a processing component that processes the client requests and returns the client responses.

6. The cloud-connector subsystem of claim 5 wherein the extension filter accesses a dispatch table that contains entries that are ordered by priority, each entry including:
    an indication of a service-extension server address, and
    a URI pattern.

7. The cloud-connector subsystem of claim 6 wherein the extension filter dispatches a request received from a filter by:
    for each entry in the dispatch table accessed in decreasing-priority order,
        when the URI pattern in the entry matches a URI requested by the request,
            dispatching the request to the service-extension server address of the entry.

8. The cloud-connector subsystem of claim 7 wherein when, after dispatching the request to the service-extension server address, the service extension at the service-extension server address returns a response to the extension filter, the extension filter returns the response to a client from which the request was received.

9. The cloud-connector subsystem of claim 6 wherein the extension filter dispatches a response received from the processing component by:
    for each entry in the dispatch table accessed in increasing-priority order,
        when the URI pattern in the entry matches a URI requested by the response,
            dispatching the response to the service-extension server address of the entry.

10. The cloud-connector subsystem of claim 5 wherein the initial-processing and post-processing component, upon receiving a request from a filter:
    stores the request;
    associates the stored request with a requested URI; and
    calls the authorization service to determine whether or not the request is authorized.

11. A method for extending services provided by one or more cloud-connector nodes, each cloud-connector node associated with a single cloud-computing facility, and a cloud-connector server that includes one or more processors, one or more memories, one or more data-storage devices, the method comprising:
    providing, by the cloud-connector server in cooperation with the one or more cloud-connector nodes, a management user interface that provides native management services and functionalities for creating, administering, and managing virtual data centers within one or more cloud-computing facilities, each cloud-computing facility associated with a cloud-connector node;

providing an API entrypoint request/response interface to native services,
a service-extension interface, and
service extensions created through the service-extension interface; and processing, by a cloud API server application, requests for native services and service extensions received through the API entrypoint request/response interface, dispatching requests for service extensions to service-extension servers that execute the service extensions in a predetermined order.

12. The method of claim 11 wherein the API entrypoint request/response interface is a hierarchical, URI-based RESTful interface.

13. The method of claim 11 wherein the API entrypoint request/response interface further comprises:
an authorization-service-management-interface provided through the API entrypoint request/response interface; and
an authorization service that controls access to the service extensions created through the service-extension interface.

14. The method of claim 13 wherein the authorization service comprises:
an authorization-service database; and
an authorization routine that is called to determine whether a request directed to a service extension through the API entrypoint request/response interface is authorized to access the service extension.

15. The method of claim 13 wherein the cloud API server application comprises:
an initial-processing and post-processing component that receives requests from clients accessing the API entry-point request/response interface and that returns responses to the clients;
one or more filters, each of which processes one or more of the client requests and responses;
an extension filter that dispatches the client requests and responses to the service-extension servers for further processing; and
a processing component that processes the client requests and returns the client responses.

16. The method of claim 15 further comprising accessing, by the extension filter, a dispatch table that contains entries that are ordered by priority, each entry including:
an indication of a service-extension server address, and
a URI pattern.

17. The method of claim 16 wherein the extension filter dispatches a request received from a filter by:
for each entry in the dispatch table accessed in decreasing-priority order,
when the URI pattern in the entry matches a URI requested by the request,
dispatching the request to the service-extension server address of the entry.

18. The method of claim 17 wherein
when, after dispatching the request to the service-extension server address, the service extension at the service-extension server address returns a response to the extension filter, the extension filter returns the response to a client from which the request was received.

19. The method of claim 16 wherein the extension filter dispatches a response received from the processing component by:
for each entry in the dispatch table accessed in increasing-priority order,
when the URI pattern in the entry matches a URI requested by the response,
dispatching the response to the service-extension server address of the entry.

20. The method of claim 15 wherein the initial-processing and post-processing component, upon receiving a request from a filter:
stores the request;
associates the stored request with a requested URI; and
calls the authorization service to determine whether or not the request is authorized.

* * * * *